(12) United States Patent (10) Patent No.: US 10,114,911 B2
Yamazaki et al. (45) Date of Patent: Oct. 30, 2018

(54) FLUID STRUCTURE INTERACTION SIMULATION METHOD AND APPARATUS, AND COMPUTER-READABLE STORAGE MEDIUM

(75) Inventors: Takashi Yamazaki, Kawasaki (JP);
Yoshimasa Kadooka, Kawasaki (JP);
Toshiaki Hisada, Bunkyo-ku (JP);
Seiryo Sugiura, Bunkyo-ku (JP);
Takumi Washio, Bunkyo-ku (JP);
Junichi Okada, Bunkyo-ku (JP)

(73) Assignees: FUJITSU LIMITED, Kawasaki (JP);
THE UNIVERSITY OF TOKYO, Tokyo (JP)

( * ) Notice: Subject to any disclaimer, the term of this patent is extended or adjusted under 35 U.S.C. 154(b) by 1326 days.

(21) Appl. No.: 13/104,495

(22) Filed: May 10, 2011

(65) Prior Publication Data

US 2011/0288834 A1 Nov. 24, 2011

Related U.S. Application Data

(60) Provisional application No. 61/347,623, filed on May 24, 2010.

(51) Int. Cl.
*G06F 17/50* (2006.01)

(52) U.S. Cl.
CPC ...... *G06F 17/5009* (2013.01); *G06F 17/5018* (2013.01); *G06F 2217/16* (2013.01)

(58) Field of Classification Search
None
See application file for complete search history.

(56) References Cited

FOREIGN PATENT DOCUMENTS

| JP | 9-245080 A | 9/1997 |
| JP | 2000-352545 A | 12/2000 |
| JP | 2005-222555 A | 8/2005 |

(Continued)

OTHER PUBLICATIONS

Zhang et al. "Analysis of fluid-structure interaction problems with structural buckling and large domain changes by ALE finite element method", 2001, Comput. Methods Appl. Mech. Engrg. 190, pp. 6341-6357.*

(Continued)

*Primary Examiner* — Omar Fernandez Rivas
*Assistant Examiner* — Iftekhar Khan
(74) *Attorney, Agent, or Firm* — Westerman, Hattori, Daniels & Adrian, LLP

(57) ABSTRACT

A fluid structure interaction simulation method includes a graph information forming process to form graph information of nodes obtained by discretizing a computing region for each of a fluid and a structure that are represented by meshes, and a main time development loop process to simulate a physical phenomenon. The loop process includes arranging IMEs (Interaction Mediating Elements) that move with a displacement of the structure, on a boundary of the structure, defining, within the IME, correcting functions of a pressure and a velocity of the fluid that interact with the pressure and the velocity of the fluid and the displacement of the structure, and executing a simulation based on the correcting functions, in a state in which the meshes of the fluid are mismatched to the meshes of the structure.

14 Claims, 26 Drawing Sheets

(56) References Cited

FOREIGN PATENT DOCUMENTS

JP    2008-052380 A    3/2008

OTHER PUBLICATIONS

Gerstenberger et al., "An extended Finite Element Method/Lagrange multiplier based approach for fluid-structure interaction", Computer Methods in Applied Mechanics and Engineering, Garching, Germany, vol. 197, No. 19-20, Mar. 3, 2008, pp. 1699-1714.*
Hart, J. De et al.; "A three-dimensional computational analysis of fluid-structure interaction in the aortic valve", Journal of Biomechanics, vol. 36, No. 1, pp. 103-112, 2003.
Q. Zhang et al., "Analysis of Fluid-Structure Interaction Problems with Structural Buckling and Large Domain Changes by ALE Finite Element Method"; Computer Methods in Applied Mechanics and Engineering, vol. 190, pp. 6341-6357, 2001.
Hisada, Toshiaki et al.; "Numerical Study Related to Fluid Structure Interaction Simulation Method of Aortic Valve"; The Japan Society for Industrial and Applied Mathematics, vol. 16, No. 2, pp. 36-50, 2006 (w/partial English translation).
Hashimoto et al, "Development of Fluid-Structure Coupling Method Based on Fixed Mesh Using Level Set Virtual Particles Interface Treatment", (online) the Japan Society for Computational Engineering and Science, Oct. 27, 2008 (20 pages) https://www.jstage.jst.go.jp/browse/jsces/2008/0/_contents/-char/ja/; in Japanese Office Action dated Oct. 21, 2014.
Gerstenberger et al., "An eXtended Finite Element Method/Lagrange multiplier based approach for fluid-structure interaction", Computer Methods in Applied Mechanics and Engineering, Garching, Germany, vol. 197, No. 19-20, Mar. 3, 2008, pp. 1699-1714, in Extended European Search Report dated Jun. 18, 2015 (16 pages).
Extended European Search Report dated Jun. 18, 2015, issued in counterpart European Patent Application No. 11166806.7 (6 pages).
Japanese Office Action dated Oct. 21, 2014, issued in corresponding Japanese Application No. 2011-107604; w/English Translation. (22 pages).
Office Action dated Nov. 22, 2017, issued in counterpart European Application No. 11166806.7 (8 pages).
Office Action dated May 16, 2018 issued in counterpart European Patent Application No. 11166806.7(15 pages).

* cited by examiner

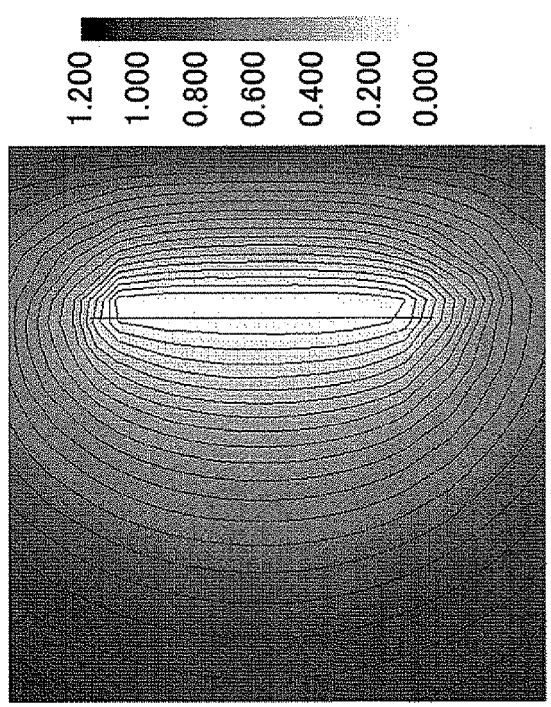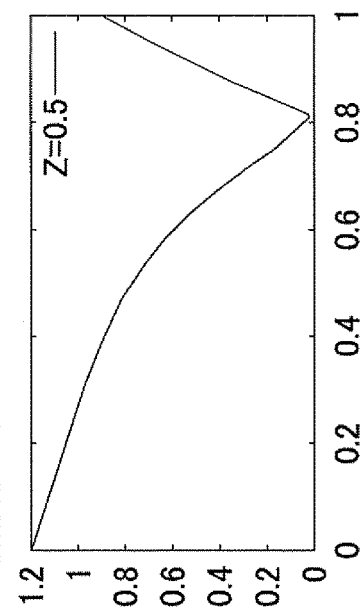
FIG.4A
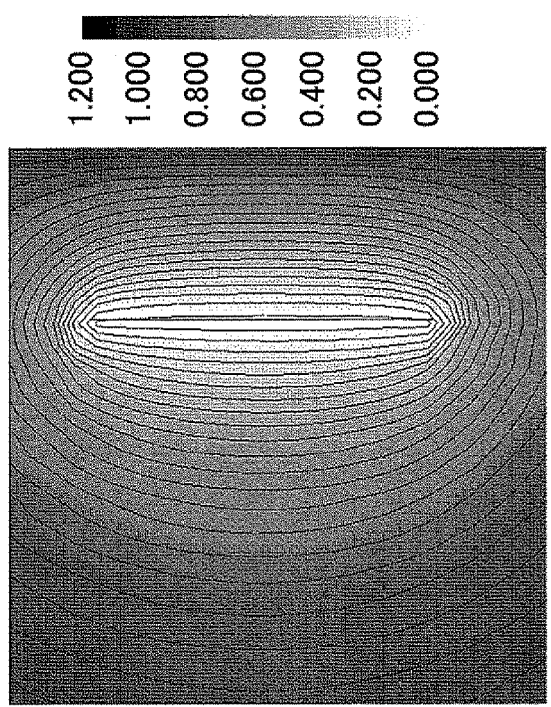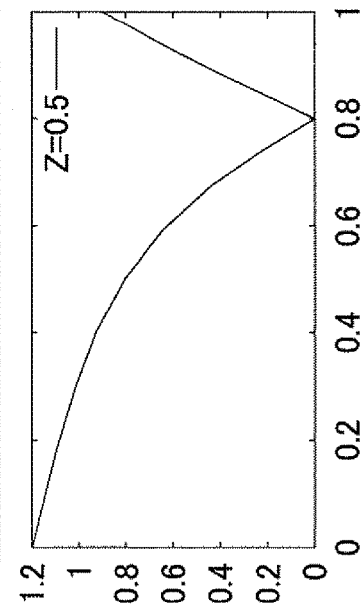
FIG.4B

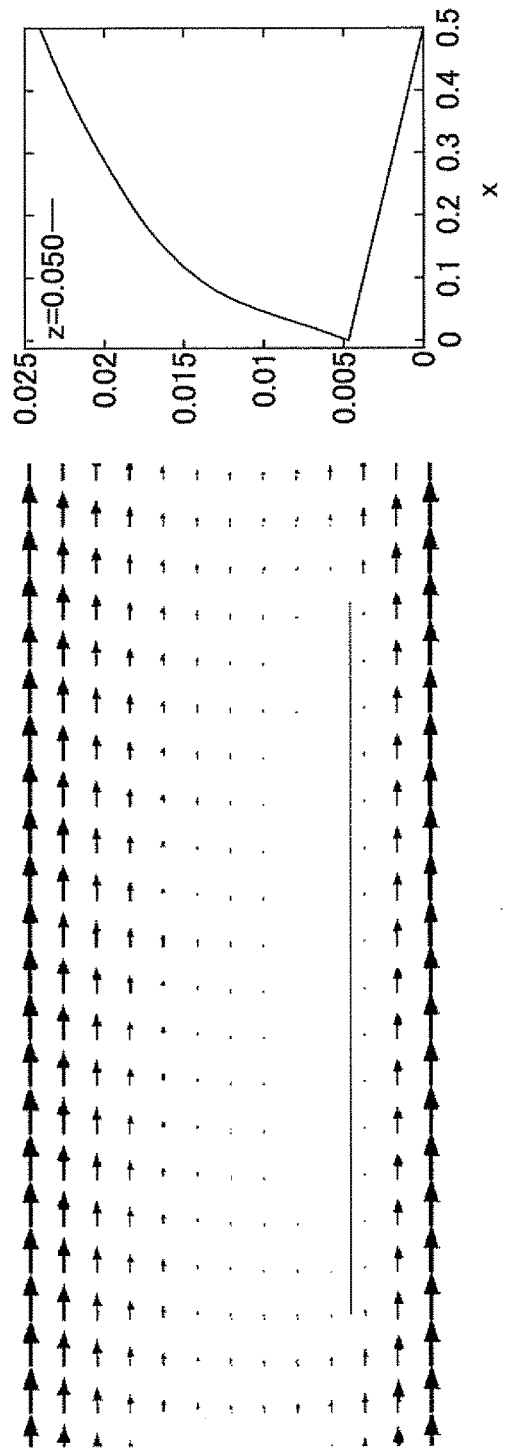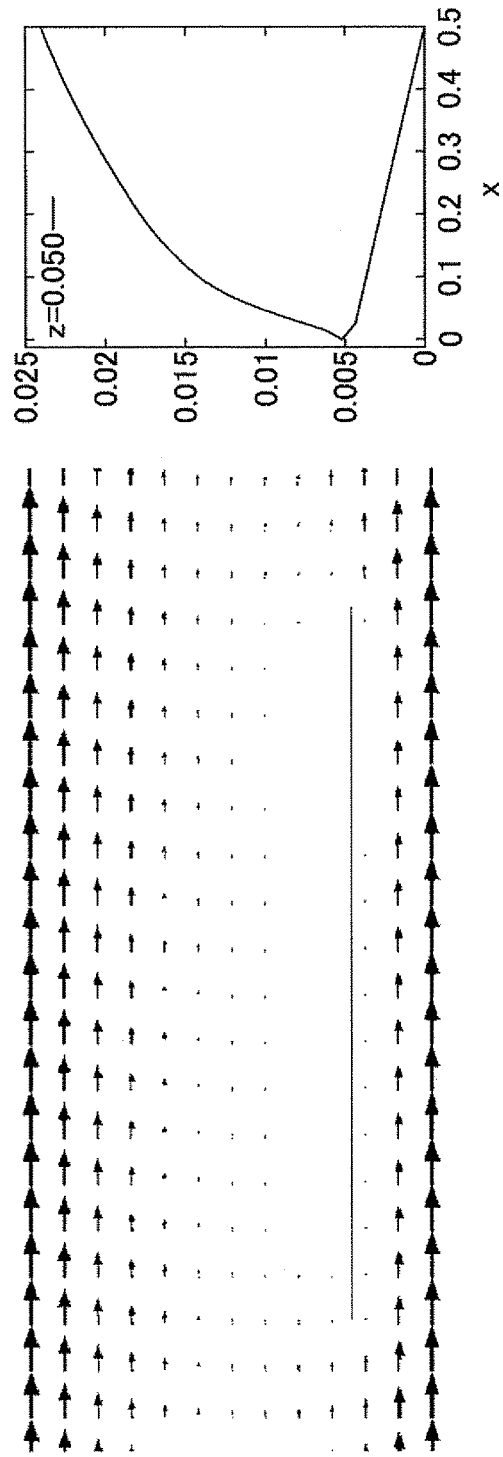
FIG.5A
FIG.5B

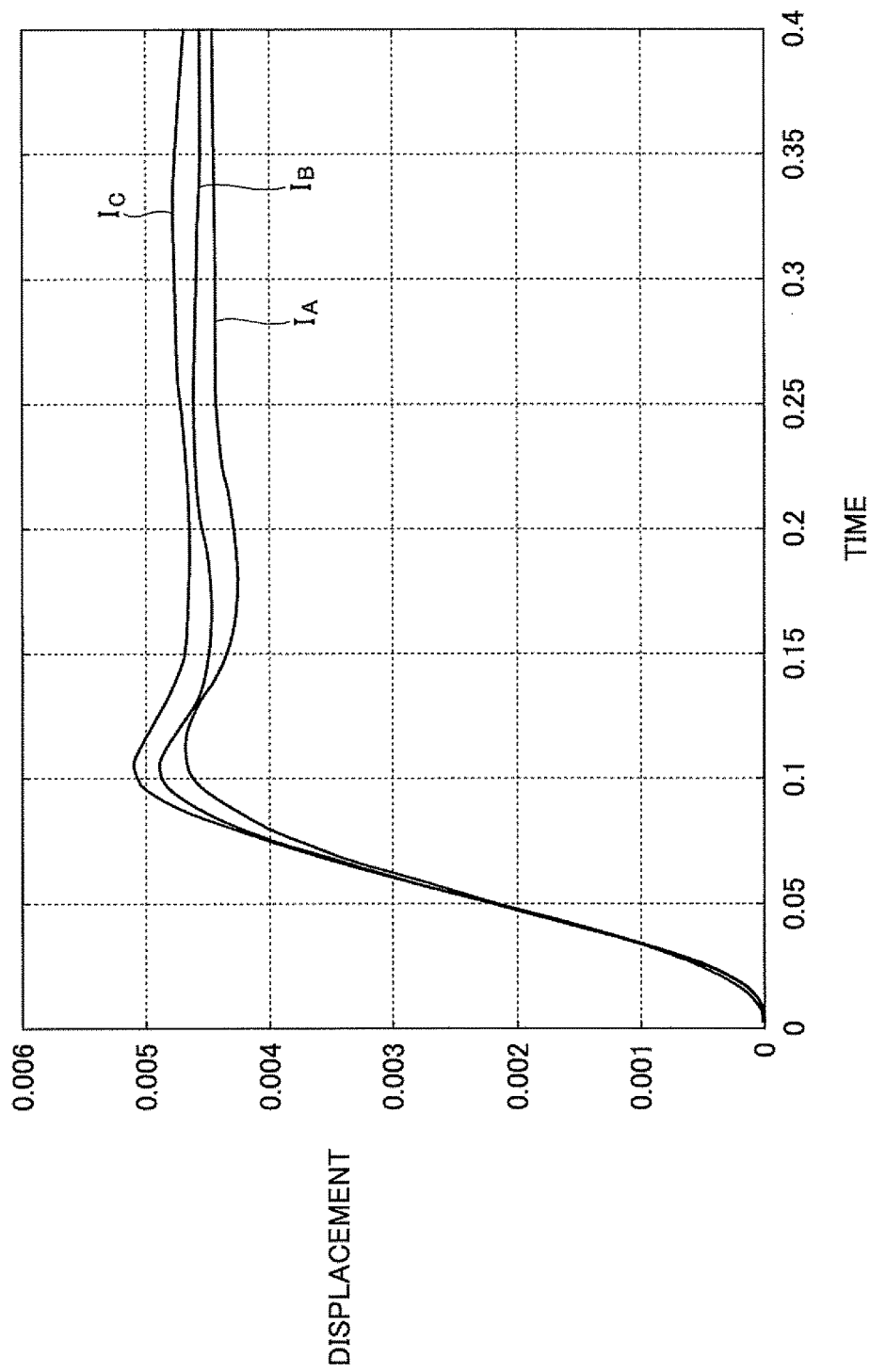

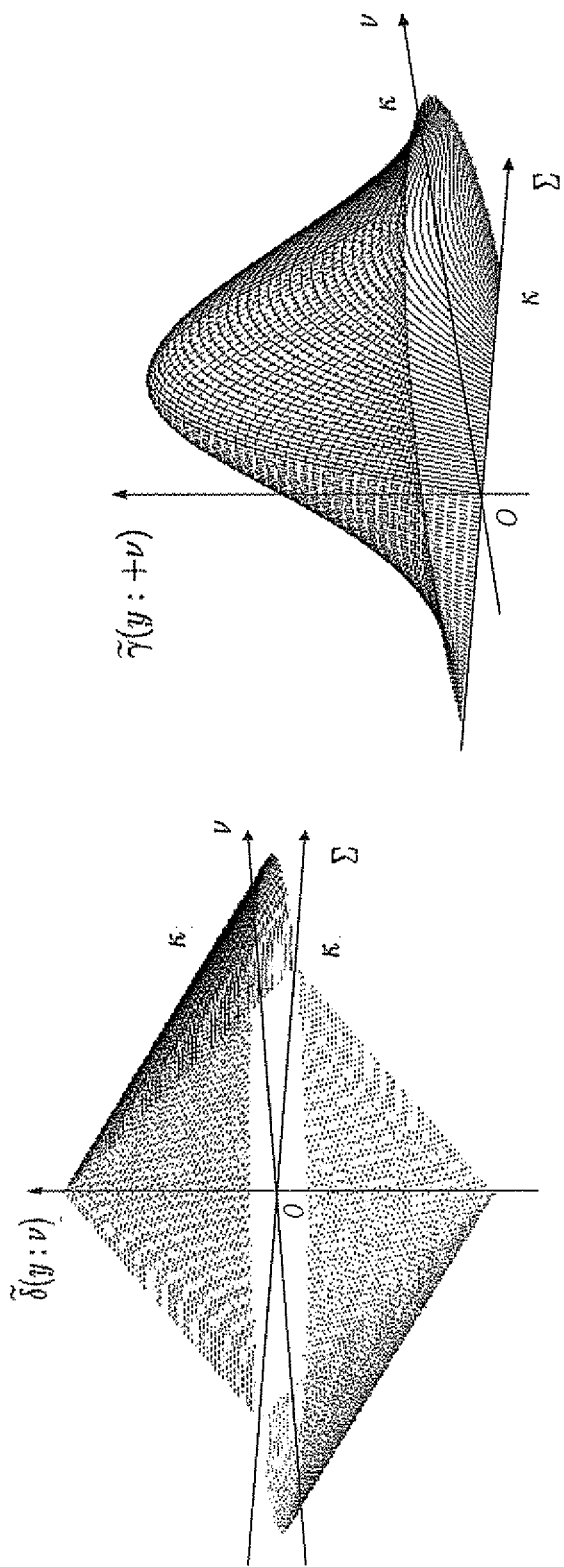

S101 ndflag(1:pointer(#IME+1)−1)=0
matime(1:3, ndflag(1:pointer(#IME+1)−1)=0   [IN CASE OF SUB PART 61]
matime(1:3,1:3, ndflag(1:pointer(#IME+1)−1)=0  [IN CASE OF SUB PART 62]

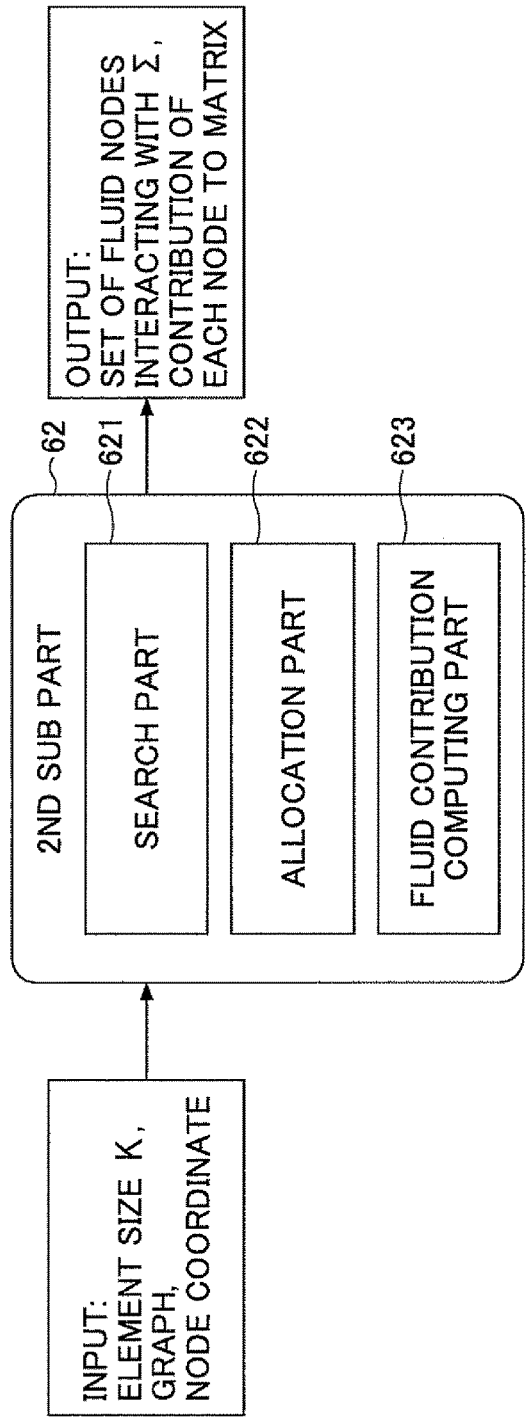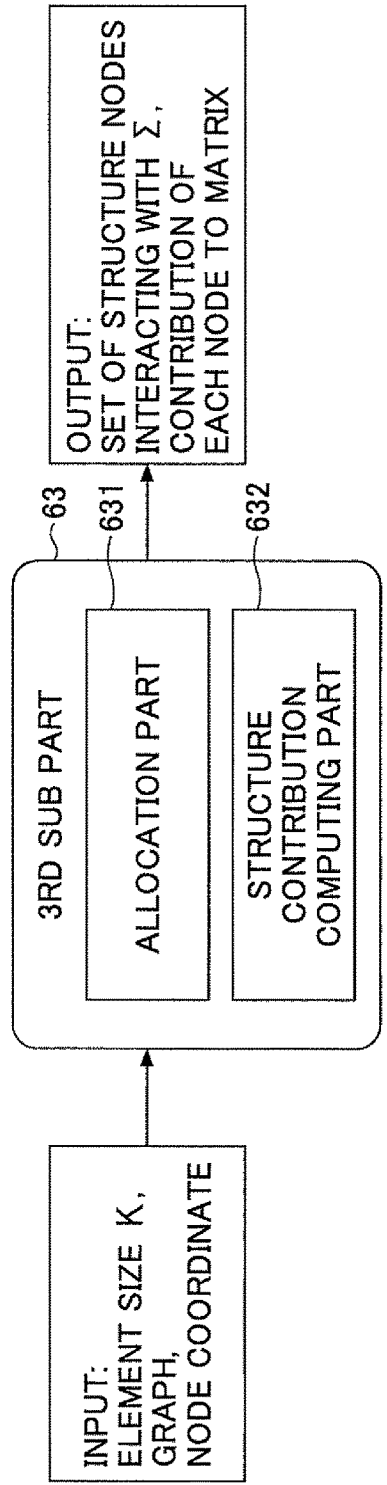

FIG.22

```
ndflag(1:(3 x #IME))=0
matime(1:3, ndflag(1:(3 x #IME)))=0      [IN CASE OF SUB PART 63]      ~S311
matime(1:3,1:3, ndflag(1:(3 x #IME)))=0  [IN CASE OF SUB PART 64]
```

FIG.23

EVALUATE CONTRIBUTION OF INTEGRAL TERM IN
WEAK EQUATION BY FOCUSING ON NORMAL VECTOR vn  ~S401
& ELEMENT AREA area:contrib

↓ ndflag(index)="global id of ivert"
matime(:,:,index)+=contrib            ~S402

FLUID STRUCTURE INTERACTION SIMULATION METHOD AND APPARATUS, AND COMPUTER-READABLE STORAGE MEDIUM

CROSS-REFERENCE TO RELATED APPLICATIONS

This application is based upon and claims the benefit of priority of the prior U.S. Provisional Patent Application No. 61/347,623, filed on May 24, 2010, the entire contents of which are incorporated herein by reference.

FIELD

The present invention generally relates to fluid structure interaction simulation method and apparatus, and non-transitory computer-readable storage medium that stores a fluid structure interaction simulation program.

The fluid structure interaction simulation refers to a numerical simulation using FSI (Fluid Structure Interaction) analysis.

BACKGROUND

A free boundary (or moving boundary) generally exists between fluid and structure, and helped by the improved performance of recent computers and improved numerical simulation techniques such as the finite element method, the fluid structure interaction simulation is used not only in fundamental science but also in applied fields such as biomechanics. Hence, it has become possible to understand phenomena under more realistic problem settings. The simulation with respect to the fluid structure interaction problem often uses the IT (Interface-Tracking) type ALE (Arbitrary Lagrangian-Eulerian) method, as described in Nobuyoshi Tosaka, Hideaki Miyata, Yoji Shimazaki, Takashi Nomura, Masayuki Shimura, and Katsumori Hatanaka, Numerical Fluid Mechanics Editing Meeting Edition, "Numerical Fluid Mechanics Series 4 Moving Boundary Flow Analysis", University of Tokyo Publisher, Tokyo, 1995 (hereinafter Tosaka et al.) and Q. Zhang and T. Hisada, "Analysis of Fluid-Structure Interaction Problems with Structural Buckling and Large Domain Changes by ALE Finite Element Method", Comput. Methods Appl. Mech. Engrg., Vol. 190, pp. 6341-6357, 2001 (hereinafter Zhang et al.), for example.

FIG. 1 is a diagram for explaining a numerical simulation using the IT type ALE method. An algorithm or program according to the ALE method is executed by a computer system 1 illustrated in FIG. 1. The computer system 1 includes an input device 2, a computer 3 (or a processor) 3, and an output device 4. The input device 2 inputs to the computer 3 information including physical constants of the fluid and structure (for example, viscosity coefficient, density, Young's modulus, etc.) and initial condition, computing region (or domain), and mesh information. The output device 4 outputs information computed in the computer 3, including numerical information on the degree of freedom of the fluid pressure at each discrete time step, changes in the velocity or structure, visualization information, and the like.

The algorithm or program according to the ALE method includes a mesh information read part 6 to read mesh information from the input device 2, a graph information forming part 7 to form graph information called connectivity among nodes of discretised computing regions (that is, a node list forming finite elements), an initial condition set part 8 to set the initial condition, and a main time development loop part 9 to repeat N time steps.

FIG. 2 is a diagram for explaining an example of the structure of the main time development loop part 9 according to the IT type ALE method. The main time development loop part 9 includes a FSI part 11 and a mesh control part 12. The FSI part 11 forms the unit that simulates physical phenomena. The FSI part 11 includes a matrix creating routine 111 to create a small matrix and an equivalent nodal force of each element of the structure in correspondence with the time discretization technique, a matrix creating routine 112 to create a small matrix and an equivalent nodal force of each element of the fluid in correspondence with the time discretization technique, and a boundary condition applying routine 113 to apply the boundary condition of the structure and the fluid. The FSI part 11 further includes a matrix assembler routine 114 to create a matrix equation with respect to all degrees of freedom by restructuring the contribution from the small matrices of each element obtained from the routines 111 through 113, a linear solver 115 to solve and evaluate a variation of dependent variables (pressure, velocity, displacement, etc.) of the fluid and the structure every time a Newton-Raphson loop within the FSI part 11 is executed, and an output part 116 to output, by displaying, for example, the variation of the dependent variables and the evaluation thereof obtained by the linear solver 115.

If the displacement of the structure is denoted by "d", $|d| \neq 0$, and the node mismatch occurs in the boundary of the fluid and the structure every time the Newton-Raphson loop is executed within the FSI part 11. The mesh control part 12 within the main time development loop 9 has the role of recovering from mesh mismatch (or mesh inconsistency) caused by the node mismatch, and forms an auxiliary part to enable the numerical solving. More particularly, the mesh control part 12 recovers from the mesh mismatch state to the mesh matched state by using the displacement of the structure as the boundary condition and treating the mesh of the fluid region as an elastic body. For this reason, the mesh control part 12 includes a matrix creating routine 121 to create the small matrix for each element of the structure, a boundary condition applying routine 122 to apply the boundary condition of the displacement of the structure, a matrix assembler routine 124 to create the matrix equation with respect to all degrees of freedom, and a solver 125 to evaluate the state of the mesh matching (or consistency of the meshes, hereinafter referred to as "mesh consistency") every time a loop is executed within the mesh control part 12. If the target of the mesh control simulation is treated as a non-linear elastic body, the loop of Newton-Raphson method is executed iteratively in the mesh control part 12. In contrast, if the target of the mesh control simulation can be treated as a linear elastic body, the process escapes from the loop when the Newton-Raphson loop is executed once within the mesh control part 12.

According to the ALE method, the mesh control part 11 must carry out the mesh control described above, however, the mesh control has a possibility of failing particularly in a large-displacement problem. When the mesh control fails, the execution of the simulation stops, and an approximate solution to be obtained may not be obtained. In addition, in a problem in which the structures contact each other, the meshes will definitely fail (because a fluid mesh having zero volume is generated by the contact), and the application of the mesh control is limited. Moreover, because the amount of computations to be executed by the mesh control part 11 is relatively large, a load of the computations on the mesh control part 11 (that is, the computer 3) is relatively large. Accordingly, the conventional fluid structure interaction simulation method using the IT type ALE method is dependent on the mesh consistency between the fluid and the structure, and may not treat the large-deformation problem and the problem in which the structures contact each other. Furthermore, the load of the computations on the computer is relatively large because of the relatively large amount of computations required by the mesh control.

On the other hand, methods of performing the fluid structure interaction simulation using the IT type ALE method without carrying out the mesh control have been proposed in Japanese Laid-Open Patent Publications No. 9-245080 and No. 2000-352545, Toshiaki Hisada and Takumi Washio, "Numerical Study Related to Fluid Structure Interaction Simulation Method of Aortic Valve", The Japan Society for Industrial and Applied Mathematics, Vol. 16, No. 2, pp. 36-50, 2006 (hereinafter Hisada et al.), and J. de Hart, G. W. M. Peters, P. J. G. Schreurs, F. P. T. Baaijens, "A three-dimensional computational analysis of fluid-structure interaction in the aortic valve", J. Biomech., Vol. 36, No. 1, 103-112, 2003 (hereinafter de Hart et al., for example. However, these proposed methods are of the IT type that depends on the mesh consistency, and the meshes of the fluid become relatively small if the structure has a complex geometrical shape, for example. Hence, the amount of computations associated with the small meshes becomes relatively large in the case of the structure having the complex geometrical shape, and the load of the computations on the computer is relatively large.

When treating the large-deformation problem or the problem in which the structures contact each other, or when reducing the amount of computations, it may be desirable to perform a fluid structure interaction simulation that does not depend on the mesh consistency. However, the pressure and the velocity gradient change discontinuously before and after the boundary surface (for example, a thin film structure) of the fluid and the structure, and the flow may not be approximated accurately by the basis function of the general finite element method if the mesh mismatch occurs between the fluid and the structure. This is because the basis function of the finite element method is usually defined so that the pressure and the velocity gradient within the element become continuous functions, and the discontinuity within the element may not be represented. For example, a method has been proposed in de Hart et al., to interact a blood flow and a valva aortae (aortic valve) by applying a condition $\dot{d}=v$ in which the velocities of the fluid and the structure match on the boundary of the fluid and the structure, using the finite element in which the function of pressure and the velocity gradient are elementwise discontinuous. However, this proposed method does not perform the simulation with a realistic Reynolds number. In addition, this proposed method may generate an unnatural back flow (or reflux) before and after the structure due to the effects of the constraint condition.

A technique that simulates an interaction of the fluid and the structure using the method of Lagrangian multipliers by using an incompressibility condition of the fluid in a neighborhood of the boundary of the fluid and the structure as the limiting condition has been proposed in Hisada et al., for example. However, this proposed technique neglects a viscous condition at the boundary interface due to viscosity. Hence, in the fluid structure interaction simulation method that does not depend on the mesh consistency, it may be difficult to perform an accurate simulation.

As described above, the conventional fluid structure interaction simulation method using the IT type ALE method depends on the mesh consistency between the fluid and the structure, and the load of the computations on the computer is relatively large due to the relatively large amount of computations required for the mesh control. On the other hand, in the IC (Interface-Capturing) type conventional fluid structure interaction simulation method that does not depend on the mesh consistency, it may be difficult to perform an accurate simulation. Hence, the conventional fluid structure interaction simulation methods suffer from a problem in that it may be difficult to perform an accurate simulation without being dependent on the mesh consistency between the fluid and the structure.

SUMMARY

Accordingly, it is an object in at least one embodiment to provide fluid structure interaction simulation method and apparatus, and non-transitory computer-readable storage medium, which may perform an accurate simulation without being dependent on a mesh consistency between a fluid and a structure.

According to one aspect of one embodiment, there is provided a fluid structure interaction simulation method to be implemented in a computer, that includes a graph information forming process, executed by the computer, to form graph information of nodes obtained by discretising a computing region for each of a fluid and a structure that are represented by meshes, and a main time development loop process, executed by the computer, to simulate a physical phenomenon, wherein the main time development loop process includes arranging interaction mediating elements that move with a displacement of the structure, on a boundary of the structure, defining, within the interaction mediating element, correcting functions of a pressure and a velocity of the fluid that interact with the pressure and the velocity of the fluid and the displacement of the structure, and executing a simulation based on the correcting functions, in a state in which the meshes of the fluid are mismatched to the meshes of the structure.

According to one aspect of one embodiment, there is provided a fluid structure interaction simulation apparatus including a storage part configured to store a program, and a processor configured to perform a fluid structure interaction simulation by executing the program, wherein the processor includes a graph information forming part configured to form graph information of nodes obtained by discretising a computing region for each of a fluid and a structure that are represented by meshes, and a main time development loop part configured to simulate a physical phenomenon, wherein the main time development loop part performs a process including arranging interaction mediating elements that move with a displacement of the structure, on a boundary of the structure, defining, within the interaction mediating element, correcting functions of a pressure and a velocity of the fluid that interact with the pressure and the velocity of the fluid and the displacement of the structure, and executing a simulation based on the correcting functions, in a state in which the meshes of the fluid are mismatched to the meshes of the structure.

According to one aspect of one embodiment, there is provided a non-transitory computer-readable storage medium that stores a program which, when executed by a computer, causes the computer to perform a fluid structure interaction simulation process including a graph information forming process, executed by the computer, to form graph information of nodes obtained by discretising a computing region for each of a fluid and a structure that are represented by meshes, and a main time development loop process, executed by the computer, to simulate a physical phenomenon, wherein the main time development loop process includes arranging interaction mediating elements that move with a displacement of the structure, on a boundary of the structure, defining, within the interaction mediating element, correcting functions of a pressure and a velocity of the fluid that interact with the pressure and the velocity of the fluid and the displacement of the structure, and executing the simulation based on the correcting functions, in a state in which the meshes of the fluid are mismatched to the meshes of the structure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 4A and 4B are diagrams illustrating numerical solutions to a steady problem (Poisson's equation) for a case in which meshes conforming to a curved surface Σ are used and a case in which an analysis of the embodiment is used respectively;

FIGS. 5A and 5B are diagrams illustrating numerical solutions to a steady problem (viscous operator) for the case in which meshes conforming to the curved surface Σ are used and the case in which the analysis of the embodiment is used respectively;

FIG. 9 is a diagram illustrating displacements in respective simulations for cases in which the ALE method is applied, the embodiment is applied, and only the constraint condition based on the incompressibility condition is applied;

FIGS. 10A and 10B are diagrams for explaining a basis function of a pressure and a velocity in the embodiment respectively;

FIG. 19 is a diagram illustrating an example of a structure of the second sub part;

FIG. 20 is a diagram illustrating an example of a structure of a third sub part;

FIG. 22 is a diagram for explaining a process "a" illustrated in FIG. 21;

FIG. 23 is a diagram for explaining a process "b" illustrated in FIG. 21;

DESCRIPTION OF EMBODIMENTS

Preferred embodiments of the present invention will be described with reference to the accompanying drawings.

According to one aspect of the present invention, graph information among nodes of discretised computing regions is formed for each of a fluid and a structure represented by meshes, in order to execute a main time development loop that simulates a physical phenomenon. The main time development loop arranges an IME that moves according to a displacement of the structure, on a boundary of the structure. The main time development loop defines correcting functions of a pressure and a velocity of the fluid, which interact with the velocity of the fluid and the displacement of the structure, in order to cause the correcting functions to bear the interaction of the fluid and the structure. A simulation is executed in a mesh mismatch state between the fluid and the structure.

A description will now be given of the fluid structure interaction simulation method and apparatus, and non-transitory computer-readable storage medium, in each embodiment according to the present invention.

Figure 1:
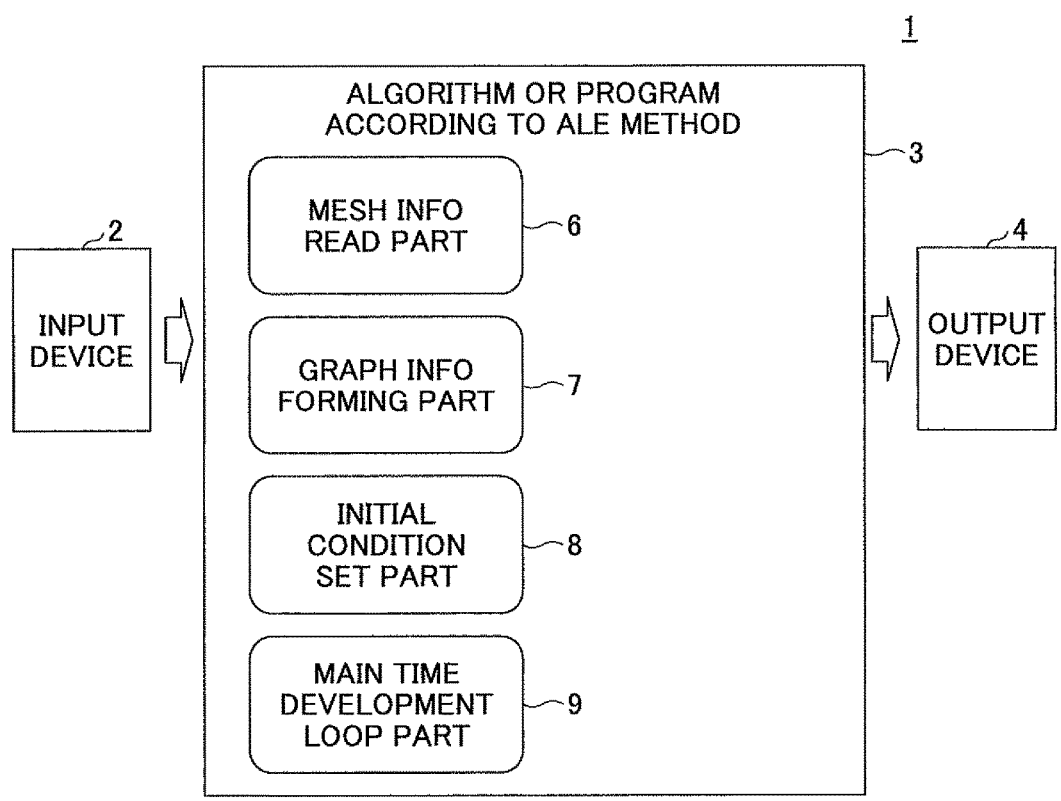
FIG. 1 is a diagram for explaining a numerical simulation using the IT type ALE method.
Figure 2:
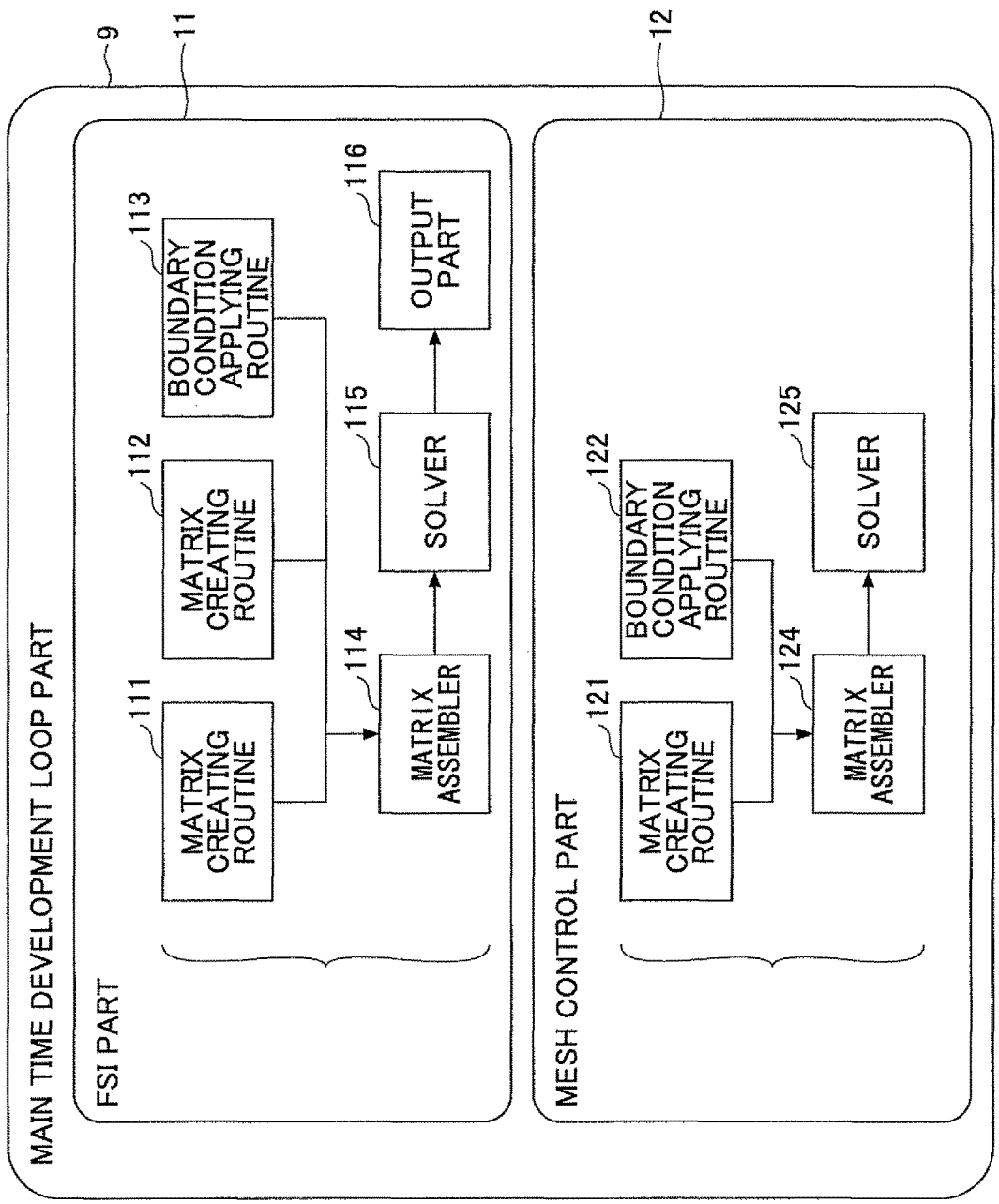
FIG. 2 is a diagram for explaining an example of the structure of the main time development loop part 9 according to the IT type ALE method.
Figure 3:
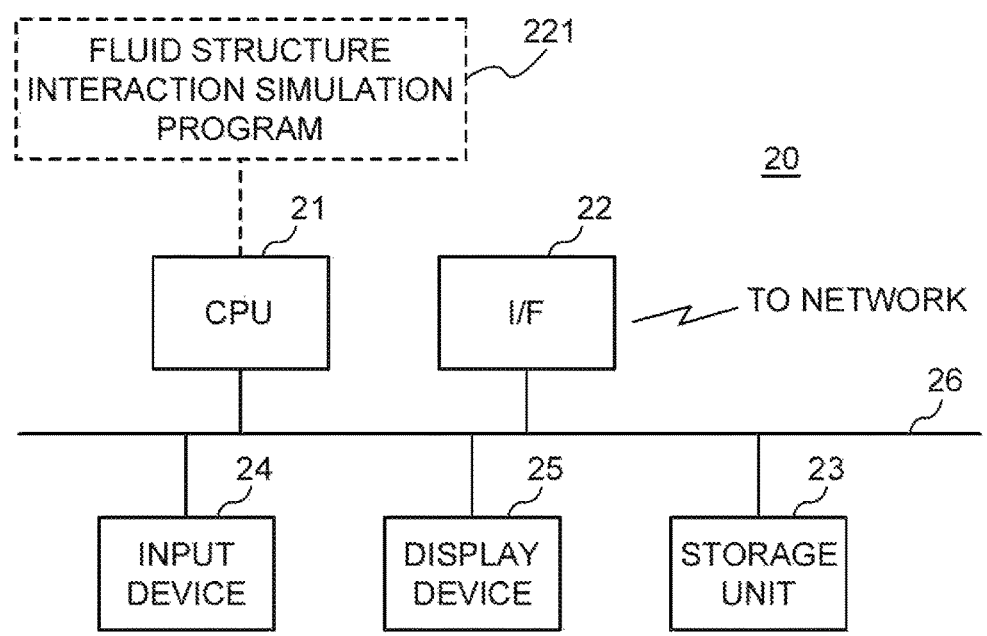
FIG. 3 is a block diagram illustrating an example of a fluid structure interaction simulation apparatus in an embodiment of the present invention.

FIG. 3 is a block diagram illustrating an example of a fluid structure interaction simulation apparatus in an embodiment of the present invention. In this embodiment, the fluid structure interaction simulation apparatus is formed by a computer system. In FIG. 3, a computer system 20 includes a CPU (Central Processing Unit) 21, a network interface (I/F) 22, a storage unit 23, an input device 24 including a keyboard, a mouse, and the like, and a display device 25 that are connected via a bus 26. The CPU 21 controls the entire computer system 20, and executes a fluid structure interaction simulation program 221 in order to realize a fluid structure interaction simulation function. The I/F 22 includes a function to output commands (or requests) and data sent from the computer system 20 to a network (not illustrated), and to input commands and data received from the network to the computer system 20. The storage unit 23 stores various programs including the fluid structure interaction simulation program to be executed by the CPU 21, mesh information of a fluid and a structure represented by meshes, and various data including intermediate data of computations (or operations) executed by the CPU 21. The input device 24 is used by a user to input various commands and data to the CPU 21. The display device 25 displays screens (or menus) urging an operation to be performed by the user, results of simulations and evaluations executed by the CPU 21, and the like.

The storage unit 23 may be formed by any suitable non-transitory (or tangible) computer-readable storage medium. For example, the computer-readable storage medium may include magnetic recording media, optical recording media, magneto-optical recording media, disk drives using recording media in the form of disks, and semiconductor memory devices such as a ROM (Read Only Memory).

First, a description will be given of a fluid structure interaction analysis technique used in this embodiment, by referring to FIGS. 4A through 10B.

In this embodiment, a relation satisfying a viscous operator of a Newtonian Fluid based on Green's theorem of the following formula (1) is regarded as a limiting condition, and the method of Lagrangian multipliers are used, in order to introduce to the analysis a viscous condition at a boundary surface due to viscosity. In the formula (1), $v$ denotes an outward pointing normal unit vector defined on boundaries $\partial\Omega$ of a control volume $\Omega$. For the sake of convenience, a description will be given of an example of a Poisson's equation for an elliptical problem, in order to represent treating of the viscous operator of the Newtonian fluid by a steady problem without an assumption of incompressibility, and a description will thereafter be given of an application to a FSI problem.

$$\int_\Omega [u\Delta v - v\Delta u]dx = \int_{\partial\Omega}[u\nabla v - v\nabla u]\cdot v \, ds \qquad (1)$$

First, a description will be given of an example using the following Poisson's equations (2) and (3).

$$-\mu\Delta v = g(x), x \in \Omega \qquad (2)$$

$$v = V, x \in \partial\Omega \qquad (3)$$

A weak form corresponding to the Poisson's equations (2) and (3) can be represented by the following equation (4).

$$\delta W_p = \int_\Omega [\nabla\delta v \cdot \nabla v - \delta v g(x)]dx = 0 \qquad (4)$$

A case will be considered in which the following boundary condition (5) is applied to a two-dimensional region (thin film) represented by the curved surface $\Sigma$ within the control volume $\Omega$.

$$v = V_s, x \in \Sigma \qquad (5)$$

From the relation of the formula (1), an arbitrary twice continuously differentiable function $\tilde{v}$, whose support is a region in a range of a spatial scale $\kappa$ from the curved surface $\Sigma$, becomes 0 in all support boundaries including curved surface $\Sigma$, and the gradient becomes 0 at support boundaries other than the curved surface $\Sigma$, replace u and the following formula (6) stands.

$$\int_\Omega [\tilde{v}\Delta v - v\Delta \tilde{v}]dx = -\int_\Sigma v \nabla \tilde{v} \cdot v \, ds \qquad (6)$$

In this case, the support of the function $\tilde{v}$ is represented by $\tilde{\Omega} = \text{supp}\tilde{v}$. Further, the following formula (7) can be obtained by assuming $$\int_{\tilde{\Omega}} [\tilde{v}g + \mu v\Delta\tilde{v}]dx = \int_\Sigma \mu v \nabla \tilde{v} \cdot v \, ds \qquad (7)$$

that the strong equation (2) stands.

The following equation (8) can be obtained by using the boundary condition (5) with respect to the formula (7) above.

$$\int_{\tilde{\Omega}} [\tilde{v}g + \mu v\Delta\tilde{v}]dx = \int_\Sigma \mu \tilde{d}\nabla\tilde{v} \cdot v \, ds \qquad (8)$$

When this equation (8) is used as the constraint condition and $\tilde{v}$ is used as the Lagrangian multiplier and the method of Lagrangian multipliers is applied, the following equation (9) to be solved can be obtained $$\delta W_p + \delta J_1 = 0 \qquad (9)$$

Here, the following formulas (10) and (11) stand.

$$J_1 = \int_{\tilde{\Omega}} [\tilde{v}g + \mu v\Delta\tilde{v}]dx - \int_\Sigma \mu \tilde{d}\nabla\tilde{v} \cdot v \, ds \qquad (10)$$

$$\delta J_1 = \int_{\tilde{\Omega}} [\delta\tilde{v}g + \mu\delta v\Delta\tilde{v} + \mu v\Delta\delta\tilde{v}]dx - \int_\Sigma \mu[\delta\tilde{d}\nabla\tilde{v} + \tilde{d}\nabla\delta\tilde{v}]\cdot v \, ds \qquad (11)$$

From the equation (8), it may be seen that, with respect to the Lagrangian multipliers, $\Delta\tilde{v}$ corresponds to the source of the potential placed on a node in a neighborhood of the curved surface $\Sigma$, and that this $\Delta\tilde{v}$ may be adjusted to satisfy the boundary condition (5) on the curved surface $\Sigma$.

FIGS. 4A and 4B are diagrams illustrating numerical solutions to a steady problem (Poisson's equation), that is, the equation (2) and (3) and the condition (5), for a case in which meshes conforming to the curved surface $\Sigma$ are used and a case in which an analysis of the embodiment is used respectively. FIG. 4A illustrates, for comparison purposes, the analysis result for the case in which the meshes conforming to the curved surface $\Sigma$ are used, and FIG. 4B illustrates the analysis result of the embodiment. In each of FIGS. 4A and 4B, an upper portion illustrates the numerical solutions by contour lines (level set) in the neighborhood of the curved surface $\Sigma$ at a central cross section along a depth direction of the domain, and a lower portion illustrates the numerical solutions on a straight line z=const. traversing the curved surface $\Sigma$ within the same cross section used in the upper portion. The ordinate in the graph of the lower portion in each of FIGS. 4A and 4B indicates a solution v, and the abscissa indicates a spatial coordinate x. A computing condition is represented by the following.

$$g(x) = -1.0 \times 10^{-3}, V(x,y,z) = 1.2 - 0.3 \times x (x \in \partial\Omega)$$

It was confirmed that, in the case illustrated in FIG. 4B, the solutions are particularly at ends in the neighborhood of the curved surface are blurred, but the solutions generally match the solutions in the case illustrated in FIG. 4A.

Next, a description will be given of elliptical problems (12) and (13) with respect to a three-dimensional vector-valued function.

$$-2\mu\nabla\cdot D_v = \rho g(x), x \in \Omega, \qquad (12)$$

$$v = V, x \in \Omega \qquad (13)$$

Here, no incompressibility is assumed and no pressure variables are used. A corresponding weak form (14) can be represented as follows.

$$\delta W_v = \int_\Omega [2\mu\delta D_v : D_v - \rho\delta v \cdot g(x)]dx = 0 \qquad (14)$$

In the equation (14), ρ denotes the density of the fluid, and μ denotes the viscosity coefficient of the fluid. The velocity of the fluid is denoted by $v:\Omega \subset R^3 \to R^3$, the velocity gradient of the fluid is denoted by $L_v = v \otimes \nabla = \nabla v$, and the strain rate tensor is defined as $2D_v = L_v + {}^t L_v$. And the notations $\delta L_v = L_{\delta v}$ and $\delta D_v = D_{\delta v}$ are used for easiness to read. In addition, the formula satisfied by the viscous operator corresponding to the formula (1), obtained from the Green's theorem, can be represented as following equation (15).

$$\int_\Omega [\nabla \cdot D_v \cdot u - \nabla \cdot D_u \cdot v] dx = \int_{\partial\Omega} [u \cdot D_v - v \cdot D_u] \cdot v \, ds \quad (15)$$

Similarly as in the case described above, the boundary condition is applied within the domain. That is, if it is assumed that the following formula (16) is applied to the two-dimensional curved surface Σ within the control volume Ω, $$v = V_s, x \in \Sigma \quad (16)$$

the following relation (17) corresponding to the equation (8) can be obtained from the formula (15), in a manner similar to the example of the Poisson's equation.

$$\int_\Omega [\rho g \cdot \tilde{v} + 2\mu \nabla \cdot \tilde{D} v \cdot v] dx = \int_\Sigma 2\mu V_s \cdot \tilde{D}_v \cdot \gamma \, ds \quad (17)$$

When this relation (17) is used as the constraint condition and applied to the method of Lagrangian multipliers, the following equation (18) can be obtained, $$\delta W_v + \delta J_2 = 0 \quad (18)$$

where the following formulas (19) and (20) stand.

$$J_2 = \int_\Omega [\rho g \cdot u + 2\mu \nabla \cdot D_u \cdot v] dx - \int_\Sigma 2\mu V_s \cdot D_u \cdot v \, ds \quad (19)$$

$$\delta J_2 = \int_\Omega [\rho g \cdot \delta u + 2\mu \nabla \cdot \delta D_u + 2\mu \nabla \cdot D_u \cdot \delta v] dx - \int_\Sigma 2\mu V_s \cdot \delta D_u \cdot v \, ds \quad (20)$$

FIGS. 5A and 5B are diagrams illustrating numerical solutions to a steady problem (viscous operator) for the case in which meshes conforming to the curved surface Σ are used and the case in which the analysis of the embodiment is used respectively. FIGS. 5A and 5B illustrate the results of numerical simulations for the case in which $p=1.0\times10^3$, $\mu=3.8\times10^{-3}$; $g(x)={}^t(0, 0, -9.8)$, and the boundary condition is such that $V={}^t(0.5, 0, 0)$ is uniformly applied only to the upper and lower boundaries z=0, 0.024. FIG. 5A illustrates, for comparison purposes, the analysis result for the case in which the meshes conforming to the curved surface Σ are used, and FIG. 5B illustrates the analysis result of the embodiment. In each of FIGS. 5A and 5B, a left portion illustrates the velocity at a central cross section along a depth direction of the domain, and a right portion illustrates a profile of the solutions on a straight line x=const. traversing the curved surface Σ within the same cross section used in the left portion. The ordinate in the graph of the right portion in each of FIGS. 5A and 5B indicates a spatial coordinate in a direction perpendicular to the curved surface Σ, and the abscissa indicates a x-component of a dependent variable v. When compared to the numerical solutions illustrated in FIG. 5A, the numerical solutions illustrated in FIG. 5B are affected by the boundary condition of the curved surface Y: in a slightly wider range in the neighborhood of the curved surface Σ. However, it was confirmed that the numerical solutions illustrated in FIG. 5B also reproduce the bend in the solutions on the curved surface Σ and approximately matches the solutions illustrated in FIG. 5A.

Next, a description will be given of the application of the analysis technique of this embodiment to the fluid structure interaction problem. In this case, the governing equation solely for the fluid is the Navier-Stokes equation, and the following formulas (21), (22), and (23) can be obtained by denoting the pressure by p, and the Cauchy stress by $T = -pI + 2\mu D_v$.

$$\rho \left( \frac{\partial v}{\partial t} + v \cdot \nabla v \right) = \nabla \cdot T + \rho g, x \in \Omega \quad (21)$$

$$\nabla \cdot v = 0, x \in \Omega \quad (22)$$

$$v = V, x \in \partial\Omega \quad (23)$$

The weak form can be represented by the following formula (24) by representing a boundary where a stress τ is applied by Γ.

$$\delta W_f := \int_\Omega \left[ \rho \delta v \cdot \left( \frac{\partial v}{\partial t} + v \cdot \nabla v \right) - (p \nabla \cdot \delta v - \delta p \nabla \cdot v) + 2\mu \delta D_v : D_v - \rho \delta v \cdot g \right] dx + \int_\Gamma \delta v \cdot \tau \, ds = 0 \quad (24)$$

Similarly, the strong equation solely for the structure can be represented by the following formula (25) by using the Lagrangian coordinate X, representing the displacement by d, the Green-Lagrange strain by E, and the second Piola-Kirchhoff stress by S, where $d = x - Z$, $F = \partial x / \partial X$, $S = JF^{-1} TF^{-T}$, and $J = \det F$.

$$\rho_s \frac{d^2 d}{dt^2} = \nabla x \cdot (S \cdot F^T) + \rho_s f \quad (25)$$

The corresponding weak form can be represented by the following formula (26) by representing a boundary where a stress $\tau_s$ is applied by $\Gamma_X$.

$$\delta W_s := \int_\Sigma 0 [\rho_s \delta d \cdot \ddot{d} + S : \delta E - \rho_s g \cdot \delta d] dX - \int_{\Gamma_X} \tau_s \cdot \delta d \, ds = 0 \quad (26)$$

Suppose that the following viscous boundary condition (27), in which the velocity of the structure and the velocity of the fluid match as the boundary condition, is applied on the two-dimensional curved surface Σ within the control volume ω.

$$v = \dot{d}, x \in \Sigma \quad (27)$$

If the strong equation of the fluid structure interaction is separately represented by a viscous term and a term other than the viscous term, the following representation can be made.

$$-2\mu \nabla \cdot D_v = \rho G, G = ((v_t - g) + v \cdot \nabla v) + \nabla p / \rho$$

Hence, the following formula (28) can be used as the constraint condition in place of the relation (17) described above.

$$\int_\Omega \rho G \cdot [\tilde{v} + 2\mu \nabla \cdot \tilde{D}_v] dx = \int_\Sigma 2\mu \dot{d} \cdot \tilde{D}_v \cdot v \, ds \quad (28)$$

Furthermore, in the case of the fluid structure interaction problem, the constraint condition of the incompressibility condition that realizes the discontinuity of the pressure as proposed in Hisada et al. may be used, for example. That is, because the incompressibility condition $\nabla \cdot v = 0$ should stand even in the arbitrary region before or after the curved surface Σ, the following formula (29) stands, using an arbitrary continuously differentiable function other than Σ, whose support is the range of a spatial scale κ from the curved surface Σ. In other words, the continuously differentiable function have a value 0 at the support boundary other than Σ, vary its value discontinuously before and after Σ as in the case of a function $\tilde{p}$ illustrated in FIG. 10A.

$$\int_\Omega \tilde{p}\nabla v dx = -\int_\Omega \nabla \tilde{p}\cdot v dx + \int_\Sigma \tilde{p} v \cdot v ds \quad (29)$$

Hence, the viscous boundary condition (27) is applied to the weak form of the incompressibility condition in order to obtain the following constraint condition (30).

$$\int_\Omega \nabla \tilde{p}\cdot v dx = \int_\Sigma \tilde{p}\dot{d}\cdot v ds \quad (30)$$

The equation (31) to be solved can be obtained in the following manner by regarding a relation of the two constraint conditions (28) and (30) as the constraint condition, and formally applying the Lagrangian multipliers.

$$\delta W_f + \delta W_s + \delta J_v + \delta J_p = 0 \quad (31)$$

Here, the following formula (32) stands, and the following variation (33) can be obtained.

$$J_p := \int_\Omega \nabla \tilde{p}\cdot v dx - \int_\Sigma \tilde{p}\dot{d}\cdot v ds \quad (32)$$

$$\delta J_p := \int_\Omega \nabla \delta \tilde{p}\cdot v dx - \int_\Sigma \delta\tilde{p}\dot{d}\cdot v ds + \int_\Omega \nabla \tilde{p}\cdot \delta v dx - \int_\Sigma \tilde{p}\delta\dot{d}\cdot v ds \quad (33)$$

In addition, the following formula (34) stands, and the following formula (35) can be obtained from the variation by assuming that G is not dependent on v or p.

$$J_v := \int_\Omega [\rho G \cdot \tilde{v} + 2\mu \nabla \cdot \tilde{D}_v \cdot v] dx - \int_\Sigma 2\mu \dot{d} \cdot \tilde{D}_v \cdot v ds, \quad (34)$$

$$\delta J_v := \int_\Omega [\rho G \cdot \delta \tilde{v} + 2\mu \nabla \cdot \delta \tilde{D}_v \cdot v] dx - \int_\Sigma 2\mu \dot{d} \cdot \delta \tilde{D}_v \cdot v ds + \int_\Omega 2\mu \nabla \cdot \tilde{D}_v \cdot \delta v dx - \int_\Sigma 2\mu \delta \dot{d} \cdot \tilde{D}_v \cdot v ds \quad (35)$$

Figure 6:
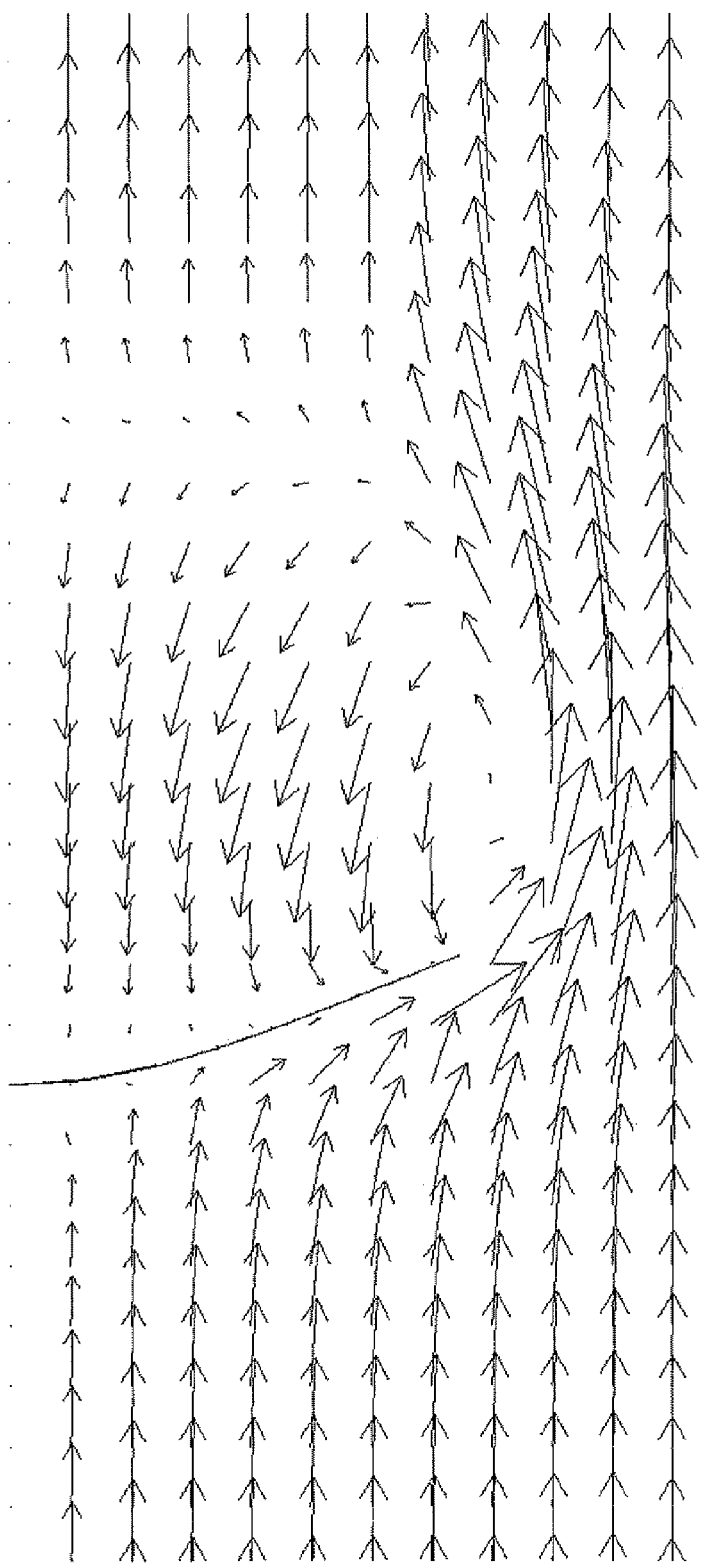
FIG. 6 is a diagram illustrating an example of a FSI simulation result using the ALE method.
Figure 7:
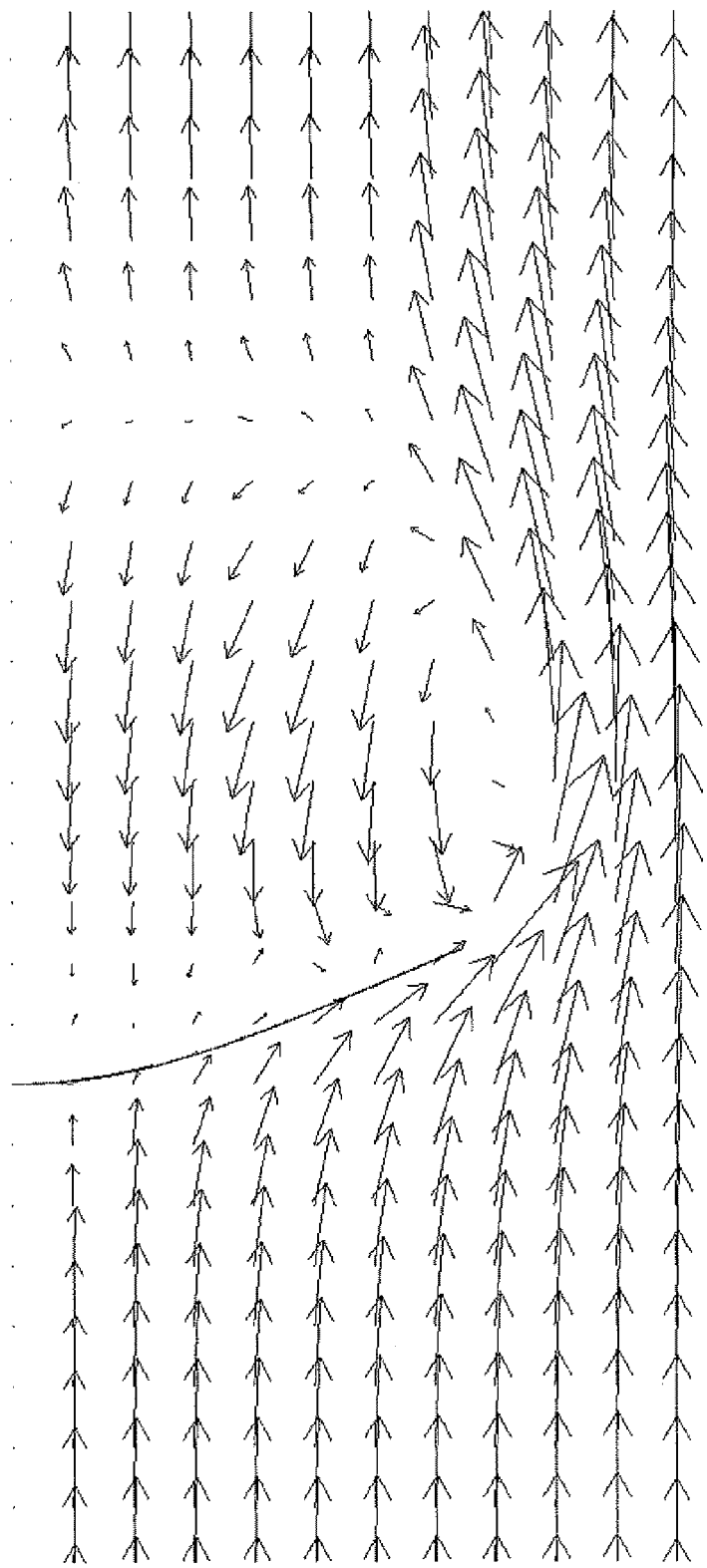
FIG. 7 is a diagram illustrating an example of a FSI simulation result in the embodiment.
Figure 8:
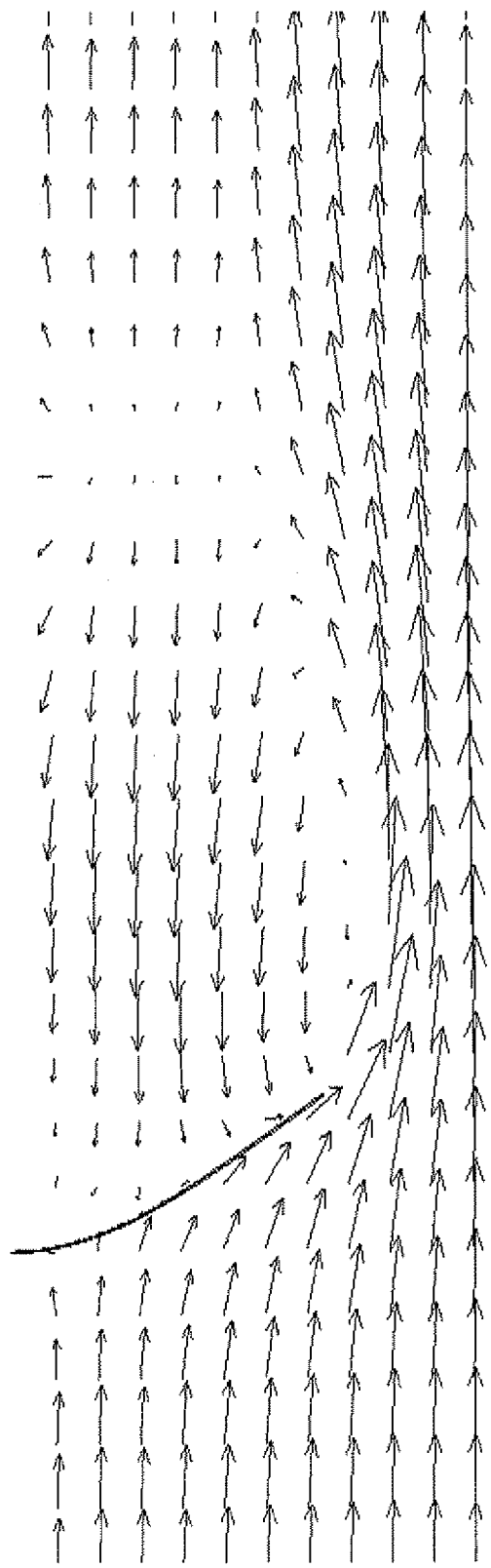
FIG. 8 is a diagram illustrating an example of a simulation result for a case in which only a constraint condition based on an incompressibility condition is applied.

FIG. 6 is a diagram illustrating an example of a FSI simulation result (numerical solution v) using the ALE method with respect to the above described problem. FIG. 7 is a diagram illustrating an example of a FSI simulation result (numerical solution v) in the embodiment. FIG. 8 is a diagram illustrating, for comparison purposes, an example of a simulation result (numerical solution v) for a case in which only the constraint condition (30) based on the incompressibility condition of Hisada et al. is applied. In FIGS. 6 through 8, it is assumed that the fluid flow hits a fabric divider (that is, the curved surface Σ) contacting the upper end and placed perpendicularly to the paper surface, and pushes and displaces the curved surface Σ while generating a vortex in a wake. Hence, FIGS. 6 through 8 illustrate snap-shots observed at a time when the displacement of the curved surface Σ becomes constant, and indicate the velocity at the central cross section along the depth direction of the domain. The plotting condition is the same for each of FIGS. 6 through 8.

Compared to the simulation result illustrated in FIG. 8, the simulation result illustrated in FIG. 7 has a small velocity in the tangential direction in the neighborhood of the surface of the curved surface Σ, and it was confirmed that the viscous condition of the viscosity is satisfied. In the simulation result illustrated in FIG. 7, the velocity at the wake of the curved surface Σ is relatively strong, but it was confirmed that the direction of the flow and the displacement of the curved surface Σ approach those of the simulation result illustrated in FIG. 6 and that an improvement is observed when compared to the simulation result illustrated in FIG. 8.

FIG. 9 is a diagram illustrating time variations of the x-component of the displacement d at the center of the lower end of the curved surface Σ in respective simulations for cases in which the ALE method is applied, the embodiment is applied, and only the constraint condition (30) based on the incompressibility condition of Hisada et al. is applied. In FIG. 9, the ordinate indicates the x-component of the displacement d, and the abscissa indicates the time t. In FIG. 9, $I_A$ indicates the displacement for the case in which the ALE method is applied, $I_B$ indicates the displacement for the case in which the embodiment is applied, and $I_C$ indicates the displacement for the case in which only the constraint condition (30) based on the incompressibility condition is applied. The computing condition for the simulation results illustrated in FIGS. 6 through 9 is $\rho=1.0\times10^3$, $\mu=3.8\times10^{-3}$, $\rho_s=200$, g=0, and the boundary condition $V^T=(0.3, 0, 0)$ was uniformly applied only at the left end x=0.

The finite element of the fluid may be discretised using hexa elements or tetra elements having bubble nodes of the velocity. The thin film may use a DKT (Discrete Kirchhoff Triangular) shell elements. The node of Lagrangian multipliers of the pressure and the velocity are arranged at the centers of the shell elements. Especially the nodes of $\tilde{v}$ is arranged on both top and bottom surfaces of the curved surface Σ, in order to realize the viscous condition for each of the top and bottom surfaces. The scale (or element size) of the support of the basis function of the Lagrangian multipliers may be approximately the same as the scale of the shell size.

FIGS. 10A and 10B are diagrams for explaining the basis function of the pressure and the velocity in the embodiment. FIG. 10A illustrates a basis function $\tilde{\delta}$ of the pressure, and FIG. 10B illustrates a basis function $\tilde{\gamma}$ of the velocity. The following formulas (36) and (37) are used for the interpolation.

$$\tilde{p} = \int_\Sigma \tilde{p}_0(y)\tilde{\delta}(x-y:n(y))dy \quad (36)$$

$$\tilde{v}^\pm = \int_\Sigma \tilde{v}_0^\pm(y)\tilde{\gamma}(x-y:\pm n(y))dy, \tilde{v} = \tilde{v}^+ + \tilde{v}^- \quad (37)$$

Hence, in this embodiment, the fluid structure interaction simulation that does not depend on the mesh consistency is performed based on the relation that applies the Green's theorem with respect to the viscous operator of the Newtonian fluid. A comparison study was made between this embodiment and the generally used IT type ALE method, with respect to the interaction of the thin film structure using the shell elements. As a result of this comparison study, it was confirmed that the use of this embodiment satisfies the viscous condition at the structure boundary, and that the flow and the displacement of the structure reproducible by this embodiment are closer to those of the simulation result of the ALE method than the conventional techniques. In addition, in the case of the method of Lagrangian multipliers using the interpolation by the basis function with the general fluid elements, it was confirmed that this embodiment may suppress the back flow of the fluid that may otherwise be generated depending on the viscous condition.

Next, a more detailed description will be given of the fluid structure interaction simulation of this embodmient, by referring to FIG. 11 and subsequent figures. As described above, this embodiment performs the IC (Interface-Capturing) type numerical simulation with respect to the interaction of the fluid and the structure. Such an interaction may include the interaction of the structure that may be treated as a thin film, such as a baloon, a soap film, a fabric divider, and a flag, and the surrounding fluid, and the interaction of the structure that may be treated as a rigid body, an elastic body having a thickness such as a heart muscle, and the fluid on the inner side or the outer side of the structure. The finite elements of structures, such as a ribbon and a beam, that may not be defined by a two-dimensional surface, are not simulation targets of this embodiment.

The fluid structure interaction simulation method of this embodiment may include the following procedures (or steps) ST1 through ST3.

Procedure ST1: The interaction boundary of the fluid region and the structure becomes a moving boundary (or free boundary), and the finite element that follows the displacement of the structure in motion and moves is defined on the top and bottom surfaces of this moving boundary. In other words, the correcting functions of the pressure and the velocity of the fluid, having a non-zero value only within the finite element, are defined.

Procedure ST2: In order for the defined correcting functions to be able to represent the discontinuity of the pressure and the velocity gradient while mediating the interaction of the fluid and the structure, conditions are applied to a region having a value, that is support of correcting functions, and values of functions and derived functions on the structure or the element boundary, and the like.

Procedure ST3: In order to represent the interaction of the fluid and the structure, a weak form in which a boundary integral on the structure explicitly appears is used. This weak form is different from the weak form used in the conventional fluid structure interaction simulation. This weak form used in this procedure is based on the Green's theorem, and is derived from the incompressibility condition of fluid and the relation satisfied by the viscous operator of the fluid.

In the fluid structure interaction simulation, the finite element that follows the displacement of the structure in motion and moves is defined. The correcting functions capable of representing the viscous condition at the boundary of the fluid and the structure and the discontinuity of the pressure and the velocity gradient at the top and bottom surfaces of the structure is introduced, while satisfying the incompressibility and the continuity of the velocity, in order to mediate the interaction of the displacement d of the structure, and the pressure p and the velocity v of the fluid. In the following description, the finite element that is defined in this manner will be referred to as an IME (Interaction Mediating Element).

In addition, the constraint condition based on the Green's theorem is introduced, in order to represent the correcting functions described above and the interaction of the fluid and the structure. By applying the viscous boundary condition to the surface integral which appears explicitly on the interaction boundary, the constraint condition makes it possible to realize the interaction of the fluid and the structure mediated by the correcting functions. In other words, this embodiment defines the weak form and the weak solution. The Green's theorem generalizes the integration by part, and may be represented in the following manner, where v denotes the outward pointing unit normal vector of the control volume.

$$\int_\Omega u \frac{\partial v}{\partial x} dx = -\int_\Omega \frac{\partial u}{\partial x} v dx + \int_{\partial \Omega} u v \nu ds.$$

In this specification, the relation (1) with respect to the Laplacian and the relation (15) with respect to the viscous operator of the Newtonian fluid, that are obtained using the above described relation, will be generally referred to as the Green's theorem unless otherwise indicated.

Figure 11A:
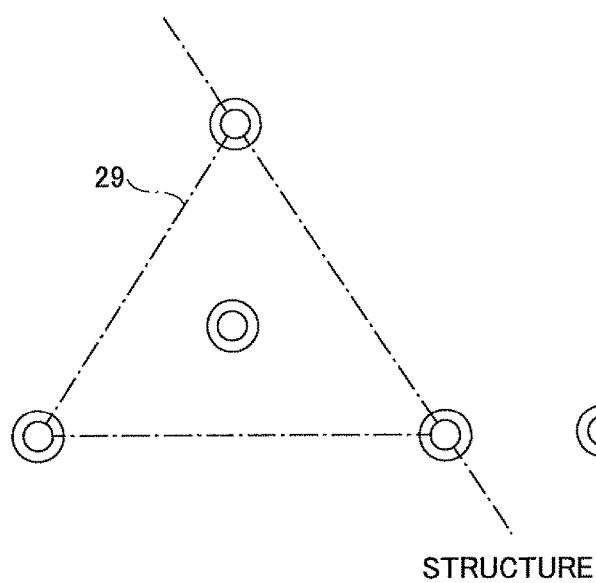
FIGS. 11A and 11B are diagrams for explaining an independence of a degree of freedom of each finite element for a two-dimensional triangular element respectively.
Figure 11B:
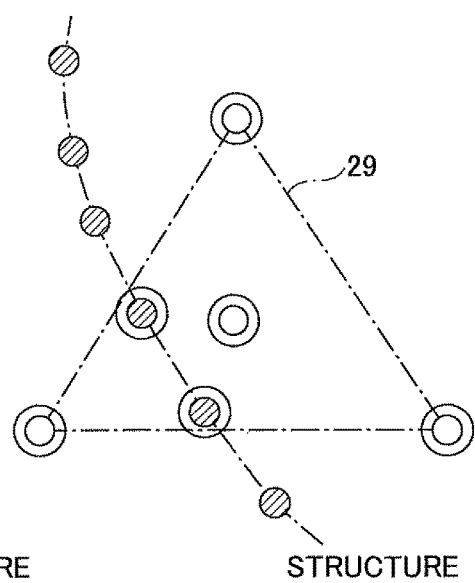

FIGS. 11A and 11B are diagrams for explaining an independence of the degree of freedom of each finite element for a two-dimensional triangular element. In FIGS. 11A and 11B, each node is indicated by a circular symbol, and for each element of a fluid mesh 29, only the node having the interaction is indicated by a double circular symbol, and the node of the structure not shared with the fluid is indicated by a circular symbol with hatchings. FIG. 11A illustrates the case in which the ALE method is applied, and FIG. 11B illustrates the case in which the embodiment is applied.

In the case illustrated in FIG. 11A, the edge of the triangular element forming the fluid part and the edge of the element forming the structure match, and the nodes on the edge are shared by the two elements. Thus, the interaction is closed between the degrees of freedom in units of the triangular elements. For this reason, the meshes of the fluid and the structure must constantly be matched to achieve mesh consistency in the case in which the ALE method is applied.

On the other hand, in the case illustrated in FIG. 11B, the structure exists independently of the triangular element forming the fluid part. In this case, a set of the nodes having the interaction between the fluid and the structure changes for each time step (or discrete time) depending on the displacement of the structure, because of the independence of the degrees of freedom of each of the finite elements (that is, because of the non-dependence on the mesh consistency). For this reason, a search may be made with respect to a part where the fluid and the structure overlap, in order to determine the set of the nodes having the interaction between the fluid and the structure. In other words, the elements may be defined as the set of nodes having such an interaction. Accordingly, in the case in which the embodiment is applied, the simulation may be performed in the mesh mismatch state in which the meshes of the fluid and the structure do not match.

In this embodiment, the IME, that mediates the interaction between the fluid and the structure arranged on the structure surface, enables the simulation to be executed in the mesh mismatch state. The constraint condition dependent on the incompressibility and the relation satisfying the viscous operator of the fluid are used for the interaction of the fluid and the structure, based on the Green's theorem.

Figure 12B:
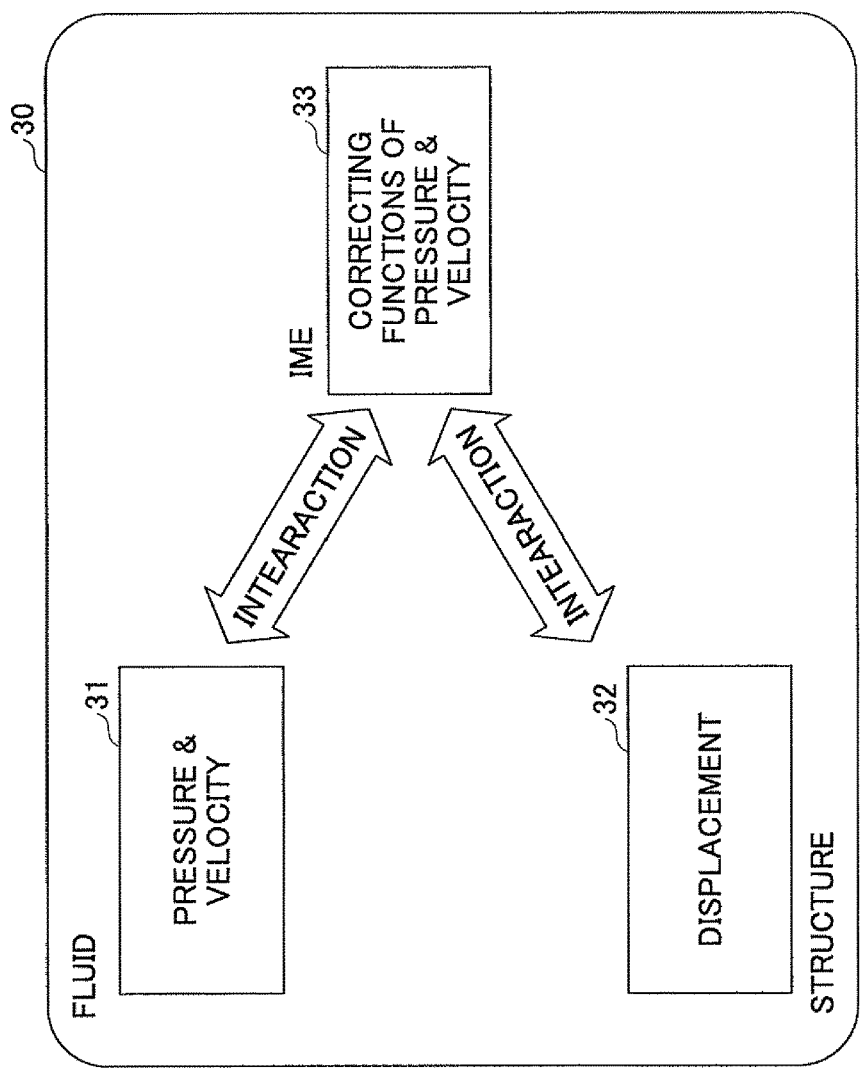
FIGS. 12A and 12B are diagrams for explaining a fluid and structure interaction.
Figure 12A:
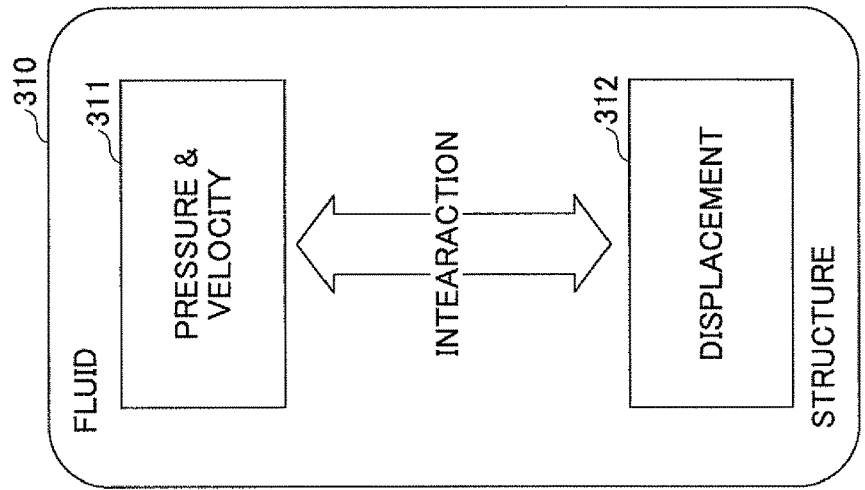

FIGS. 12A and 12B are diagrams for explaining a fluid and structure interaction. FIG. 12A illustrates the interaction of the fluid and the structure using the ALE method, and FIG. 12B illustrates the interaction of the fluid and the structure using the embodiment.

As illustrated in FIG. 12A, in an interaction process 310 using the ALE method, the set of interacting nodes are closed (that is, finite elements) for each of small regions segmenting (or discretising) respective regions of a fluid 311 and a structure 312 is a non-overlapping manner, and the degrees of freedom of the nodes interact. The degree of freedom of the node is, for example, the pressure p and the velocity v in the case of the fluid 311, and is the displacement d or the like in the case of the structure 312.

On the other hand, as illustrated in FIG. 12B, in an interaction process 30 using this embodiment, the degree of freedom of a fluid 31 and the degree of freedom of a structure 32 do not interact directly. An IME 33 that mediates the interaction is defined on the structure 32 in motion, and the correcting functions are defined within the IME 33 for the pressure and the velocity of the fluid 31. In other words, the IME 33, that is a finite element moving in accordance with the displacement of the structure 32, is arranged on the boundary of the structure 32, and the correcting functions with respect to the pressure and the velocity of the fluid 31 are defined within the IME 33. These correcting functions interact with the velocity of the fluid 31 defined in the global domain and the displacement of the structure 32. In addition, the correcting functions are Lagrangian multipliers, as the limiting condition, whose constraints are the incompressibility condition of the fluid 31 in the neighborhood of the boundary of the fluid 31 and the structure 32 and the relation satisfied by the viscous operator of the Newtonian fluid, based on the Green' theorem. Because the IME 33 moves by following the displacement of the structure 32, an interaction pair formed by the IME 33 and the degree of freedom of the structure 32 does not change, but an interaction pair of the IME 33 and the degree of freedom of the fluid 31 changes as the IME 33 moves every moment. Hence, a background fluid element that overlaps the IME 33 is searched, in order to determine the interaction pair with the IME 33 from the fluid node that is a member of the fluid element. The IC type numerical simulation, that is, the fluid structure interaction simulation, can be executed based on the interaction pair that is determined in this manner. Each degree of freedom of the fluid 31 may recognize the interaction boundary with the structure 32 in motion through the IME 33, and an appropriate interaction may be obtained, to thereby eliminate the dependence on the mesh consistency of the meshes of the fluid 31 and the structure 32.

Figure 13:
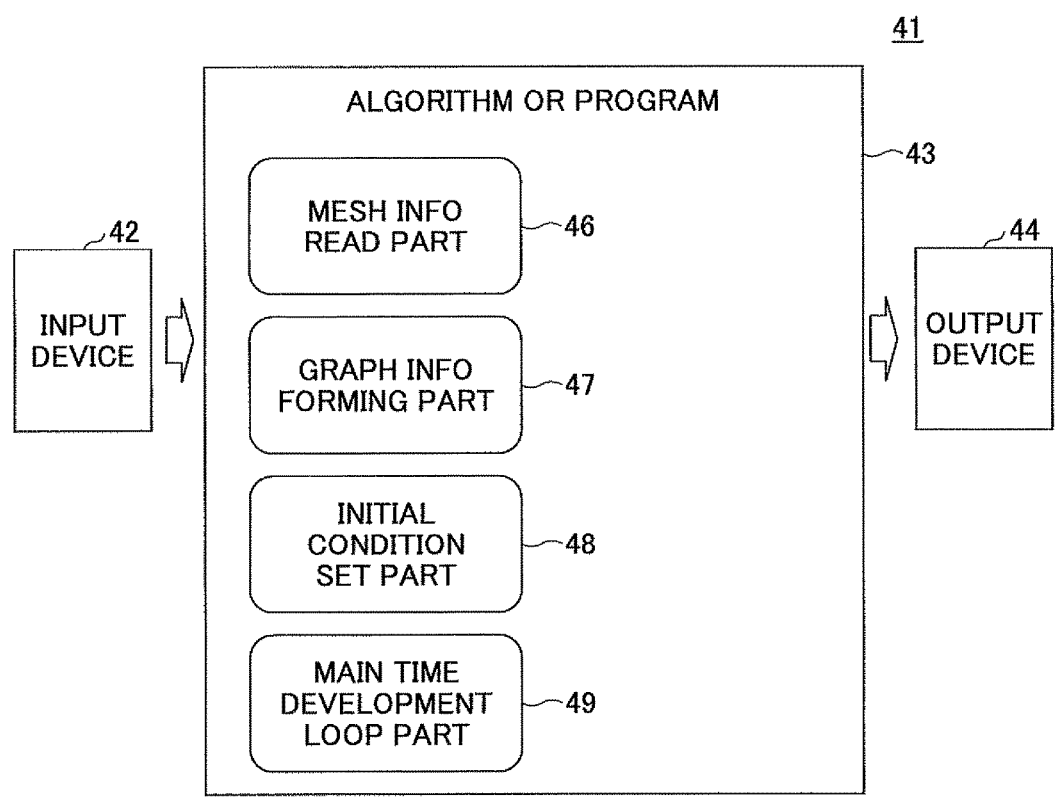
FIG. 13 is a diagram for explaining an IC type numerical simulation in the embodiment.

FIG. 13 is a diagram for explaining an IC type numerical simulation in the embodiment. The algorithm or the program of the IC type numerical simulation is executed by a computer system 41 illustrated in FIG. 13. The computer system 41 includes an input device 42, a computer 43, and an output device 44. The input device 42 may be formed by at least one of the input device 24 and the I/F 22 illustrated in FIG. 3, for example. The input device 42 inputs the physical constants (for example, the viscosity and density, Young's modulus, etc.) of the fluid and the structure and the initial condition, the computing region (or domain) and the mesh information to the computer 43. The output device 44 may be formed by the display device 25 illustrated in FIG. 3, for example. The output device 44 may output, as the simulation result, the numerical information of the degrees of freedom of the pressure and the velocity of the fluid and the displacement of the structure computed by the computer 43 at each discrete time step, the visualization information, and the like. This embodiment, unlike the case in which the ALE method is used, creates the graph (or connectivity) of the meshes for both the fluid and the structure, and separately creates the graph for the two-dimensional element forming the interaction boundary of the fluid and the structure when creating the graph of the meshes if the structure has a three-dimensional distribution. The structure has the three-dimensional structure when the element has a volume, that is, when the element does not relate to a two-dimensional "surface" such as the shell and the film element.

The IC type numerical simulation algorithm or program includes a mesh information read part 46 to execute a mesh information read process that reads the mesh information from the input device 42, a graph information forming part 47 to execute a graph information forming process that forms the graph information called the connectivity among nodes of discretised computing regions (that is, a node list forming finite elements) for both the fluid and the structure, an initial condition set part 48 to execute an initial condition setting process that sets the initial condition, and a main time development loop part 49 to execute a main time development loop process that repeats the N time steps.

Figure 14:
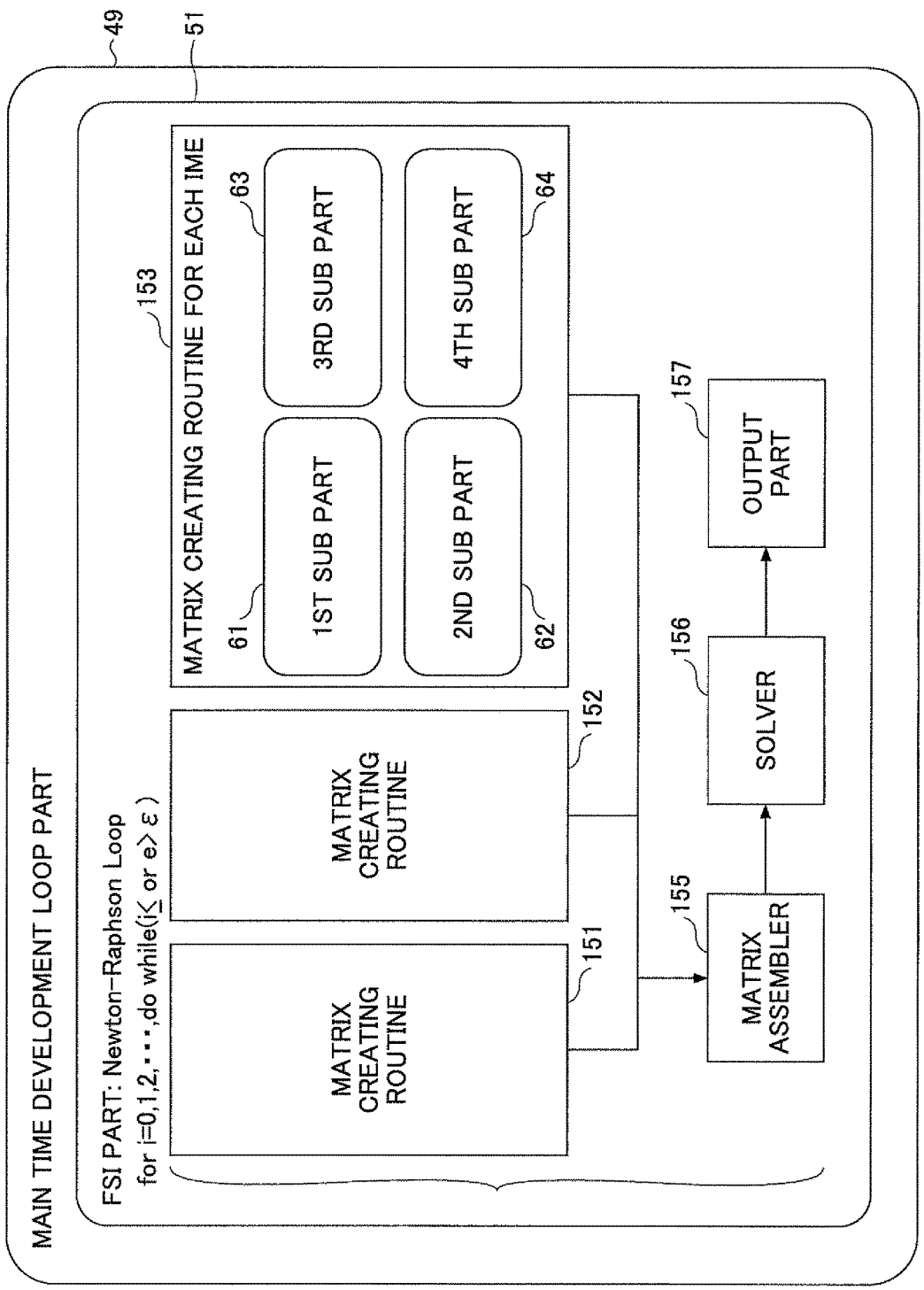
FIG. 14 is a diagram for explaining an example of a structure of a main time development loop part of the IC type embodiment.

FIG. 14 is a diagram for explaining an example of a structure of the main time development loop part of the IC type embodiment. The main time development loop part 49 includes a FSI part 51. The FSI part 51 simulates the physical phenomena. The FSI part 51 includes a matrix creating routine 151 to create a small matrix and an equivalent nodal force for each element of the structure in correspondence with the time discretization technique, a matrix creating routine 152 to create a small matrix and an equivalent nodal force for each element of the fluid in correspondence with the time discretization technique, a matrix creating routine 153 to create a matrix representing the interaction of the velocity, pressure, and the correcting functions for each IME, a matrix assembler routine 155 to create a matrix equation with respect to all degrees of freedom by restructuring the contribution from the small matrices for each element obtained from the routines 151, 152, and 153, a linear solver 156 to solve and evaluate a variation of dependent variables (pressure, velocity, displacement, etc.) of the fluid and the structure every time a Newton-Raphson loop within the FSI part 51 is executed, and an output part 157 to output, by displaying, for example, the variation of the dependent variables and the evaluation thereof obtained by the linear solver 156.

A boundary condition applying part within the matrix creating part 153 includes modules 61 through 64 representing the interaction of the correcting functions and the displacement of the structure. The IME that moves by following the displacement of the structure in motion is generated by the modules 61 through 64, and the isolation of the meshes of the fluid and the structure (that is, the non-dependence on the mesh consistency) is realized. In the following description, the modules 61 through 64 will be referred to as sub parts 61 through 64 for the sake of convenience.

The first sub part 61 computes an interaction matrix of the correcting function of the pressure and the velocity of the fluid. The second sub part 62 computes an interaction matrix of the correcting function of the velocity and the velocity of the fluid. The third sub part 63 computes an interaction matrix of the correcting function of the pressure and the displacement velocity of the structure. The fourth sub part 64 computes an interaction matrix of the correcting function of the pressure and the displacement velocity of the structure. In the following description, the same designations are used as in the above description, such that the fluid region (or control volume) is denoted by $\Omega$, and the interaction boundary (that is, curved surface) of the fluid and the structure, that becomes the moving boundary (or free boundary) amongst the boundaries $\partial\Omega$, is denoted by $\Sigma$.

Figure 15:
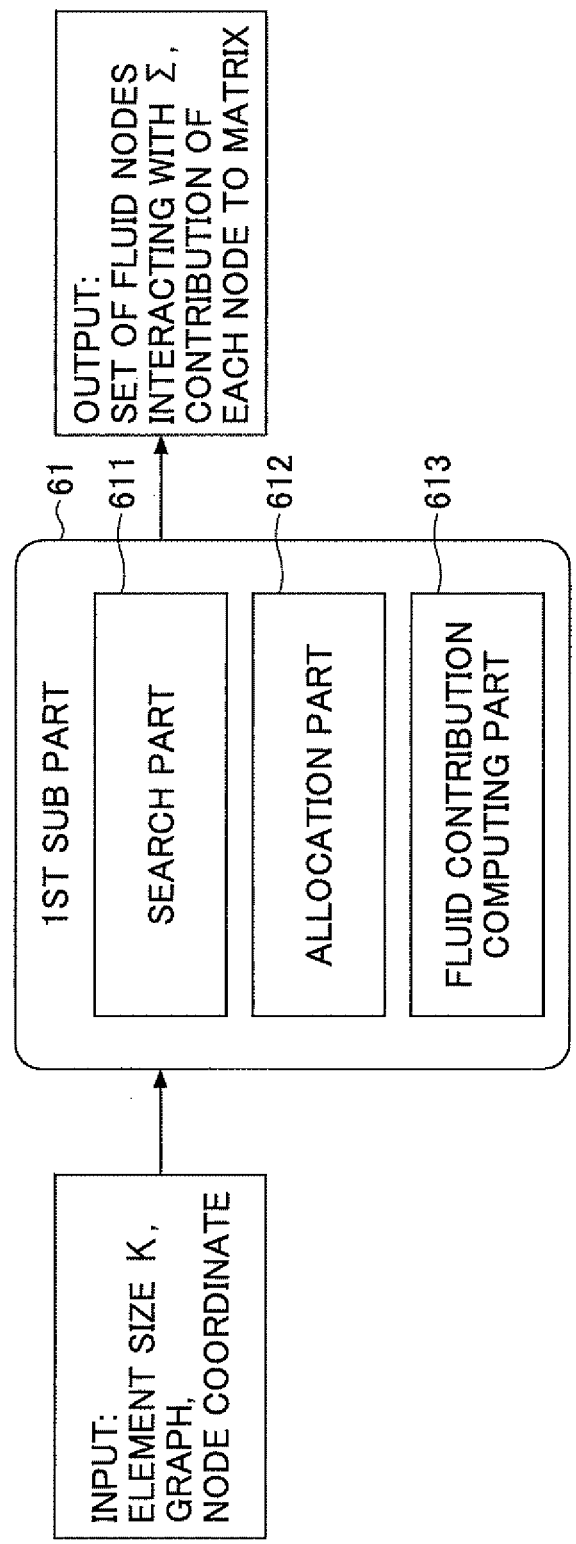
FIG. 15 is a diagram illustrating an example of a structure of a first sub part.

FIG. 15 is a diagram illustrating an example of a composition of the first sub part 61. The size (or spatial scale) $\kappa$, the graph (or connectivity) of each of the meshes in the fluid region and the structure region that is created in advance, and the node coordinate are input to the first sub part 61. The first sub part 61 includes a search part 611, an allocation part 612, and a fluid contribution computing part 613. The search part 611 searches for a set of fluid nodes that are interacted upon by the finite element that moves by following the displacement of the structure, which finite element is defined for each two-dimensional element forming the interaction boundary $\Sigma$ of the fluid and the structure. The allocation part 612 allocates a memory region that is required based on a search result of the search part 611. The fluid contribution computing part 613 computes the contribution of the matrix to the degree of freedom of each node.

In this embodiment, the displacement of the structure is determined independently of the meshes of the fluid, and the list of fluid nodes that are interacted upon by the IME differs every time the time development and the Newton-Raphson loop is executed. Hence, in order to create the matrix for each element, the search is performed to update the list of interacting nodes. The search part 611 uses the cell index method (or bucket sorting method) to perform the search. The cell index method segments (or discretises) the domain Ω into rectangular cells, and all elements are made to correspond to the cells according to the coordinate of the center of volume, in order to perform the search in units of cells. Thus, the search part 611 determines the number of fluid nodes to which each IME interacts. More particularly, in the case in which the integration is performed using the integral points arranged discretely within the IME, the fluid element to be included is searched using the cell index method for each of the integral points, and the number of velocity nodes that are constituent members of the fluid element is counted. In a case in which the integration is performed using the Gaussian quadrature for each of the fluid elements defined in the global domain, a confirmation is made to determine whether the IME includes the integral points of the Gaussian quadrature of the fluid elements included in peripheral cells surrounding a central cell that includes the center of volume of the IME, and the number of velocity nodes that are constituent members of the fluid element is counted if the IME includes the integral points of the Gaussian quadrature of the fluid elements included in the peripheral cells. Accordingly, with respect to each IME defined for each of the two-dimensional elements forming the interaction boundary Σ, the search part 611 executes procedures (or processes) of (s1) obtaining the integral point coordinate within the IME moving together with the interaction boundary, (s2) searching the fluid element including the integral points, and (s3) counting the fluid nodes (or the degrees of freedom) that are members of the searched fluid element as the interaction nodes without overlap, based on the graph information of the meshes. Alternatively, the search part 611 executes procedures (or processes) of (s1') obtaining the coordinate of the center of volume of the IME moving together with the interaction boundary, (s2') searching the fluid element surrounding the center of volume from the center of volume, and (s3') counting the fluid nodes (or the degrees of freedom) that are members of the searched fluid element as the interaction nodes without overlap, if the IME includes the Gaussian quadrature points of the fluid element.

The allocation part 612 allocates the memory region to store the contribution to the matrix, based on the number of interaction nodes counted in the search part 611.

The fluid contribution computing part 613 performs a process similar to that performed by the search part 611, in order to create a list of the interacting fluid nodes for each IME, and simultaneously computes the contribution to the interaction matrix. Accordingly, in a case in which the integration is performed using the integral points discretely arranged within the IME, the search part 611, with respect to each IME defined for each of the two-dimensional elements forming the interaction boundary Σ, executes procedures (or processes) of (s11) obtaining the integral point coordinate within the IME moving together with the interaction boundary, (s12) searching the fluid element including the integral points, (s13) storing the fluid nodes (or the degrees of freedom) that are members of the searched fluid element in the memory based on the graph information of the meshes, (s14) obtaining the basis function value and the derived function at the integral points, and (s15) adding the contributions to the small matrix within the element. Alternatively, in a case in which the integration is performed using the Gaussian quadrature for each of the fluid elements defined in the global domain, the fluid contribution computing part 613 executes procedures (or processes) of (s11') obtaining the coordinate of the center of volume of the IME moving together with the interaction boundary, (s12') searching the fluid element surrounding the center of volume from the center of volume, (s13') storing the fluid nodes (or the degrees of freedom) that are members of the searched fluid element in the memory based on the graph information of the meshes, if the IME includes the Gaussian quadrature points of the fluid element, (S14') obtaining the basis function value and the derived function at the integral points, and (s15') adding the contributions to the small matrix within the element.

The memory described above, and each of the memories described hereunder may be formed by the storage unit 23 illustrated in FIG. 3, for example. Hence, it is possible to create the small matrix for each element, representing the interaction of the correcting function of the pressure and the velocity of the fluid defined in the global domain.

Figure 16:
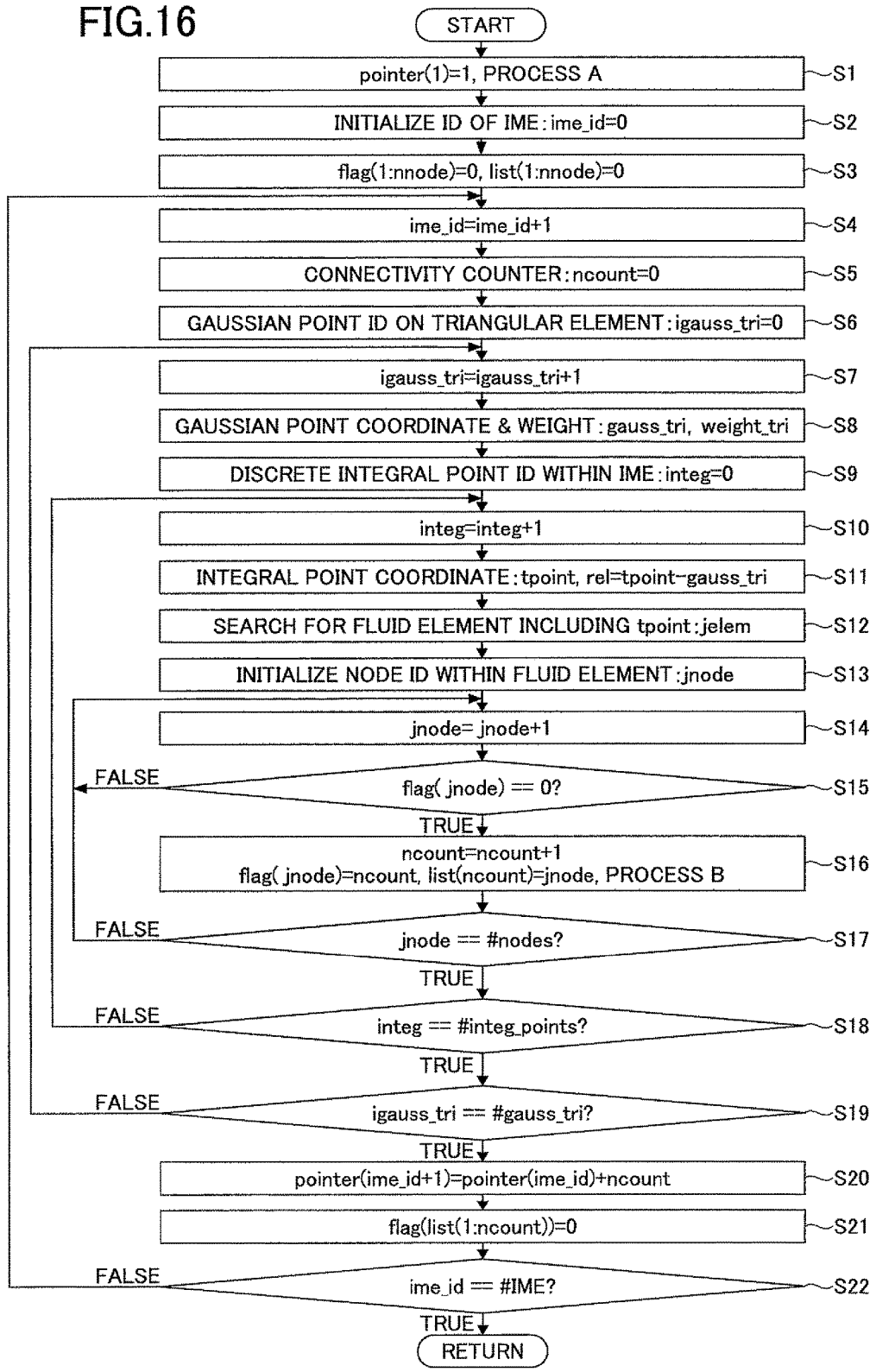
FIG. 16 is a flow chart for explaining an operation of first and second sub parts.
Figures 17, 18:
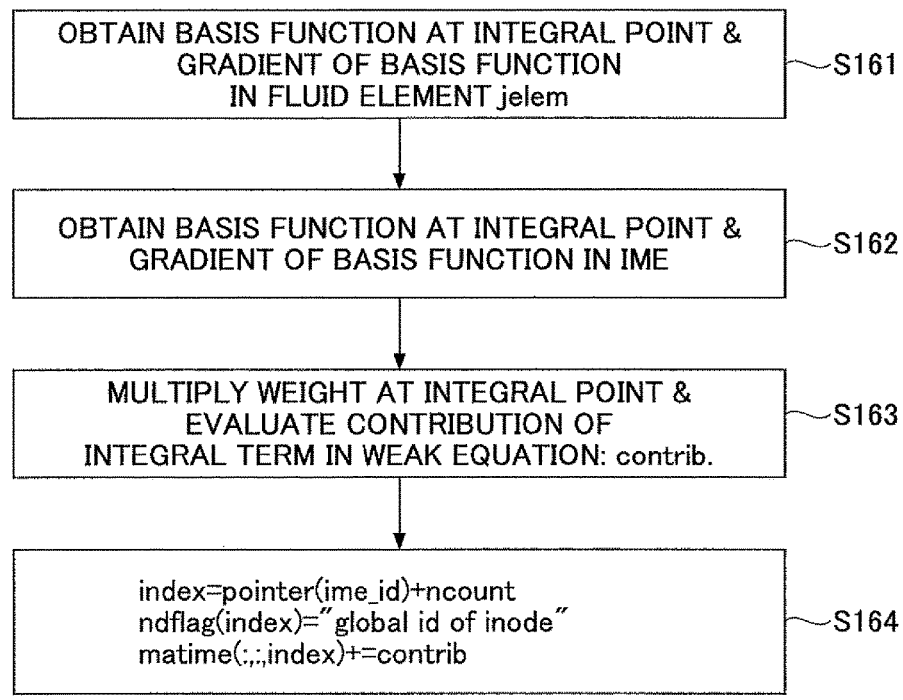
FIG. 17 is a diagram for explaining a process A illustrated in FIG. 16.
FIG. 18 is a diagram for explaining a process B illustrated in FIG. 16.

FIG. 16 is a flow chart for explaining the operation of first and second sub parts. In addition, FIG. 17 is a diagram for explaining a process A illustrated in FIG. 16, and FIG. 18 is a diagram for explaining a process B illustrated in FIG. 16. FIG. 16 illustrates the process for an example in which the integration is performed using the integral points discretely arranged within the IME. In the case of the process performed by the first sub part 61, the processes A and B are not performed by the procedures (s1) through (s3) described above, and the processes A and B are performed by the procedures (s11) through (s15) described above.

In the case of the process performed by the first sub part 61, a step S1 in FIG. 16 sets a pointer to pointer(1)=1, and executes the process A illustrated in FIG. 17. The process A is performed only when a flag "ndflag" and a flag "matime" are allocated. The flags "ndflag" and "matime" are allocated when integrating the integral points discretely arranged within the IME. A step in FIG. 17 sets the flag "nflag" to ndflag(1:pointer(#IME+1)−1)=0, and sets the flag "matime" to matime(1:3, ndflag(1:pointer(#IME+1)−1)=0 in the case of the first sub part 61, and sets the flag "matime" to matime(1:3, 1:3, ndflag(1:pointer(#IME+1)−1)=0 in the case of the second sub part 62 which will be described later.

Returning now to the description of FIG. 16, a step S2 initializes an ID (IDentification) of the IME, "ime_id", to ime_id=0. A step S3 sets the flag "flag" to flag(1:nnode)=0, and sets a list "list" to list(1:nnode)=0. A step S4 increments "ime_id" to ime_id-ime_id+1, and a step S5 sets a connectivity counter "ncount" to ncount=0. A step S6 sets a Gaussian point ID on a triangular element, "igauss_tri", to igauss_tri-0.

A step S7 increments the Gaussian point ID, "igauss_tri", to igauss_tri=igauss_tri+1, and a step S8 stores the Gaussian point ID (or Gaussian point coordinate), "igauss_tri", and a weight "weight tri" in the memory. A step S9 sets a discrete integral point ID within the IME, "integ", to integ=0.

A step S10 increments the discrete integral point ID, "integ", to integ=integ+1, and a step S11 sets a relative relation of the integral point coordinate "tpoint" and the Gaussian coordinate "gauss_tri" to rel=tpoint-gauss_tri. A step S12 searches for a fluid element "jelem" that includes the integral point coordinate "tpoint", using the cell index method. A step S13 initializes a node ID "jnode" within the fluid element "jelem" to "0".

A step S14 increments the node ID "jnode" to jnode=jnode+1. A step S15 decides whether the flag "flag" with respect to the node ID "jnode" is flag(jnode)==0, and the process returns to the step S14 if the decision result is FALSE, and the process advances to a step S16 if the decision result is TRUE. The step S16 increments the connectivity counter "ncount" to ncount=ncount+1, sets the flag "flag" and the list "list" to flag(jnode)=ncount and list(ncount)=jnode, respectively, and performs the process B illustrated in FIG. 18. The process B is performed only when the flag "ndflag" and the flag "matime" are allocated. A step S161 in FIG. 18 obtains the basis function at the integral point and the gradient of the basis function in the fluid element "jelem". A step S162 obtains the basis function at the integral point and the gradient of the basis function in the IME. A step S163 multiples the weight at the integral point to the basis function and its gradient, and evaluates a contribution "contrib." of the integral term in the weak form. A step S164 sets an index "index" to index=pointer(ime_id)+ncount, sets the flag "ndflag" to ndflag(index)= "global id of inode", and sets the flag "matime" to matime(:, :, index)+=contrib.

Returning now to the description of FIG. 16, a step S17 decides whether the node ID "jnode" within the fluid element "jelem" is equal to a number of nodes "#nodes", and jnode==#nodes stands. The process returns to the step S14 if the decision result in the step S17 is FALSE, and the process advances to a step S18 if the decision result in the step S17 is TRUE. The step S18 decides whether the discrete integral point ID "integ" is equal to a number of discrete integral points, ""integ_points", and integ==#integ_points stands. The process returns to the step S10 if the decision result in the step S18 is FALSE, and the process advances to a step S19 if the decision result in the step S18 is TRUE. The step S19 decides whether the gauss point ID "igauss_tri" is equal to a number of Gaussian points "#gauss_tri", and igauss_tri==#gauss_tri stands. The process returns to the step S7 if the decision result in the step S19 is FALSE, and the process advances to a step S20 if the decision result in the step S19 is TRUE.

A step S20 sets the pointer "pointer" to pointer(ime_id+1)=pointer(ime_id)+ncount, and a step S21 sets the flag "flag" to flag(list(1:ncount))=0. A step S22 decides whether the ID of the IME, "ime_id", is equal to a number of IMEs "#IME", and ime_id==#IME stands. The process returns to the step S4 if the decision result in the step S22 is FALSE, and the process ends if the decision result in the step S22 is TRUE.

FIG. 19 is a diagram illustrating an example of a structure of the second sub part 62. The input to the second sub part 62 is the same as the input to the first sub part 61 described above. The second sub part 62 includes a search part 621, an allocation part 622, and a fluid contribution computing part 623. The search part 621 searches for a set of fluid nodes that are interacted upon by the finite element that moves by following the displacement of the structure, which finite element is defined on the top surface and the bottom surface of the structure for each two-dimensional element forming the interaction boundary of the fluid and the structure. The allocation part 622 allocates a memory region that is required based on a search result of the search part 621. The fluid contribution computing part 623 computes the contribution of the matrix to the degree of freedom of each node.

In this embodiment, the displacement of the structure is determined independently of the meshes of the fluid, and the list of fluid nodes that are interacted upon by the IME differs every time the time development and the Newton-Raphson loop is executed. Hence, in order to create the matrix for each element, the search is performed to update the list of interacting nodes. The search part 621 uses the cell index method to perform the search. Thus, the search part 621 determines the number of fluid nodes to which each IME interacts. More particularly, in the case in which the integration is performed using the integral points arranged discretely within the IME, the fluid element to be included is searched using the cell index method for each of the integral points, and the number of velocity nodes that are constituent members of the fluid element is counted. In a case in which the integration is performed using the Gaussian quadrature for each of the fluid elements defined in the global domain, a confirmation is made to determine whether the IME includes the integral points of the Gaussian quadrature of the fluid elements included in peripheral cells surrounding a central cell that includes the center of volume of the IME, and the number of velocity nodes that are constituent members of the fluid element is counted if the IME includes the integral points of the Gaussian quadrature of the fluid elements included in the peripheral cells. Accordingly, with respect to each IME defined for each of the two-dimensional elements forming the interaction boundary $\Sigma$, the search part 621 executes procedures (or processes) of (s21) obtaining the integral point coordinate within the IME moving together with the interaction boundary, (s22) searching the fluid element including the integral points, and (s23) counting the fluid nodes (or the degrees of freedom) that are members of the searched fluid element as the interaction nodes without overlap, based on the graph information of the meshes. Alternatively, the search part 621 executes procedures (or processes) of (s21') obtaining the coordinate of the center of volume of the IME moving together with the interaction boundary, (s22') searching the fluid element surrounding the center of volume from the center of volume, and (s23') counting the fluid nodes (or the degrees of freedom) that are members of the searched fluid element as the interaction nodes without overlap, if the IME includes the Gaussian quadrature points of the fluid element.

The allocation part 622 allocates the memory region to store the contribution to the matrix, based on the number of interaction nodes counted in the search part 621.

The fluid contribution computing part 623 performs a process similar to that performed by the search part 621, in order to create a list of the interacting fluid nodes for each IME, and simultaneously computes the contribution to the interaction matrix. Accordingly, in a case in which the integration is performed using the integral points discretely arranged within the IME, the search part 611, with respect to each IME defined on the top surface and the bottom surface of the interaction boundary $\Sigma$ for each of the two-dimensional elements forming the interaction boundary $\Sigma$, executes procedures (or processes) of (s31) obtaining the integral point coordinate within the IME moving together with the interaction boundary, (s32) searching the fluid element including the integral points, (s33) storing the fluid nodes (or the degrees of freedom) that are members of the searched fluid element in the memory based on the graph information of the meshes, (s34) obtaining the basis function value and the derived function at the integral points, and (s35) adding the contributions to the small matrix within the element. Alternatively, in a case in which the integration is performed using the Gaussian quadrature for each of the fluid elements defined in the global domain, the fluid contribution computing part 623 executes procedures (or processes) of (s31') obtaining the coordinate of the center of volume of the IME moving together with the interaction boundary, (632') searching the fluid element surrounding the center of volume from the center of volume, (s33') storing the fluid nodes (or the degrees of freedom) that are members of the searched fluid element in the memory based on the graph information of the meshes, if the IME includes the Gaussian quadrature points of the fluid element, (S34')

obtaining the basis function value and the derived function at the integral points, and (s35') adding the contributions to the small matrix within the element.

The process of the second sub part 62 may be performed in a manner similar to the process of the first sub part 61 described above in conjunction with FIG. 16. In the case of the process of the second sub part 62, the processes A and B are not performed by the procedures (s21) through (s23), and the processes A and B are performed by the procedures (s31) through (s35). Further, as described above in conjunction with FIG. 17, the process of the step S101 in the process A for the second sub part 62 partially differs from that for the first sub part 61.

Therefore, the small matrix is created for each element representing the interaction of the correcting function of the velocity and the velocity of the fluid defined in the global domain.

FIG. 20 is a diagram illustrating an example of a structure of the third sub part 63. The input to the third sub part 63 is the same as the input to the first sub part 61 described above. The third sub part 63 regards that the structure elements interacting with each element solely include the structure elements on which the elements are arranged, and does not perform a search.

The third sub part 63 includes an allocation part 631 to allocate a memory region that is required, and a structure contribution computing part 632 to compute the contribution of the matrix to the degree of freedom of each node. The structure contribution computing part 632 computes the boundary integral term on the interaction boundary Σ, that is obtained using the Green's theorem in order to represent the interaction of the correcting function of the pressure and the interaction of the velocity of the structure.

The allocation part 631 regards that displacement nodes of the interacting structure solely include nodes of the structure element arranged with the IME, and allocates the memory region that is required to store the contribution to the matrix, for each IME.

The structure contribution computing part 632 computes the contribution to the interacting matrix, by regarding the displacement nodes of the structure element arranged with each IME as the interacting nodes. More particularly, with respect to each IME defined for each of the two-dimensional elements forming the interaction boundary Σ, the structure contribution computing part 632 executes procedures (or processes) of (s41) storing the structure nodes (or the degrees of freedom) that are members of the structure element arranged with the IME and form an interaction pair in the memory, and (s42) adding the contributions to the small matrix within the element. Hence, the incompressibility condition is applied, and the small matrix is created for each element representing the interaction of the correcting function of the pressure and the velocity of the structure.

Figure 21:
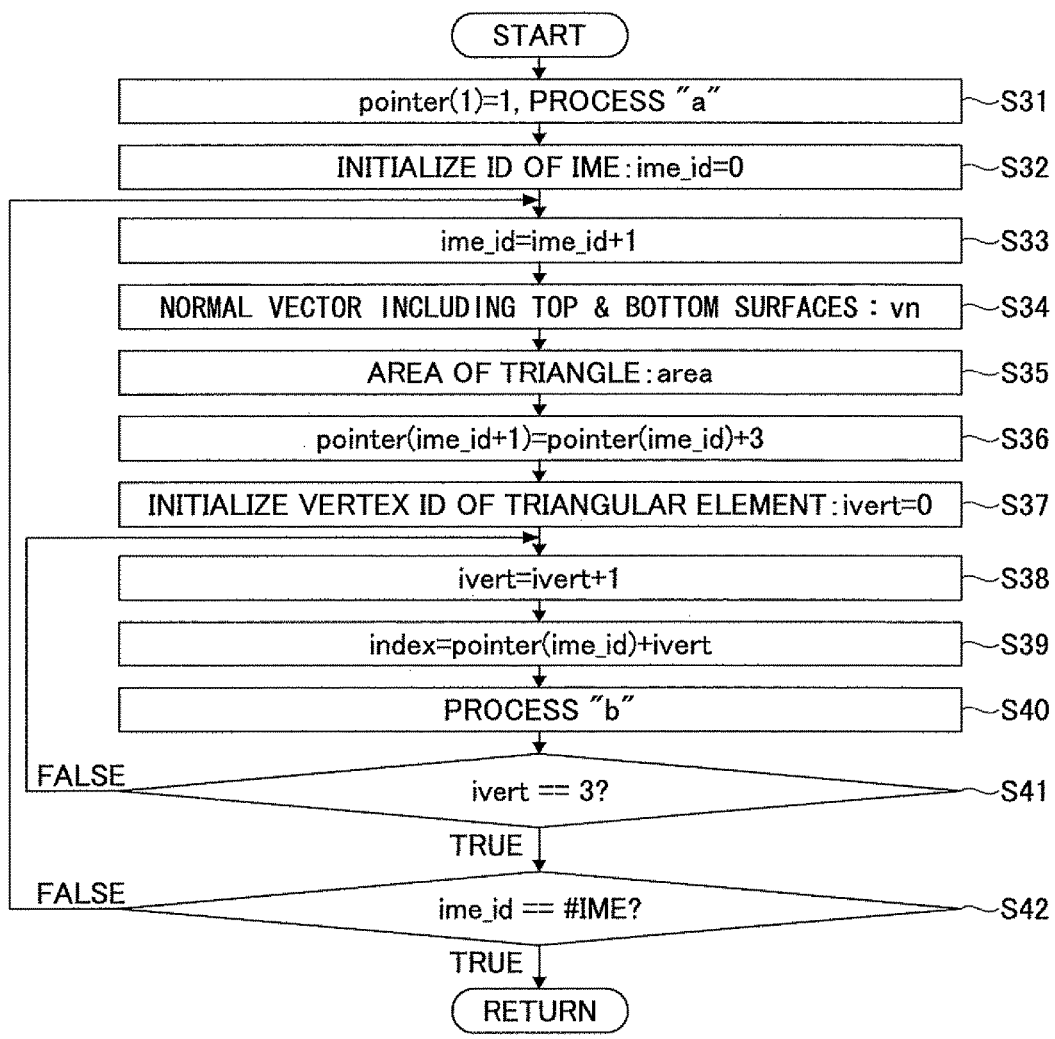
FIG. 21 is a flow chart for explaining an operation of third and fourth sub parts.

FIG. 21 is a flow chart for explaining the operation of the third and fourth sub parts. In addition, FIG. 22 is a diagram for explaining a process "a" illustrated in FIG. 21, and FIG. 23 is a diagram for explaining a process "b" illustrated in FIG. 21.

In the case of the process performed by the third sub part 63, a step S31 in FIG. 21 sets the pointer "pointer" to pointer(1)=1, and executes the process "a" illustrated in FIG. 22. A step S311 illustrated in FIG. 22 sets a flag "ndflag" to ndflag(1:(3x#IME))=0, and sets a flag "matime" to matime (1:3, ndflag(1:(3x#IME)))=0 in the case of the process performed by the third sub part 63, and sets the flag "matime" to (1:3, 1:3, ndflag(1:(3x#IME)))=0 in the case of the process performed by the fourth sub part 64.

Returning now to the description of FIG. 21, a step S32 initializes the ID of IME, "ime_id", to ime_id=0. A step S33 increments the ID of IME, "ime_id", to ime_id=ime_id+1, and a step S34 defines a normal vector including a top and a bottom. A step S35 defines an area "area" of a triangle. A step S36 sets the pointer "pointer" to pointer(ime_id+1)=pointer(ime_id)+3, and a step S37 initializes a vertex ID of a triangular element, "ivert", to ivert=0.

A step S38 increments the vertex ID of the triangular element, "ivert" to ivert=ivert+1. A step S39 sets an index "index" to index-pointer(ime_id)+ivert. A step S40 executes the process "b" illustrated in FIG. 23. A step S401 illustrated in FIG. 23 evaluates a contribution "contrib." of the integral term in the weak form, by focusing on the normal vector "vn" and the element area "area". a step S402 sets the flag "ndflag" to ndflag(index)="global id of ivert", and sets the flag "matime" to matime (:, :, index)+=contrib.

Returning now to the description of FIG. 21, a step S41 decides whether the vertex ID of the triangular element "ivert", is ivert==3. The process returns to the step S38 if the decision result in the step S41 is FALSE, and the process advances to a step S42 if the decision result in the step S41 is TRUE. The step S42 decides whether the ID of IME, "ime_id", is equal to the number of IMEs "#IME" and ime_id=#IME stands. The process returns to the step S33 if the decision result in the step S42 is FALSE, and the process ends if the decision result in the step S42 is TRUE.

Figure 24:
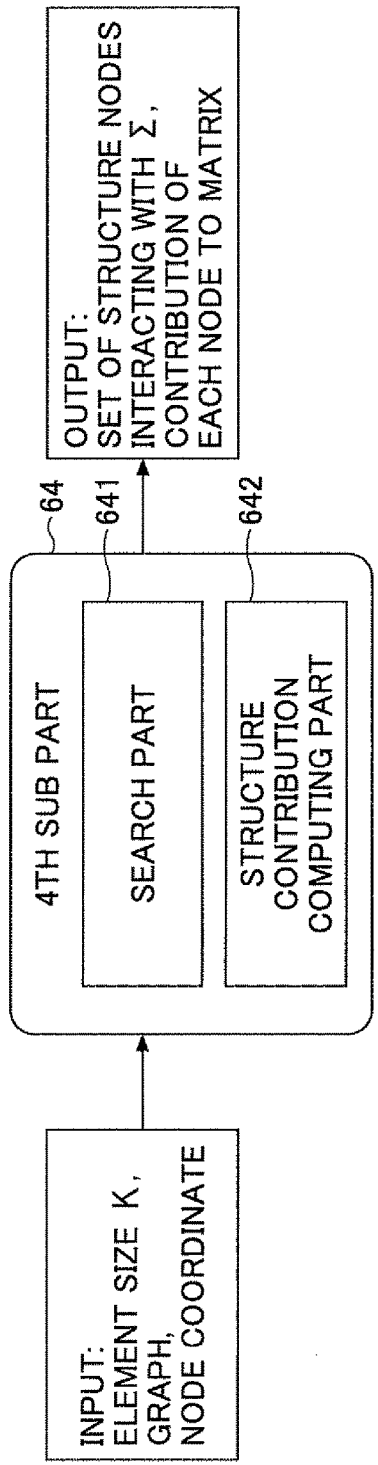
FIG. 24 is a diagram illustrating an example of a structure of the fourth sub part.

FIG. 24 is a diagram illustrating an example of a structure of the fourth sub part 64. The input to the fourth sub part 64 is the same as the input to the first sub part 61 described above. The fourth sub part 64 regards that the structure elements interacting with each element solely include the structure elements on which the elements are arranged, and does not perform a search.

The fourth sub part 64 includes an allocation part 641 to allocate a memory region that is required, and a structure contribution computing part 642 to compute the contribution of the matrix to the degree of freedom of each node. The structure contribution computing part 642 computes the boundary integral term on the interaction boundary Σ, that is obtained using the Green's theorem in order to represent the interaction of the correcting function of the velocity and the interaction of the velocity of the structure.

The allocation part 641 regards that displacement nodes of the interacting structure solely include nodes of the structure element arranged with the IME, and allocates the memory region that is required to store the contribution to the matrix, for each IME.

The structure contribution computing part 642 computes the contribution to the interacting matrix, by regarding the displacement nodes of the structure element arranged with each IME as the interacting nodes. More particularly, with respect to each IME defined on the top surface and the bottom surface of the interaction boundary Σ for each of the two-dimensional elements forming the interaction boundary Σ, the structure contribution computing part 642 executes procedures (or processes) of (s51) storing the structure nodes (or the degrees of freedom) that are members of the structure element arranged with the IME and form an interaction pair in the memory, and (s52) adding the contributions to the small matrix within the element. Hence, the viscous condition is applied, and the small matrix is created for each element representing the interaction of the correcting function of the velocity and the velocity of the structure.

The process of the fourth sub part 64 may be performed in a manner similar to the process of the third sub part 63 described above in conjunction with FIG. 21. Further, as described above in conjunction with FIG. 22, the process of the step S311 in the process "a" for the fourth sub part 64 partially differs from that for the third sub part 63.

Therefore, this embodiment uses the finite element (IME) that moves with the displacement of the structure, and is arranged on the surface (curved surface) that becomes the interaction boundary (that is, the moving boundary or the free boundary) of the fluid region and the structure region. Based on the IME, the pressure correcting function having a non-zero value only within the IME and having a zero value at the element boundary other than the interaction boundary, and the velocity correcting function having a non-zero value only within the IME and having a zero gradient at the element boundary other than the interaction boundary, are used. Further, the weak form that is different from that of the conventional fluid and structure interaction is used to represent the interaction of the fluid and the structure.

Next, a more detailed description will be given of the IME. The interaction boundary $\Sigma$ of the fluid and the structure, that becomes the moving boundary (or free boundary), is segmented (or discretised) two-dimensionally into elements according to the segmenting (or discretization) of the structure into the finite elements. The center, vertex, and integral point of the two-dimensional finite element forming the interaction boundary $\Sigma$ may be used as representative points to arrange the node of the pressure correcting function. Elements having the spherical or right circular cylinder shape and a size $\kappa$ are arranged on the top surface and the bottom surface of the interaction boundary $\Sigma$, using the node as a center, in order to define the correcting function of the pressure of the fluid within the element.

Similarly, the center, vertex, and integral point of the two-dimensional finite element forming the interaction boundary $\Sigma$ may be used as representative points to arrange the node of the velocity correcting function on the top surface and the bottom surface of the interaction boundary $\Sigma$. Elements having the spherical or right circular cylinder shape and a size $\kappa$ are arranged on the top surface and the bottom surface of the interaction boundary $\Sigma$, using the node as a center, in order to define the correcting function of the velocity of the fluid within the element.

Figure 25B:
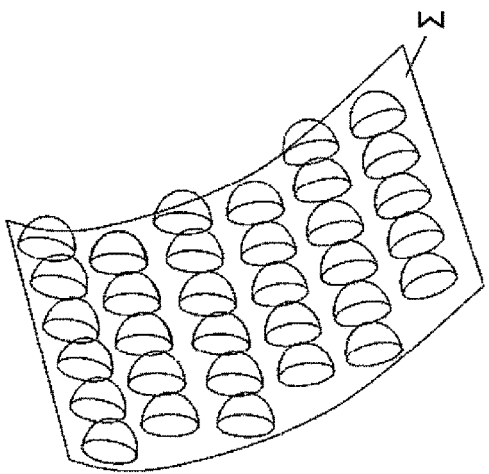
FIGS. 25A and 25B are diagrams illustrating an image of IMEs that move by following a displacement of the structure that undergoes motion.
Figure 25A:
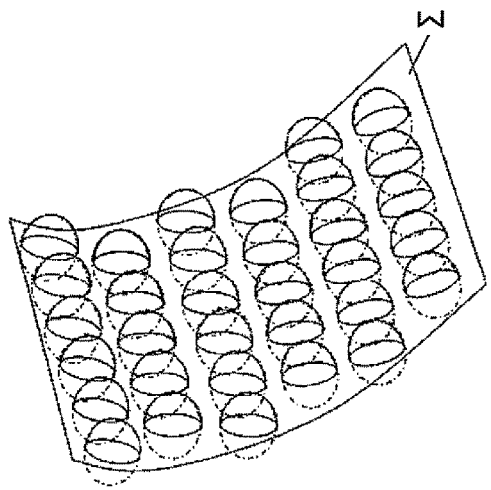

FIGS. 25A and 25B are diagrams illustrating an image of the IMEs that move by following the displacement of the structure that undergoes motion, and is discretely arranged on the interaction boundary $\Sigma$ of the fluid and the structure. FIG. 25A illustrates the IMEs with respect to the pressure correcting function, defined to span the top surface and the bottom surface, and wherein the elements on the top surface and the bottom surface of the interaction boundary $\Sigma$ correspond to one node. FIG. 25B illustrates the IMEs with respect to the velocity correcting function, and wherein the elements are similarly arranged on both the top surface and the bottom surface of the interaction boundary $\Sigma$. In the IMEs with respect to the velocity correcting function, one corresponding node exists with respect to the element on the top surface and with respect to the element on the bottom surface of the interaction boundary $\Sigma$. FIGS. 25A and 25B illustrate elements having a hemisphere shape, for example, and the elements are illustrated as having a relatively small element size for eye-friendly sake However, the element size may be determined so that IMEs mutually overlap.

The size $\kappa$ of the IME that moves by following the displacement of the structure in motion may be selected such that the IMEs overlap without a gap therebetween on the interaction boundary $\Sigma$ of the fluid and the structure. For example, in a case in which the interaction boundary $\Sigma$ is segmented into the finite elements using triangular elements and one IME is arranged at the center of each triangular element, a hemisphere having a radius $\kappa=\alpha L$ or a right circular cylinder having a radius and a height $\kappa$ with respect to a maximum value $L$ of the finite element forming the interaction boundary $\Sigma$ and a real number $\alpha$ having a value of approximately 1, may be arranged on the top surface and the bottom surface of the interaction boundary $\Sigma$ of the fluid and the structure.

By defining the correcting functions of the pressure and the velocity within the finite element, the support of each of the correcting functions may have a length scale of approximately $\kappa$. The smaller the length scale $\kappa$, the more the performance of the Lagrangian multipliers satisfying the constraint condition improves, to thereby making the introduction of the correcting functions ideal. On the other hand, the smaller the length scale $\kappa$, the more difficult it becomes to improve the numerical integration accuracy. The support refers to a closure of a region in which the function has a non-zero value: $\mathrm{supf}=\{\overline{\sqrt{f^{-1}(R\backslash\{0\})}}\}$ Next, a more detailed description will be given of the correcting function of the pressure. According to this embodiment, the pressure $\mathcal{P}$ of the fluid may be defined by the following formula (38) using the continuous pressure p that is globally defined and the pressure correcting function $\tilde{p}$ having the support only in the neighborhood of the interaction boundary $\Sigma$.

$$\mathcal{P} = p + \tilde{p} \quad (38)$$

The pressure correcting function $\tilde{p}$ has a positive value on one side specified by a normal $n(y)$ ($y \in \Sigma$) that is uniquely defined on the interaction boundary $\Sigma$, a negative value on the other side by undergoing discontinuous changes on the interaction boundary $\Sigma$, a non-zero value on the interaction boundary $\Sigma$, a zero value on the support boundary other than the interaction boundary $\Sigma$, and may be defined by the following formula (39) using a function $\tilde{\delta}$ that is once continuously differentiable within the support but excluding the interaction boundary $\Sigma$. In the formula (39), $\tilde{p}_0$ denotes a function representing a pressure difference defined on the interaction boundary $\Sigma$.

$$\tilde{p}(x) = \int_\Sigma \tilde{p}_0(y)\tilde{\delta}(x-y;n(y))dy \quad (39)$$

Figure 26A:
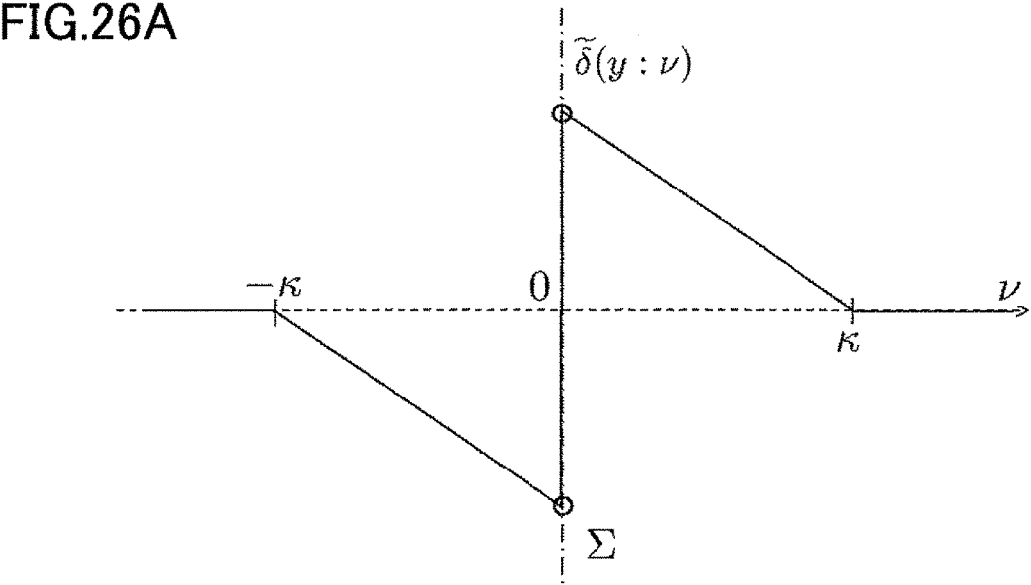
FIGS. 26A and 26B are diagrams for explaining a basis function of a pressure correcting function.
Figure 26B:
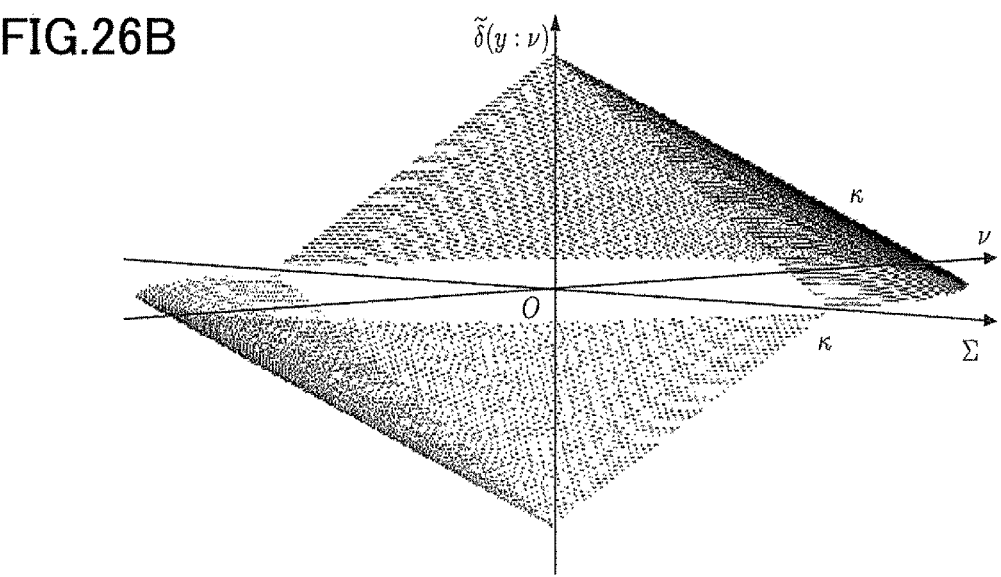

FIGS. 26A and 26B are diagrams for explaining the basis function $\tilde{\delta}$ of the pressure correcting function. FIG. 26A illustrates the basis function $\tilde{\delta}$ with respect to the normal $v$, and FIG. 26B illustrates the basis function $\tilde{\delta}$ with respect to the normal $v$ and the interaction boundary $\Sigma$. As illustrated in FIGS. 26A and 26B, the basis function $\tilde{\delta}$ has the following properties.

$$\tilde{\delta}(y;v) \geq 0 \text{ in } \{y \cdot v > 0\} \quad (40)$$

$$\tilde{\delta}(y;v) \leq 0 \text{ in } \{y \cdot v < 0\} \quad (41)$$

$$\tilde{\delta}(y;v) \neq 0 \text{ on } \Sigma \quad (42)$$

$$\tilde{\delta}(y;v) = 0 \text{ at } \partial\{\mathrm{supp}\tilde{\delta}\}\backslash\Sigma \quad (43)$$

$$\tilde{\delta}(y;v) \in C^1(\{\mathrm{supp}\tilde{\delta}\}\backslash\Sigma) \quad (44)$$

In the case of the basis function $\tilde{\delta}$ of the pressure, for example, the definition thereof may be made using a coordinate system that is easily treatable depending on the shape of the IME that is to be added. In the following description, the example of the basis function is a polynomial, however, a low-order basis function may be used because of the need to increase the resolution of the numerical integration when a high-order basis function is used.

If the IME is hemispherical, an open hemisphere included in a half space specified by a radius κ and a normal ν may be represented by the following.

$$B_\kappa^\pm(y:v) = \{|y| < \kappa | y \cdot v \gtrless 0\}$$

Figure 27:
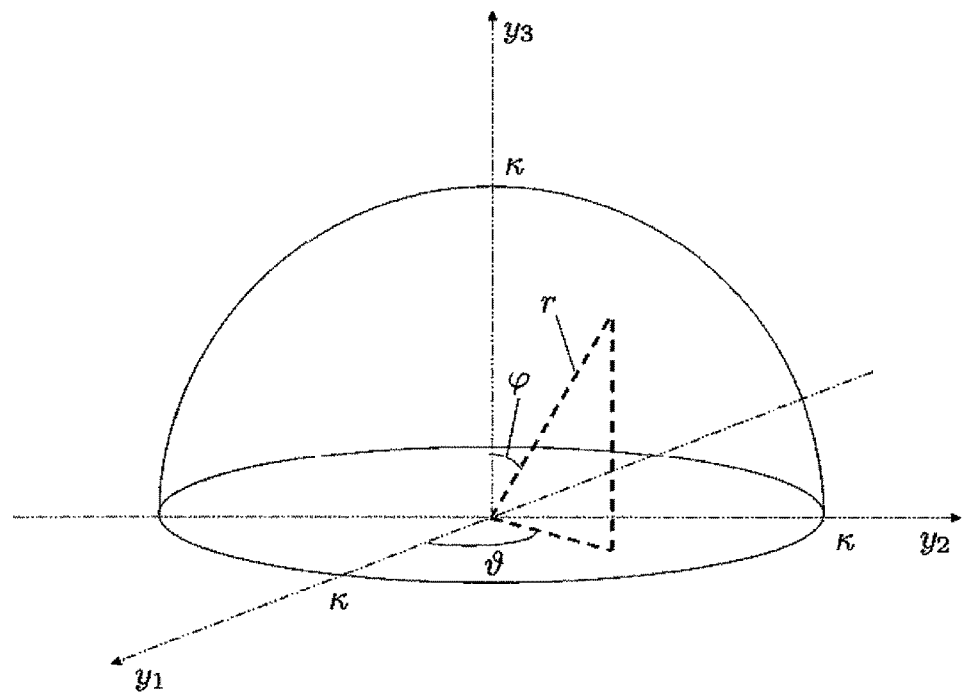
FIG. 27 is a diagram for explaining a definition of an open hemisphere and polar coordinates.

FIG. 27 is a diagram for explaining the definition of the open hemisphere and polar coordinates. By using the polar coordinates illustrated in FIG. 27, corresponding (r, φ, θ) may be determined with respect to arbitrary $y \in R^3$, and a characteristic function defined by $$1_E(y) \equiv \begin{cases} 1 & y \in E \\ 0 & \text{otherwise} \end{cases}$$

may be used to define the basis function in the following manner ($A \in R$)

$$\tilde{\delta}(y:v) = Af(r, \varphi, \vartheta)H(y:v), \qquad (45)$$

$$H(y:v) = 1_{B_\kappa^+(y:v)} - 1_{B_\kappa^-(y:v)} = \begin{cases} 1 & (y \in B_\kappa^+) \\ -1 & (y \in B_\kappa^-) \\ 0 & \text{otherwise,} \end{cases} \qquad (46)$$

where $$\begin{cases} f(r, \varphi, \vartheta) = 1 - \dfrac{r}{\kappa}, \\ f(r, \varphi, \vartheta) = 1 - \dfrac{r^2}{\kappa^2}, \\ f(r, \varphi, \vartheta) = \left(1 + \dfrac{2r}{\kappa}\right)\left(1 - \dfrac{r}{\kappa}\right)^2, \\ f(r, \varphi, \vartheta) = \left(1 - \dfrac{r^2}{\kappa^2}\right)^2, \\ f(r, \varphi, \vartheta) = \left(1 - \dfrac{r}{\kappa}\right)\left(1 - \dfrac{r}{\kappa}|\cos\varphi|\right). \end{cases} \qquad (47)$$

and each basis function is non-zero and discontinuous on the interaction boundary Σ, and has a zero value at r=κ.

In a case in which the IME has the right circular cylinder shape, the right circular cylinder included in the half space specified by the radius and the height respectively denoted by κ and the normal denoted by ν may be represented by the following.

$$C_\kappa^\pm(y:v) = \{y = (y_1, y_2, y_3) | y_1^2 + y_2^2 < \kappa^2, |y_3| < \kappa, y \cdot v \gtrless 0\}$$

Figure 28:
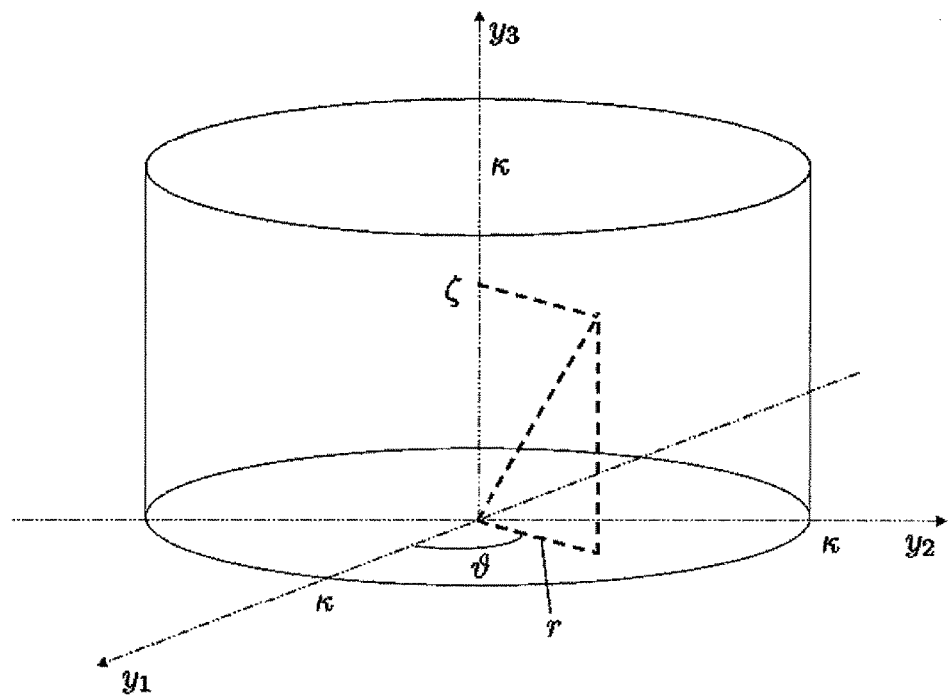
FIG. 28 is a diagram for explaining a right circular cylinder and the polar coordinates.

FIG. 28 is a diagram for explaining the right circular cylinder and the polar coordinates. The polar coordinates (cylindrical polar coordinates) illustrated in FIG. 28 may be used to determine (r, θ, ζ) corresponding to arbitrary $y \in R^3$, and thus, if the basis function is represented as follows by assuming $A \in R$, $$\tilde{\delta}(y:v) = Af(r, \vartheta, \zeta)H(y:v), \qquad (48)$$

$$H(y:v) = 1_{C_\kappa^+(y:v)} - 1_{C_\kappa^-(y:v)} = \begin{cases} 1 & (y \in C_\kappa^+) \\ -1 & (y \in C_\kappa^-) \\ 0 & \text{otherwise} \end{cases} \qquad (49)$$

the basis function can be defined as follows.

$$\begin{cases} f(r, \vartheta, \zeta) = \left(1 - \dfrac{r}{\kappa}\right)\left(1 - \dfrac{|\zeta|}{\kappa}\right), \\ f(r, \vartheta, \zeta) = \left(1 - \dfrac{r}{\kappa}\right)\left(1 - \dfrac{|\zeta|^2}{\kappa^2}\right), \\ f(r, \vartheta, \zeta) = \left(1 - \dfrac{r^2}{\kappa^2}\right)\left(1 - \dfrac{|\zeta|}{\kappa}\right), \\ f(r, \vartheta, \zeta) = \left(1 - \dfrac{r^2}{\kappa^2}\right)\left(1 - \dfrac{|\zeta|^2}{\kappa^2}\right). \end{cases} \qquad (50)$$

In this case, each basis function is non-zero and discontinuous on the interaction boundary Σ, and has a zero value at the support boundary other than the interaction boundary Σ.

Next, a more detailed description will be given of the velocity correcting function.

According to this embodiment, the velocity V of the fluid may be defined by the following formula using the velocity v that is defined in the global domain, and the velocity correcting function $\tilde{v}^\pm$ having the support on both the top surface and the bottom surface of the interaction boundary Σ.

$$\mathscr{V} = v + \tilde{v}, \tilde{v} = \tilde{v}^+ + \tilde{v}^-$$

The velocity correcting function $\tilde{v}^\pm$ has a support only on one side specified by a normal n to the interaction boundary Σ, is twice continuously differentiable within the support, does not have a value in all support boundaries including the interaction boundary Σ, has a non-zero gradient at the interaction boundary Σ, and has a zero gradient at boundaries other than the interaction boundary Σ. Hence, the velocity correcting function $\tilde{v}^\pm$ may be defined using the following function $\tilde{\gamma}$ illustrated in FIGS. 29A and 29B, $$\text{supp}\tilde{\gamma}(y:\pm v) \cap \{\pm(y \cdot v) \leq 0\} = \emptyset \qquad (51)$$

$$\tilde{\gamma}(y:v) = 0 \text{ on } \Sigma \qquad (52)$$

$$\tilde{\gamma}(y:v) = 0 \text{ at } \partial\{\text{supp}\tilde{\gamma}\} \qquad (53)$$

$$\nabla\tilde{\gamma}(y:v) \cdot 0, \text{ on } \Sigma \qquad (54)$$

$$\nabla\tilde{\gamma}(y:v) = 0, \text{ at } \partial\{\text{supp}\tilde{\gamma}\}\backslash \qquad (55)$$

$$\tilde{\gamma}(y:v) \in C^2(\{y \cdot v > 0\}) \qquad (56)$$

on each of the top surface and the bottom surface of the interaction boundary Σ, as folllows, where $\tilde{v}_0^\pm$ denotes the function defined on the top surface and the bottom surface of the interaction boundary Σ.

$$\tilde{v}^+(x) = \int_\Sigma \tilde{v}_0^+(y) \tilde{\gamma}(x-y:n) dy, \qquad (57)$$

$$\tilde{v}^-(x) = \int_\Sigma \tilde{v}_0^-(y) \tilde{\gamma}(x-y:n) dy, \qquad (58)$$

Figure 29A:
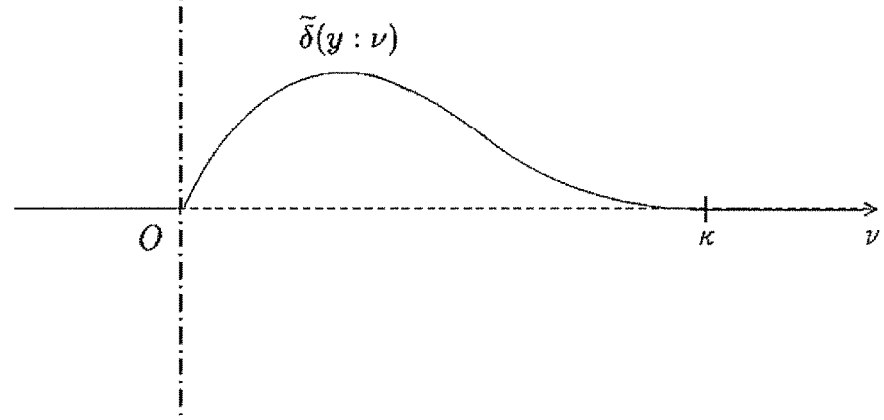
FIGS. 29A and 29B are diagrams for explaining a basis function of a velocity correcting function respectively.
Figure 29B:
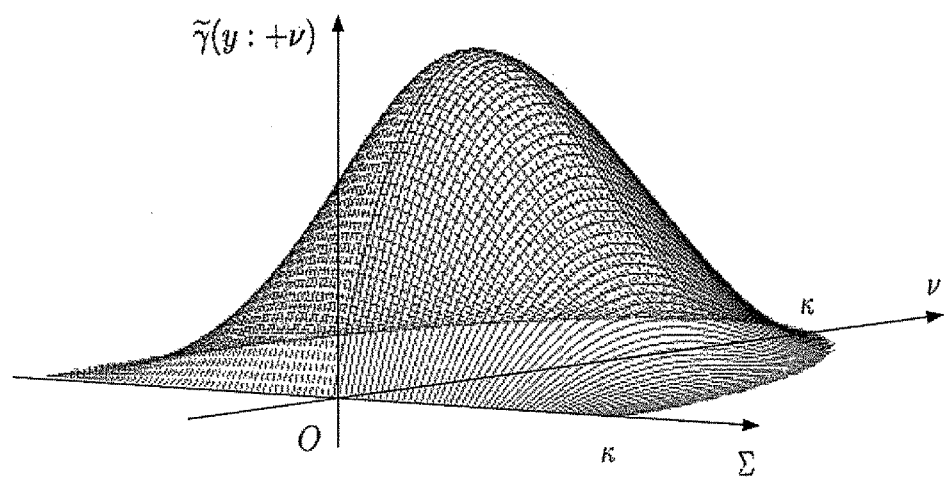

FIGS. 29A and 29B are diagrams for explaining the basis function of the velocity correcting function. FIG. 29A illustrates the basis function $\tilde{\gamma}$ with respect to the normal vector ν, and FIG. 29B illustrates the basis function $\tilde{\gamma}$ with respect to the normal vector ν and the interaction boundary Σ.

The velocity basis function $\tilde{\gamma}$ may preferably be defined using a coordinate system that is easily treatable depending on the shape of the IME that is to be added. In the following description, the example of the basis function is a polynomial, however, a low-order basis function may be used because of the need to increase the resolution of the numerical integration when a high-order basis function is used.

If the IME is hemispherical, the basis function defined by an open hemisphere $B_\kappa^+$ specified by a radius $\kappa$ may be represented by the following.

$$\tilde{\gamma}(y:v) = Ag(r,\varphi,\vartheta) 1_{B_\kappa^+(y:v)} \tag{59}$$

In addition, the following formulas (60) can be used, where $(r, \varphi, \theta)$ is the polar coordinate illustrated in FIG. 27.

$$\begin{cases} g(r, \varphi, \vartheta) = \left(1 - \frac{r^2}{\kappa^2}\right)^m \cos\varphi & m = 2, 3 \\ g(r, \varphi, \vartheta) = \left(1 - \frac{r^2}{\kappa^2}\right)^m y_3 \left(1 - \frac{y_3}{\kappa}\right)^n, & y_3 = r\cos\varphi, m = 2, 3, \ldots, \\ & n = 0, 1, \ldots. \end{cases} \tag{60}$$

Each of these examples has a zero value on the interaction boundary $\Sigma$ and at $r$-$K$, non-zero gradient on the interaction boundary $\Sigma$ and zero gradient on the support boundary other than the interaction boundary $\Sigma$, to show a circular symmetry. As described above, as the orders m and n become higher, the more integral points are required in order to maintain the integration accurately, and thus, the values of m and n may be set relatively small.

If the IME is right circular cylinder shaped, the basis function defined by a right circular cylinder region $C_\kappa^+$ of FIG. 28 may be represented by the following.

$$\tilde{\gamma}(y:v) = Ag(r,\vartheta,\zeta) 1_{C_\kappa^+(y:v)} \tag{61}$$

In addition, the following formula (62) can be used.

$$g(r, \vartheta, \zeta) = \left(1 - \frac{r^2}{\kappa^2}\right)^m \zeta\left(1 - \frac{\zeta}{\kappa}\right)^n, m, n = 2, 3, \ldots \tag{62}$$

This example also has a zero value on the interaction boundary $\Sigma$ and at $r=\kappa$, non-zero gradient on the interaction boundary $\Sigma$ and zero gradient on the support boundary other than the interaction boundary $\Sigma$, to show a circular symmetry. As described above, as the orders m and n become higher, the more integral points are required in order to maintain the integration accurately, and thus, the values of m and n may be set relatively small.

Next, a more detailed description will be given of the structure of the weak form. In the following description, the dependent variables are the velocity v and the pressure p of the fluid, the displacement d of the structure, the velocity correcting function $\tilde{v}$, and the pressure correcting function $\tilde{p}$. Unless otherwise indicated, $\delta$ denotes a variational operator, and $\delta X$ denotes a test function corresponding to an arbitrary function X, in accordance with custom of mechanics. In other words, the test function corresponding to each dependent variable becomes $(\delta v, \delta p, \delta d, \delta \tilde{v}, \delta \tilde{p})$. As a result, the equation (63) to be solved becomes as follows.

$$\delta W_f + \delta W_s + \delta J_p + \delta J_v = 0. \tag{63}$$

It is assumed, however, that the following weak form (64) of only the fluid is represented as follows, where $\rho$ and $\mu$ denote the density and the viscosity coefficient of the fluid, respectively, the velocity gradient tensor and the strain rate tensor are represented by $L_v = \partial v/\partial x = v \otimes \nabla, 2D_v = L_v + {}^tL_v$, the gradient of the test function is represented by $\delta L_v = \partial \delta v/\partial x$, $2\delta D_v = \delta L_v + {}^t\delta L_v$, and the boundary where the stress $\tau$ is applied as the boundary condition is denoted by $\Gamma$.

$$\delta W_f := \int_\Omega \begin{bmatrix} \rho \delta v \cdot \left(\frac{\partial v}{\partial t} + v \cdot \nabla v\right) - \\ (p\nabla \cdot \delta v - \delta p \nabla \cdot v) + \\ 2\mu \delta D_v : D_v - \rho \delta v \cdot g \end{bmatrix} dx + \int_\Gamma \delta v \cdot \tau ds = 0 \tag{64}$$

In addition, using the Lagrange coordinate X and denoting the dispacement by d, the Green-Lagrange strain by E, the second Kirchhoff-Piola stress by S, the time diffentiation by a superscript "• (dot)", and the boundary applied with the stress $\tau_s$ by $\Gamma_X$, the following weak form (65) of only the structure can be obtained.

$$\delta W_s := \int_{\Sigma^0} [\rho_s \delta \dot{d} \cdot \ddot{d} + S : \delta \dot{E} - \rho_s g \cdot \delta \dot{d}] dX - \int_{\Gamma_X} \tau_s \cdot \delta \dot{d} ds = 0 \tag{65}$$

The equation (64) represents the velocity and the pressure (v, p) of the fluid defined on the global domain and the interaction of the test function thereof, but the commonly available fluid code used in the ALE program, for example, may also be used. Further, the equation (65) represents the displacement and the velocity (d,ḋ) of the structure and the test function thereof, but the commonly available codes used in the ALE FSI program, for example, may also be used.

The term $\delta J_p$ represents the interaction of the pressure correcting function and the interaction of the fluid and the structure, and may be derived from the incompressibility condition term and the pressure gradient term of the fluid, as may be seen from the following formula (66).

$$\delta J_p := \int_{\tilde{\Omega}} \nabla \delta \tilde{p} \cdot v dx - \int_\Sigma \delta \tilde{p} \dot{d} \cdot v ds + \int_{\tilde{\Omega}} \nabla \tilde{p} \cdot \delta v dx - \int_\Sigma \tilde{p} \delta \dot{d} \cdot v ds \tag{66}$$

In the formula (66) above, $\tilde{\Omega}$ denotes a union of the supports of the IMEs. The union $\tilde{\Omega}$ has a spread of a length scale $\kappa$ in the periphery around the interaction boundary $\Sigma$.

Similarly, the term $\delta J_v$ represents the interaction of the velocity correcting function and the interaction of the fluid and the structure, and may be derived from the viscous term of the fluid.

$$\delta J_v := \int_{\tilde{\Omega}} [\rho G \cdot \delta \tilde{v} + 2\mu \nabla \cdot \delta \tilde{D}_v \cdot v] dx - \int_\Sigma 2\mu \dot{d} \cdot \delta \tilde{D}_v \cdot v ds + \int_{\tilde{\Omega}} 2\mu \nabla \cdot \tilde{D}_v \cdot \delta v dx - \int_\Sigma 2\mu \delta \dot{d} \cdot \tilde{D}_v \cdot v ds \tag{67}$$

In the formula (67) above, $\tilde{\Omega}$ denotes a union of the IMEs. In addition, it is assumed that the interaction of the flied and the structure at parts other than on the interaction boundary $\Sigma$ may be neglected.

The fluid contribution computing part 613 of the first sub part 61 computes the matrices forming the following two terms represented by the volume integral, amongst the pressure gradient term and the incompressibility condition term $\delta J_p$.

$$\delta J_p^v := \int_{\tilde{\Omega}} \nabla \delta \tilde{p} \cdot v dx + \int_{\tilde{\Omega}} \nabla \tilde{p} \cdot \delta v dx. \tag{68}$$

These two terms represent the interaction of the pressure correcting function and the velocity of the fluid defined in the global domain. Actually, only one of these terms may be computed, and the other term may be transposed based on symmetry. In addition, the integration may divide $\tilde{\Omega}$ into $\tilde{\Omega}^\pm$ depending on the top surface and the bottom surface of the interaction boundary $\Sigma$, and further decompose $\tilde{\Omega}^\pm$ to the IMEs for each half of the element. The integration for each element may be approximated by a multiply-accumulate of the volume element and the function value of the integrand at the integral points regularly distributed within the element. Alternatively, $1_{\tilde{\Omega}^\pm}$ may be multiplied to the integrand in order to carry out a Gaussian quadrature for each fluid element defined in the global domain.

The fluid contribution computing part 623 of the second sub part 62 computes the matrices forming the following two terms represented by the volume integral of $\delta J_v$, representing the interaction of the velocity correcting function and the velocity of the fluid defined in the global domain.

$$\delta J_v^{vs} = \int_{\tilde{\Omega}} 2\mu \nabla \cdot \delta \tilde{D}_v \cdot v dx + \int_{\tilde{\Omega}} 2\mu \nabla \cdot \tilde{D}_v \cdot \delta v dx \quad (69)$$

$$\delta J_v^{va} = \int_{\tilde{\Omega}} \rho G \cdot \delta \tilde{v} dx \quad (70)$$

When computing $J_v^{vs}$, only one of the two terms may be computed, and the other term may be transposed based on symmetry. In addition, since $G = ((v_t - g) + v \cdot \nabla v) + \nabla p / \rho$, $\delta J_v^{va}$ may be divided into the following three terms $\delta J_v^{va} = \delta J_v^{va1} + \delta J_v^{va2} + J_v^{va3}$.

$$\delta J_v^{va1} = \int_{\tilde{\Omega}} \rho (v_t - v) \cdot \delta \tilde{v} dx \quad (71)$$

$$\delta J_v^{va2} = \int_{\tilde{\Omega}} \rho v \cdot \nabla p v \cdot \delta \tilde{v} dx \quad (72)$$

$$\delta J_v^{va3} = \int_{\tilde{\Omega}} \nabla p \cdot \delta \tilde{v} dx \quad (73)$$

Amongst the three terms above, $\delta J_v^{va3}$ is the constraint condition with respect to the Lagrangian multipliers and need not be computed. Each of the remaining two terms represents the interaction of the velocity correcting function and the velocity of the fluid defined in the global domain. In addition, the integration may divide $\tilde{\Omega}$ into $\tilde{\Omega}^\pm$ depending on the top surface and the bottom surface of the interaction boundary $\Sigma$, and further decompose $\tilde{\Omega}^\pm$ into the IMEs for each half of the element.

The integration for each element may be approximated by a multiply-accumulate of the volume element and the function value of the integrand at the integral points regularly distributed within the element. Alternatively, $1_{\tilde{\Omega}^\pm}$ may be multiplied to the integrand in order to carry out a Gaussian quadrature for each fluid element defined in the global domain.

The structure contribution computing part 632 of the third sub part 63 computes the matrices forming the following two terms represented by the surface integral, between the pressure gradient term and the incompressibility condition term $\delta J_p$.

$$J_p^s = -\int_\Sigma \delta \tilde{p} \dot{d} \cdot v ds - \int_\Sigma \tilde{p} \delta \dot{d} \cdot v ds \quad (74)$$

These two terms represent the interaction of the pressure correcting function and the structure, and only one of these terms may be computed due to symmetry. In addition, the integration may be performed on the interaction boundary $\Sigma$ for each two-dimensional element forming the interaction boundary $\Sigma$. Particularly, an approximation may be used by assuming that $\dot{d}$ is uniform within each two-dimensional element e forming the interaction boundary $\Sigma$, and defining the value $\dot{d}_e$ by an average value of the values at each of the nodes. In this case, the value $\dot{d}_e$ may be represented as follows by $$\dot{d}_e := \frac{1}{K} \sum_k \dot{d}_{ek}. \quad (75)$$

by denoting the number of nodes of the element e by K. In addition, the integration of $\tilde{p}, \delta \tilde{p}$ may be analytically obtained in advance to make the following approximation.

$$\int_\Sigma \delta \tilde{p} \dot{d} \cdot v ds \sim (\dot{d}_e \cdot v) \int_\Sigma \delta \tilde{p} ds \quad (76)$$

The structure contribution computing part 642 of the fourth sub part 64 computes the matrices forming the following two terms represented by the surface integral of the interaction of the velocity correcting function and the displacement of the structure, represented by $\delta J_v$, on the interaction boundary $\Sigma$.

$$J_v^s = \int_\Sigma 2\mu \dot{d} \cdot \delta \tilde{D}_v \cdot v ds - \int_\Sigma 2\mu \delta \dot{d} \cdot \tilde{D}_v \cdot v ds \quad (77)$$

These two terms represent the interaction of the velocity correcting function and the velocity of the fluid defined in global domain, and only one of these terms may be computed and the other term may be transposed based on symmetry. In addition, the integration may be performed on the interaction boundary $\Sigma$ for each two-dimensional element forming the interaction boundary $\Sigma$, on the top surface and the bottom surface of the interaction boundary $\Sigma$. Similarly as in the case of the structure contribution computing part 632 described above, an approximation may be used by assuming that $\dot{d}$ is uniform within each two-dimensional element e forming the interaction boundary $\Sigma$, and defining the value $\dot{d}_e$ by an average value of the values at each of the nodes. Because the integral of $\tilde{D}_v, \delta \tilde{D}_v$ may be analytically obtained in advance, the integral may be approximated by the following using the analytically obtained result.

$$\int_\Sigma 2\mu \dot{d} \cdot \delta \tilde{D}_v \cdot v ds \sim 2\mu \dot{d}_e \cdot \int_\Sigma \delta \tilde{D}_v \cdot v ds \quad (78)$$

One object of the fluid structure interaction simulation of this embodiment is to make the meshes of the fluid and the structure independent. However, unless the interaction of the fluid and the structure can be represented, it is impossible to simulate consistent motions of the fluid and the structure regardless of the independence of the meshes. In other words, it is necessary to appropriately relate the physical quantities of the fluid (pressure p and velocity v) and the physical quantity of the structure (displacement d), based on the physical phenomena. Hence, a description will now be given in relation to a formulation of equations, by confirming the types of physical phenoma that occur.

First, a brief description will be given of the types of phenomena that occur or, the phenomena that are to be realized.

When there is interaction between the fluid and the structure, the structure is pushed by the pressure p of the fluid, and the structure is dragged by the velocity gradient of the fluid that originates from the viscosity of the fluid. At the same time, a phenomenon has been observed in which the fluid particles (Lagrange particles) of the fluid on the interaction boundary $\Sigma$ are under the constraint of the viscous condition in which the fluid particles move at the same velocity as the structure. These phenomena may be equivalent to the following phenomena:

(i) The pressure p of the fluid becomes discontinuous before and after the interaction boundary $\Sigma$, and the displacement d of the structure changes due to the structure being pushed by the pressure difference between the top surface and the bottom surface of the interaction boundary $\Sigma$;

(ii) The velocity v of the fluid on the structure undergoes a spatially continuous change so as to match the velocity $\dot{d}$ of the structure, while the first derivative of the velocity v becomes discontinuous on the interaction boundary $\Sigma$ due to the viscous condition, and the structure is dragged by the difference in the velocity gradients of the fluid to affect the displacement d of the structure.

In any case, the total stress affecting the motion of the structure may be caused by the discontinuity in the velocity gradient or the pressure at the top surface and the bottom surface of the structure. The discontinuity in such physical quantities may easily be understood by considering a situation in which the fluid within two cylinders changes discontinuously on both sides of a valve that partitions the two cylinders. The discontinuity in the velocity is evident because no vacuum will be generated in a neighborhood of the valve. In addition, completely different fluid motions may be generated in the two cylinders partitioned by the valve, and thus, it may be understood that completely different stresses may be generated on both sides of the cylinder wall, and completely different pressures and velocity gradients may be generated on both sides of the valve, to cause the discontinuity in the physical quantities.

Figure 30:
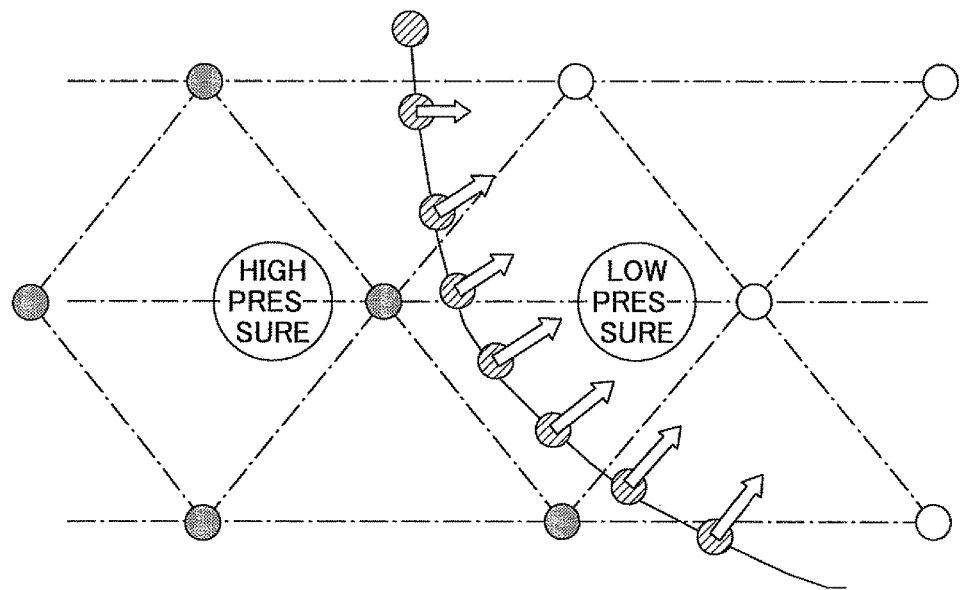
FIG. 30 is a diagram for explaining an interaction of the fluid and the structure.

Next, a description will be given on how to realize a phenomenon in which the structure is pushed by the pressure and the pressure becomes discontinuous, by referring to FIG. 30. FIG. 30 is a diagram for explaining the interaction of the fluid and the structure. In FIG. 30, a high-pressure node is indicated by a dotted circular symbol, a low-pressure node is indicated by a circular symbol, and a node of the structure is indicated by a circular symbol with hatchings. In addition, "HIGH PRESSURE" indicates a high-pressure region, and "LOW PRESSURE" indicates a low-pressure region. FIG. 30 illustrates a state in which the structure is displaced by being pushed by the pressure of the fluid, and the pressure of the fluid is discontinuous before and after the structure.

As illustrated in FIG. 30, as a result of the interaction of the fluid pressure and the structure, the fluid pressure becomes spatially discontinuous on the top surface and the bottom surface of the structure by being blocked by the structure, and the structure is displaced mainly by the pressure difference between the top surface and the bottom surface of the structure. In a situation in which no mesh consistency exists, this state may not be realized by the conventional method that uses the basis function that is continuous in units of elements with respect to the pressure, because the basis function of the finite element is usually defined to include the continuous function for the pressure and the velocity gradient within the element, and may not represent the discontinuity within the element. Hence, in this embodiment, the IME that follows and moves with the structure in motion is defined, centering on the interaction boundary $\Sigma$, and the inside of the element is regarded as the support, in order to realize the discontinuity of the fluid pressure by modifying the fluid pressure by the introduction of the pressure correcting function that changes the sign on the top surface and the bottom surface of the structure. At the same time, in the interaction term of the pressure correcting function and the velocity of the fluid defined in the global domain, of the pressure gradient force term and the incompressibility condition term of the weak form, the boundary integral of the structure is obtained by using the Green's theorem, and the velocities of the fluid and the structure are matched in order to control the displacement. For this reason, the pressure correcting function needs to have high regularity compared to the ordinary pressure.

Figure 31:
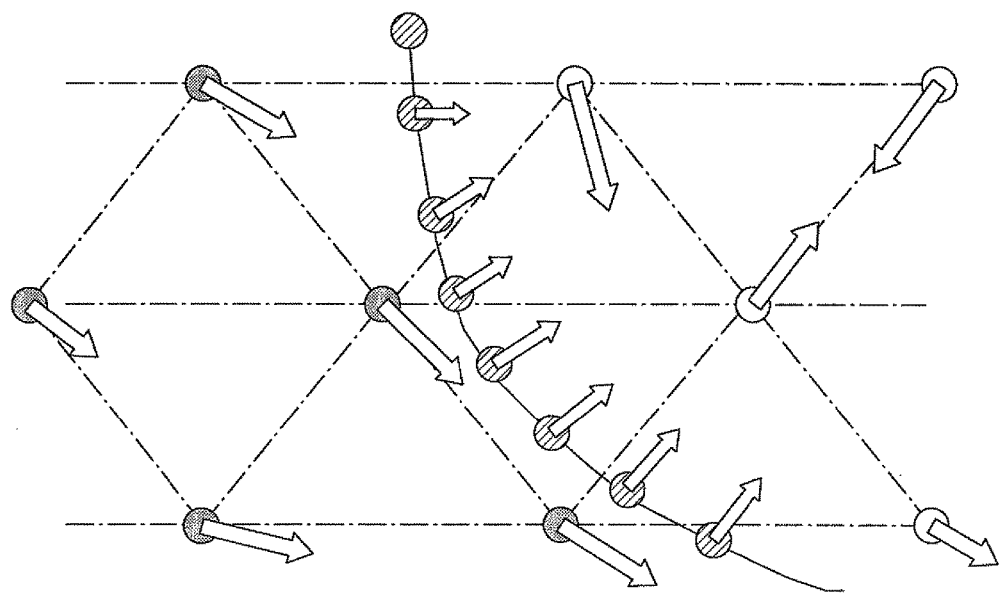
FIG. 31 is a diagram for explaining the interaction of the fluid and the structure.

Next, a description will be given of how to realize a phenomenon in which the structure is dragged by the difference in the velocity gradients of the fluid and while the velocity v of the fluid is continuous, the velocity gradient thereof is discontinuous, by referring to FIG. 31. FIG. 31 is a diagram for explaining the interaction of the fluid and the structure. Due to the viscous condition on the interaction boundary $\Sigma$ between the fluid and the structure, the velocity v of the fluid satisfies $v=\dot{d}$ on $\Sigma$ while undergoing spatially continuous change. At the same time, in order to satisfy this viscous condition, the spatial gradient $\mathbf{v} \equiv v \otimes \nabla$ becomes spatially discontinuous on the interaction boundary $\Sigma$. The interaction boundary $\Sigma$ is dragged by the difference in the velocity gradients on the top surface and the bottom surface of the interaction boundary $\Sigma$, and the displacement of the structure is affected thereby. Such a displacement of the structure, in a situation in which no mesh consistency exists, may not be realized by the conventional method in which the basis function with the gradient that is continuous in units of elements with respect to the velocity is used. Hence, in this embodiment, the IME that follows and moves with the structure in motion is defined on the top surface and the bottom surface of the structure, centering on the interaction boundary $\Sigma$, and the inside of the element is regarded as the support, in order to realize the discontinuity of the first derivative by modifying the fluid velocity by introducing the velocity correcting function. At the same time, in the interaction term of the velocity correcting function and the velocity of the fluid defined in the global domain, of the viscous term of the weak form, the boundary integral of the structure is obtained by using the Green's theorem, and the velocities of the fluid and the structure are matched in order to satisfy the viscous condition. For this reason, the velocity correcting function needs to have high regularity compared to the ordinary velocity.

Next, a description will be given of the definitions of the IME about the pressure and the pressure correcting function. In order to treat the discontinuity of the pressure occurring at the interaction boundary $\Sigma$ of the fluid and the structure, $\tilde{p}_0(y)(y \in \Sigma)$ that is defined on the interaction boundary $\Sigma$ is introduced, to form $\tilde{p}$ that changes sign discontinuously before and after the interaction boundary $\Sigma$ based on $\tilde{p}_0$.

$$\mathcal{P}(x) = p(x) + \tilde{p}(x) \quad (x \in \Omega) \tag{79}$$

$$\begin{cases} \tilde{p}(x) = 0 & (x \notin \Sigma) \\ \tilde{p}(x+0) \equiv \lim_{\varepsilon \searrow 0} \tilde{p}(x+\varepsilon n(x)) = +\int_\Sigma \tilde{p}_0(y)\delta(x-y)dy & (x \in \Sigma) \\ \tilde{p}(x-0) \equiv \lim_{\varepsilon \nearrow 0} \tilde{p}(x+\varepsilon n(x)) = -\int_\Sigma \tilde{p}_0(y)\delta(x-x)dy & (x \in \Sigma). \end{cases} \tag{80}$$

In the formulas (79) and (80) above, $\Omega$ denotes the fluid region, p(x) ($x \in \Omega$) denotes the pressure of the fluid defined in the global domain, and n(y) ($y \in Z$) denotes a unit normal uniquely defined at each point $y \in \Sigma$ on the interaction boundary $\Sigma$. In the following description, v denotes the arbitrary unit normal or the outward pointing unit normal of the control volume, and v is appropriately modified to $\pm n$ by taking the direction into consideration, in the case of the normal vector on the interaction boundary $\Sigma$. Further, $\delta$ denotes Dirac's delta function.

The conventional finite element method uses the pressure p of the fluid, and the piecewise constant or piecewise linear function is solved within the element in many cases. However, the pressure of the fluid may be corrected as represented in the following formula (79), in order to generate the pressure difference $2\tilde{p}_0$ between the top surface and the bottom surface of the interaction boundary $\Sigma$ for the pressure $\mathcal{P}$ as a whole, and realize the discontinuity.

Next, in order to facilitate the numerical process, the sharpness of the Dirac's $\delta$ described above is reduced, and an approximation is performed using the function $\hat{\delta}$ having the spread in the support by taking into consideration of the sign before and after the interaction boundary $\Sigma$. In the formula (80), $\tilde{p}$ is defined using $\delta$ so that the sign changes based on the top surface and the bottom surface of the interaction boundary $\Sigma$ at each point on the interaction boundary $\Sigma$. When approximating $\delta$, it is assumed that the unit vector is specified, the sign reverses between the top surface and the bottom surface, and the analytic function is obtained within the support other than the interaction boundary $\Sigma$. Particularly, $\delta$ may be a function such as that illustrated in FIGS. 26A and 25B. Using $\delta$, $\tilde{p}$ may be approximated in the following manner.

(i) If $(x-y)\cdot n>0$, $y\in\Sigma$, the following stands in correspondence with the second formula of the formula (80) described above.

$$\tilde{p}(x) \sim +\int_{\Sigma} \tilde{p}_0(y)\delta(x-y:n(y))dy$$

(ii) If $(x-y)\cdot n<0$, $y\in\Sigma$, the following stands in correspondence with the third formula of the formula (80) described above, because the signs on the top surface and the bottom surface have already been taken into consideration by $\delta$.

$$\tilde{p}(x) \sim +\int_{\Sigma} \tilde{p}_0(y)\delta(x-y:n(y))dy$$

Accordingly, (i) and (ii) above may be combined to obtain the following formula (81).

$$\tilde{p}(x) = \sim +\int_{\Sigma} \tilde{p}_0(y)\delta(x-y:n(y))dy(x\in\Omega) \quad (81)$$

Similar definitions may be made with respect to the test function $\delta\tilde{p}$ corresponding to $\tilde{p}$.

Accordingly, the pressure correcting function $\tilde{p}$ having the spread of approximately $\kappa$ in the periphery of the interaction boundary $\Sigma$, and the corresponding test function $\delta\tilde{p}$ may be created. The union of the supports of these functions $\tilde{p}$, $\delta\tilde{p}$ is $\tilde{\Omega}$, and this union $\tilde{\Omega}\tilde{p}$ may be represented by the following, having the spread of approximately $\kappa$ in the periphery of the interaction boundary $\Sigma$, if divided into the top surface and the bottom surface of the interaction boundary $\Sigma$.

$$\tilde{\Omega}=\tilde{\Omega}^+\cup\tilde{\Omega}^-, \tilde{\Omega}^+\cap\tilde{\Omega}^-=0, \tilde{\Omega}^\pm=\{x\in\tilde{\Omega}|(x-y)\cdot n \gtreqless 0, y\in\Sigma\}$$

Of course, this embodiment does not anticipate a motion in which the interaction boundary $\Sigma$ curls up and the top surface and the bottom surface may not be uniquely determined due to such a deformation.

In addition, as described above, the support size $\kappa$ of the correcting function may be selected such that the IMEs overlap without a gap therebetween on the interaction boundary $\Sigma$ of the fluid and the structure. More particularly, in a case in which the interaction boundary $\Sigma$ is segmented into the finite elements using triangular elements and one IME is arranged at the center of each triangular element, a hemisphere having a radius $\kappa=\alpha L$ or a right circular cylinder having a radius or a height $\kappa$ with respect to a maximum value L of the finite element forming the interaction boundary $\Sigma$ and a real number $\alpha$ having a value of approximately 1, may be arranged on the top surface and the bottom surface of the interaction boundary $\Sigma$ of the fluid and the structure. By defining the pressure correcting function within such finite elements, the support of each of the correcting functions may have a length scale of approximately $\kappa$.

When the pressure correcting function $\tilde{p}$ is used in the constraint condition of the formula (66) described above, the following terms) $\int_{\tilde{\Omega}}\delta\tilde{p}\nabla\cdot v dx$ and $\int_{\tilde{\Omega}}\tilde{p}\nabla\cdot\delta v dx$ are respectively added to the pressure gradient force term and the incompressibility condition term appearing in the governing equation of the fluid, as will be described later. Hence, the expression matches that of the formulation of the equation from the incompressibility condition of the fluid in the region $\tilde{\Omega}^\pm$ not spanning the interaction boundary $\Sigma$ of the fluid and the structure using Lagrangian multipliers. The details of the above expressions are described in Hisada et al., for example, and a description thereof will be omitted.

Next, a description will be given of the definitions of the IME of the velocity and the velocity correcting function. When the method of Lagrangian multipliers, which treats the viscous condition $v=d$ on $\Sigma$ as it is as the constraint condition, is used when realizing the viscous condition of the velocity on the interaction boundary $\Sigma$ of the fluid and the structure, an unnatural flow that does not match the physical phenomenon occurs on one side of the interaction boundary $\Sigma$, because the viscous condition on the interaction boundary $\Sigma$ is satisfied at the node within the fluid element, including the node of the Lagrangian multipliers at the boundary, as illustrated in FIG. 32.

Figure 32:
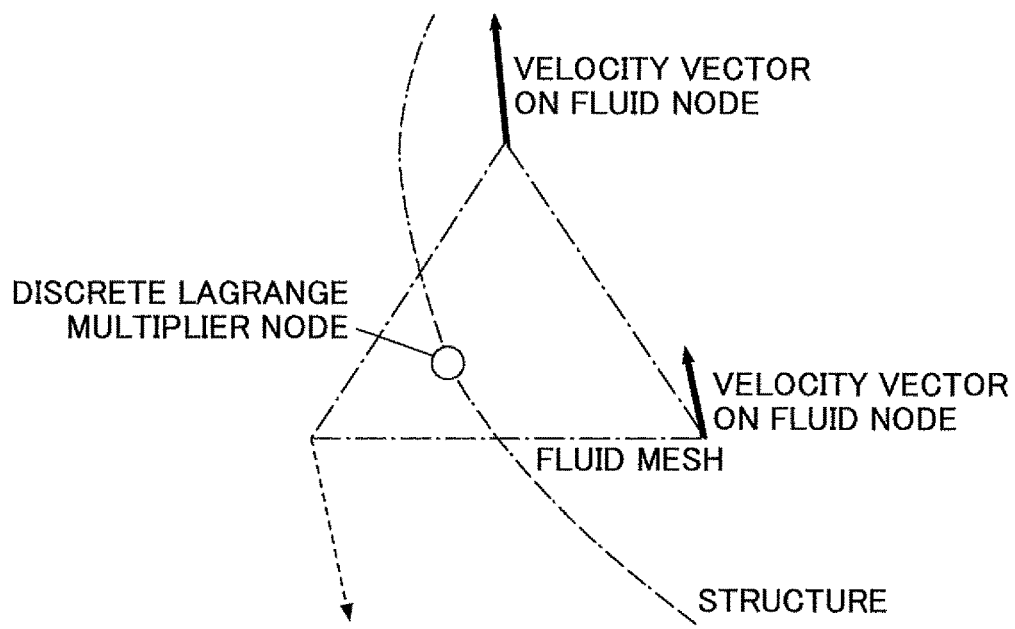
FIG. 32 is a diagram illustrating a schematic image of a result of the viscous condition at an interaction boundary Σ using the method of Lagrangian multipliers.

FIG. 32 is a diagram illustrating an image of a result of the viscous condition at the interaction boundary $\Sigma$ using Lagrangian multipliers, such as that described in de Hart et al., for example. When the viscous condition at one point (indicated by a circular symbol in FIG. 32) on the interaction boundary $\Sigma$ is implemented by the Lagrangian multipliers, in the velocity node included in the same triangular element for realizing the viscous boundary condition, a velocity (indicated by a dotted line arrow in FIG. 32) may be generated in a reverse direction on the fluid node existing at one end of the structure in order to cancel the contribution of the velocity (indicated by a bold solid line arrow in FIG. 32) at the fluid node existing at the other end of the structure. However, such a phenomenon may not match the physical phenomenon.

Hence, this embodiment modifies the technique with respect to the pressure proposed in Hisada et al., for example, in order to realize the viscous boundary condition for the velocity, by using the element having a spread in the neighborhood of the interaction boundary $\Sigma$ also for the velocity, and the constraint condition based on the Green's theorem. For this purpose, the correcting function is introduced in a manner similar to the formula (81) described above. First, the function illustrated in FIGS. 29A and 29B, satisfying the following conditions, is prepared.

$$\text{supp}\tilde{\gamma}(y:\pm v)\cap\{\pm(y\cdot v)\leq 0\}=\emptyset \quad (82)$$

$$\tilde{\gamma}(y:v)=0 \text{ on } \Sigma \quad (83)$$

$$\tilde{\gamma}(y:v)=0 \text{ at } \partial\{\text{supp}\tilde{\gamma}\} \quad (84)$$

$$\nabla\tilde{\gamma}(y:v)\cdot 0, \text{ on } \Sigma \quad (85)$$

$$\nabla\tilde{\gamma}(y:v)=0, \text{ at } \partial\{\text{supp}\tilde{\gamma}\}\backslash \quad (86)$$

$$\tilde{\gamma}(y:v)\in C^2(\{y\cdot v>0\}) \quad (87)$$

Then, the prepared correcting function is used to define the correcting functions on the top surface and the bottom surface of the interaction boundary $\Sigma$ at each point on the interaction boundary $\Sigma$, in the following manner.

$$\mathcal{V}(x)=v(x)+\tilde{v}^+(x)+\tilde{v}^-(x) \quad (x\in\Omega) \quad (88)$$

$$\begin{cases} \tilde{v}^+(x)=\int_\Sigma \tilde{v}_0^+(y)\tilde{\gamma}(x-y:n(y))dy, \\ \tilde{v}^-(x)=\int_\Sigma \tilde{v}_0^-(y)\tilde{\gamma}(x-y:-n(y))dy. \end{cases} (x\in\Omega) \quad (89)$$

It is assumed that $D_\kappa^\pm=\{B_\kappa^\pm, C_\kappa^\pm\}$, and $B_\kappa$ is an open sphere having a radius $\kappa$, in order to obtain the following.

$$B_\kappa^\pm(z:v)=\{z\in B_\kappa|z\cdot v\gtreqless 0\}$$

$$C_\kappa^\pm(z:v)=\{z=(z_1,z_2,z_3)|z_1^2+z_2^2<\kappa^2,|z_3|<\kappa,z\cdot v\gtreqless 0\}$$

Hence, velocity correcting function $\tilde{v}^\pm$ having the spread of approximately $\kappa$ in the periphery of the interaction boundary $\Sigma$, and the corresponding test function $\delta\tilde{v}^\pm$ may be created, in a manner similar to that with respect to the pressure. The union of $\tilde{\Omega}$ the supports of the above may be represented by $\tilde{\Omega}^\pm=\{x\in\Omega|\tilde{\delta}^{-1}(R\setminus\{0\}:\pm n)\}$ if the union $\tilde{\Omega}$ is divided into $\tilde{\Omega}=\tilde{\Omega}+\cup\tilde{\Omega}^-$, $\tilde{\Omega}^+\cap\tilde{\Omega}^-=\emptyset$, $\tilde{\Omega}^\pm=\{x\in\tilde{\Omega}|(x-y)\cdot n\gtreqless 0, y\in\Sigma\}$, and it was confirmed that the spread of $\kappa$ is obtained in the periphery of the interaction boundary $\Sigma$. Thus, velocity correcting function $\tilde{v}^\pm$ can be rewritten as follows.

$$\tilde{v}^\pm = \int_\Sigma \tilde{v}_0^\pm(y)\tilde{\gamma}(x-y:\pm n(y))dy \tag{90}$$

In addition, the support size of the velocity correcting function may be determined in a similar manner as that for the pressure correcting function. In other words, the support size $\kappa$ of the correcting function may be selected such that the IMEs overlap without a gap therebetween on the interaction boundary $\Sigma$ of the fluid and the structure. Of course, this embodiment does not anticipate a motion in which the interaction boundary $\Sigma$ curls up and the top surface and the bottom surface may not be uniquely determined due to such a deformation. The velocity v is the velocity of the fluid used by the conventional finite element method, and the velocity gradient is continuous within the element. However, by correcting this velocity v, the velocity V as a whole may become continuous on the interaction boundary $\Sigma$, and the gradient thereof may become discontinuous.

Accordingly, as illustrated in FIGS. 25A and 26B, for example, the finite element (IME) that follows the displacement of the structure in motion and moves, may be systematically arranged and defined on the top surface and the bottom surface of the interaction boundary $\Sigma$ of the fluid and the structure, for each two-dimensional finite element forming the interaction boundary $\Sigma$, so that $(\tilde{p}_0, \tilde{v}_0)$ defined on the interaction boundary $\Sigma$ are expanded in the neighborhood of the interaction boundary $\Sigma$ due to the basis function $\tilde{\delta},\tilde{\gamma}$ having the spread in the support.

Next, a description will be given again on the definition of the weak form. In this embodiment, the degrees of freedom (or dependent variables) of the fluid are corrected, and the correcting functions are caused to bear the interaction with the structure. Hence, the Navier-Stokes equation that is the governing equation for the fluid, and the equation of motion for the structure, are used as the fundamental equations.

The governing equation for the incompressible Newtonian fluid may be represented by the following, where $\rho$ denotes the density of the fluid, $\mu$ denotes the viscosity coefficient of the fluid, g denotes the external force per unit volume, p denotes the pressure, v denotes the velocity, and $T=-pI+2\mu D_v$ denotes the Cauchy stress.

$$\rho\left(\frac{\partial v}{\partial t}+v\cdot\nabla v\right)=\nabla\cdot T+\rho g, \quad x\in\Omega \tag{91}$$

$$\nabla\cdot v=0, \quad x\in\Omega \tag{92}$$

$$T=-pI+2\mu D_v, \quad D_v=\frac{1}{2}(L_v+{}^t L_v), \quad L_v=\frac{\partial v}{\partial x}=v\otimes\nabla. \tag{93}$$

The corresponding weak form can be represented as follows, where $\Gamma$ denotes the boundary where the stress $\tau$ is applied.

$$\delta W_f := \int_\Omega \left[\rho\delta v\cdot\left(\frac{\partial v}{\partial t}+v\cdot\nabla v\right)-(p\nabla\cdot\delta v-\delta p\nabla\cdot v)+ 2\mu\delta D_v: D_v-\rho\delta v\cdot g\right]dx + \int_\Gamma \delta v ds = 0 \tag{94}$$

Similarly, the weak form for the structure can be represented by the following using the Lagrange coordinate X, where d denotes the displacement, E denotes the Green-Lagrange strain, and S denotes the second Piola-Kirchhoff stress.

$$\delta W_s := \int_{\Sigma^0}[\rho_s\delta d\cdot\ddot{d}+S:\delta\dot{E}-\rho_s g\cdot\delta d]dX - \int_{\Gamma_X}\tau_s\cdot\delta d ds = 0 \tag{95}$$

It is assumed above that $\Gamma_X$ denotes the boundary where the stress $\tau_s$ is applied. The independent variables are the time $t>0$, and the space $x\in\Omega\subset R^3$. The parameters include the density $\rho$ and the viscosity coefficient $\mu$ of the fluid, and the density $\rho_s$ of the structure. The dependent variables include the fluid velocity v $(0,T)\times\Omega\to R^3$, the fluid pressure p: $\Omega\to R$, and the displacement of the structure, d: $(0,T)\times\Omega X\to R^3$.

Next, a description will be given of the interaction of the pressure. First, the interaction of the pressure correcting function can be obtained by transposing the pressure p by $\mathcal{P}=p+\tilde{p}$ in the equation $\delta W_f+\delta W_s=0$, using the Green's theorem.

$$\delta W_f^p + \delta W_s = \int_\Omega \left[\rho\delta v\cdot\left(\frac{\partial v}{\partial t}+v\cdot\nabla v\right)-(\mathcal{P}\nabla\cdot\delta v-\delta\mathcal{P}\nabla\cdot v)+ 2\mu\delta D_v: D_v-\rho\delta v\cdot g\right]dx +$$
$$\int_\Gamma \delta v\cdot\tau ds + \int_{\Sigma^0}[\rho_s\delta d\cdot\ddot{d}+S:\delta\dot{E}-\rho_s g\cdot\delta d]dX -$$
$$\int_{\Gamma_X}\tau_s\cdot\delta d ds$$
$$= \delta W_f + \delta W_s - \int_\Omega(\tilde{p}\nabla\cdot\delta v - \delta\tilde{p}\nabla\cdot v)dx$$
$$= \delta W_f + \delta W_s + \int_\Omega(\nabla\tilde{p}\cdot\delta v - \nabla\delta\tilde{p}\cdot v)dx -$$
$$\int_\Sigma(\tilde{p}\delta v\cdot v - \delta\tilde{p}v\cdot v)dx$$

Because $\delta\tilde{p}$ is arbitrary, $-\delta\tilde{p}$ may be interpreted as $\delta\tilde{p}$ in the following manner.

$$\delta W_f^p + \delta W_s = \delta W_f + \delta W_s + \delta J_p. \tag{96}$$

On the other hand, as described above, the interaction of the velocity uses, as the starting point, the identity satisfied by the viscous operator of the Newtonian fluid obtained by the Green's theorem. Hence, the relation of the interaction of the velocity to the viscous term of the fluid matches that of the zero identity obtained from the symmetry property of the deformation velocity, and the following formulas stand.

$$0 = \int_\Omega 2\mu[D_v: \tilde{D}_v - \tilde{D}_v: D_v]dx$$
$$= \int_\Omega 2\mu D_v: \tilde{D}_v dx - \int_\Omega 2\mu\tilde{D}_v: D_v dx$$
$$= -\int_\Omega 2\mu\nabla\cdot D_v\cdot\tilde{v}dx + \int_\Omega 2\mu\nabla\cdot\tilde{D}_v\cdot v dx - \int_\Sigma 2\mu v\cdot\tilde{D}_v\cdot v dx$$
$$= \int_\Omega\rho G\cdot\tilde{v}dx + \int_\Omega 2\mu\nabla\cdot\tilde{D}_v\cdot v dx - \int_\Sigma 2\mu\dot{d}\cdot\tilde{D}_v\cdot v dx \equiv J_v.$$

Next, a description will be given of the interaction matrix of the pressure correcting function and the fluid velocity, in relation to the implementation of the numerical integration. First, a description will be given of the matrix that gives the contribution $\delta J_p^v$ in the formula (68) described above.

$$\delta J_p^v = \delta J_p^{v1} + \delta J_p^{v2}$$

$$\delta J_p^{v1} = \int_{\tilde{\Omega}}\delta\tilde{p}\cdot v dx, \delta J_p^{v2} = \int_{\tilde{\Omega}}\tilde{p}\cdot\delta v dx$$

Between these terms, one term may be computed and the other term may be transposed and used, due to symmetry. Hence, a description will be given of an example using the term $\delta J_p^{v1}$. The numerical integral may be approximated by the multiply and accumulation of the function value of the integrand at the integral points regularly distributed within the element, and the weight of the volume element or the Gaussian quadrature. In the integral obtained by the weak form, the control region may be divided into the top surface and the bottom surface of the interaction boundary $\Sigma$ to obtain $$\delta J_p^{v1} \sum_{h=\pm} \int_{\tilde{\Omega}^h} \nabla \delta \tilde{p} \cdot v \, dx$$

and next, the formula (81) may be substituted to rearrange the integration order as follows.

$$\delta J_p^{v1} = \sum_{h=\pm} \int_{\tilde{\Omega}^h} \nabla \left[ \int_\Sigma \delta \tilde{p}_0(y) \tilde{\delta}(x-y; n(y)) dy \right] \cdot v \, dx$$

$$= \sum_{h=\pm} \int_\Sigma \delta \tilde{p}_0(y) \left[ \int_{\tilde{\Omega}^h} \nabla \tilde{\delta}(x-y; n(y)) \cdot v \, dx \right] dy$$

When the interaction boundary $\Sigma$ is segmented into the elements "e" of the structure, and the Gaussian quadrature is used in the element e, the following can be obtained by denoting the Gaussian point and the weight of the Gaussian quadrature by $y_g$ and $w_g$, respectively.

$$\delta J_p^{v1} = \sum_{h=\pm} \sum_e \int_e \delta \tilde{p}_0(y) \left[ \int_{\tilde{\Omega}^h} \nabla \tilde{\delta}(x-y; n(y)) \cdot v \, dx \right] dy$$

$$= \sum_{h=\pm} \sum_e \sum_g \delta \tilde{p}_0(y_g) \left[ \int_{\tilde{\Omega}^h} \nabla \tilde{\delta}(x-y_g; n(y_g)) \cdot v \, dx \right] w_g$$

When the discrete point within the IME or the fluid element defined in the global domain is denoted by $x_s$ using a subscript s, and the weight of the volume element or the Gaussian quadrature is denoted by $V_s$, the following can be obtained.

$$\delta J_p^{v1} = \sum_{h=\pm} \sum_e \sum_g \sum_s \delta \tilde{p}_0(y_g) [\nabla \tilde{\delta}(x_s - y_g; n(y_g)) \cdot v_s] w_g V_s$$

Further, the following formula (97) can be obtained by denoting the velocity correcting function of the fluid in the background defined in the global domain, in the interacting fluid element searched by the search part, by N, and denoting the interpolation by $$v_s = \sum_j v_j N_j(\xi_s). \tag{97}$$

$$\delta J_p^{v1} =$$

$$\sum_{h=\pm} \sum_e \sum_g \sum_s \sum_j \delta \tilde{p}_0(y_g) [\nabla \tilde{\delta}(x_s - y_g; n(y_g)) \cdot v_j N_j(\xi_s)] w_g V_s.$$

Next, a description will be given of the interaction matrix of the velocity correcting function and the fluid velocity. A description will be given of the matrix that gives the contribution of the term represented by the volume integral in $\delta J_v$ represented by the formulas (69) and (70). The following formulas will be described because the concept is similar to that described above.

$$\delta J_v^{vs} = \delta J_v^{vs1} + \delta J_v^{vs2} \tag{98}$$

$$\delta J_v^{vs1} = \int_{\tilde{\Omega}} 2\mu \nabla \cdot \delta \tilde{D}_v \cdot v \, dx, \delta J_v^{vs2} = \int_{\tilde{\Omega}} 2\mu \nabla \cdot \tilde{D}_v \cdot \delta v \, dx \tag{90}$$

Between the above terms, one term may be computed, and the other term may be transposed and used, due to symmetry. The numerical integration may be approximated by the multiply and accumulation of the function value of the integrand at the integral points regularly distributed within the element, and the weight of the volume element or the Gaussian quadrature. Similarly as in the case of the interaction matrix of the pressure correcting function and the fluid velocity, the following can be obtained.

$$\delta J_v^{vs1} \equiv \int_{\tilde{\Omega}} 2\mu \nabla \cdot \delta \tilde{D}_v \cdot v \, dx$$

$$= \sum_{h=\pm} \int_{\tilde{\Omega}^h} 2\mu \nabla \cdot \delta \tilde{D}_v^h \cdot dx$$

$$= \sum_{h=\pm} \int_{\tilde{\Omega}^h} 2\mu \nabla \cdot \left\{ \frac{\partial \delta \tilde{v}^h}{\partial x} + {}^t\left(\frac{\partial \delta \tilde{v}^h}{\partial x}\right) \right\} \cdot v \, dx$$

$$= \sum_{h=\pm} \int_{\tilde{\Omega}^h} 2\mu \frac{\partial}{\partial x^p} \left( \frac{\partial \delta \tilde{v}^{h,p}}{\partial x^q} + \frac{\partial \delta \tilde{v}^{h,q}}{\partial x^p} \right) v^q \, dx$$

Further, the following can be obtained using the formula (90).

$$\delta J_v^{vs1} = \sum_{h=\pm} \int_{\tilde{\Omega}^h} 2\mu \frac{\partial}{\partial x^p} \left\{ \begin{array}{l} \frac{\partial}{\partial x^q} \left( \int_\Sigma \delta \tilde{v}_0^{h,p}(y) \tilde{\gamma}(x-y; hn(y)) dy \right) + \\ \frac{\partial}{\partial x^p} \left( \int_\Sigma \delta \tilde{v}_0^{h,q}(y) \tilde{\gamma}(x-y; hn(y)) dy \right) \end{array} \right\} v^q \, dx \tag{100}$$

$$= \sum_{h=\pm} \int_\Sigma \left[ \begin{array}{l} \delta \tilde{v}_0^{h,p}(y) \left\{ \int_{\tilde{\Omega}^h} 2\mu \frac{\partial}{\partial x^p} \frac{\partial}{\partial x^q} \tilde{\gamma}(x-y; hn(y)) v^q dx \right\} + \\ \delta \tilde{v}_0^{h,q}(y) \left\{ \int_{\tilde{\Omega}^h} 2\mu \frac{\partial}{\partial x^p} \frac{\partial}{\partial x^q} \tilde{\gamma}(x-y; hn(y)) v^q dx \right\} \end{array} \right] dy$$

$$= \sum_{h=\pm} \sum_e \int_e \left[ \begin{array}{l} \delta \tilde{v}_0^{h,p}(y) \left\{ \int_{\tilde{\Omega}^h} 2\mu \frac{\partial}{\partial x^p} \frac{\partial}{\partial x^q} \tilde{\gamma}(x-y; hn(y)) v^q dx \right\} + \\ \delta \tilde{v}_0^{h,q}(y) \left\{ \int_{\tilde{\Omega}^h} 2\mu \frac{\partial}{\partial x^p} \frac{\partial}{\partial x^q} \tilde{\gamma}(x-y; hn(y)) v^q dx \right\} \end{array} \right] dy$$

-continued $$= \sum_{h=\pm}\sum_{e}\sum_{g} \begin{bmatrix} \delta\tilde{v}_0^{h,p}(y_g)\left\{\int_{\Omega^h} 2\mu \frac{\partial}{\partial x^p}\frac{\partial}{\partial x^q}\tilde{\gamma}(x-y_g: hn(y_g))v^q dx\right\} + \\ \delta\tilde{v}_0^{h,q}(y_g)\left\{\int_{\Omega^h} 2\mu \frac{\partial}{\partial x^p}\frac{\partial}{\partial x^p}\tilde{\gamma}(x-y_g: hn(y_g))v^p dx\right\} \end{bmatrix} w_g$$

$$= \sum_{h=\pm}\sum_{e}\sum_{g}\sum_{s} 2\mu \begin{bmatrix} \delta\tilde{v}_0^{h,p}(y_g)\left\{\frac{\partial}{\partial x^p}\frac{\partial}{\partial x^q}\tilde{\gamma}(x_s-y_g: hn(y_g))\right\} + \\ \delta\tilde{v}_0^{h,q}(y_g)\left\{\frac{\partial}{\partial x^p}\frac{\partial}{\partial x^p}\tilde{\gamma}(x_s-y_g: hn(y_g))\right\} \end{bmatrix} v^p w_g V_s$$

$$= \sum_{h=\pm}\sum_{e}\sum_{g}\sum_{s}\sum_{j} 2\mu \begin{bmatrix} \delta\tilde{v}_0^{h,p}(y_g)\left\{\frac{\partial}{\partial x^p}\frac{\partial}{\partial x^q}\tilde{\gamma}(x_s-y_g: hn(y_g))\right\} + \\ \delta\tilde{v}_0^{h,q}(y_g)\left\{\frac{\partial}{\partial x^p}\frac{\partial}{\partial x^p}\tilde{\gamma}(x_s-y_g: hn(y_g))\right\} \end{bmatrix} v_j^q N_j w_g V_s$$

$$= \sum_{h=\pm}\sum_{e}\sum_{g}\sum_{s}\sum_{j} 2\mu \delta\tilde{v}_0^{h,p}(y_g) v_j^q N_j w_g V_s \times$$

$$\left[\frac{\partial}{\partial x^p}\frac{\partial}{\partial x^q}\tilde{\gamma}(x_s-y_g: hn(y_g)) + \delta^{pq}\Delta\tilde{\gamma}(x_s-y_g: hn(y_g))\right].$$

Next, a description will be given of the interaction matrix of the pressure correcting function and the displacement velocity of the structure. In the matrix that gives the contribution of the term represented by $\delta J_p^s$ in the formula (74), one term may be computed, and the other term may be transposed and used, due to symmetry. The numerical integral is performed for each two-dimensional element e forming the interaction boundary $\Sigma$, on the interaction boundary $\delta$.

In addition, the approximation assumes that the inside of each two-dimensional element e forming the interaction boundary $\Sigma$ is $\dot{d}$ and uniform, and the value $\dot{d}_e$ is defined by the average value of the values at each of the nodes. The following relation is assumed to stand if the number of elements e is K.

$$\dot{d}_e := \frac{1}{K}\sum_{k}\dot{d}_{ek}. \tag{101}$$

Further, the following approximation is made by assuming that the integral of $\delta\tilde{p}$ is analytically obtained in advance.

$$\int_{\Sigma}\delta\tilde{p}\dot{d}\cdot v ds \sim (\dot{d}_e \cdot v)\int_{\Sigma}\delta\tilde{p}ds \tag{102}$$

Next, a description will be given of the interaction matrix of the velocity correcting function and the displacement velocity of the structure. In the matrix that gives the contribution of the term represented by $\delta J_p^s$ in the formula (77), one term may be computed, and the other term may be transposed and used, due to symmetry. The numerical integral is performed for each two-dimensional element e forming the interaction boundary $\Sigma$, on the interaction boundary $\Sigma$, in a manner similar to that for the interaction matrix of the pressure correcting function and the displacement velocity of the structure. In addition, the approximation assumes that in each two-dimensional element e forming the interaction boundary $\Sigma$ the displacement $\dot{d}$ is uniform, and the value $\dot{d}_e$ is defined by the average value of the values at each of the nodes.

The integral of $\delta\tilde{D}_v$ may be analytically obtained in advance, and the integral may be approximated by the following.

$$\int_{\Sigma}2\mu\dot{d}\cdot\delta\tilde{D}_v\cdot v ds \sim 2\mu\dot{d}_e\cdot\int_{\Sigma}\delta\tilde{D}_v\cdot v ds \tag{103}$$

As described above, in the fluid structure interaction simulation, the finite element that follows the displacement of the structure in motion and moves therewith is defined on the interaction boundary of the fluid and the structure. The correcting functions of the pressure and the velocity are arranged within the element, and the interaction of the fluid and the structure is represented using the weak form exposing the boundary integral. Hence, the simulation may be performed in a state in which the meshes of both the fluid region and the structure region are independent. As a result, the problem associated with the mesh mismatch state may be solved, and the mesh control may be unnecessary.

In this embodiment, the following features (k1) through (k7) may be realized because the fluid structure interaction simulation is not dependent on the mesh consistency.

(k1) The simulation will not be stopped by the crash of the meshes. In other words, the meshes do not cause problems unless the structure escapes outside the range of the meshes of the fluid region.

(k2) The simulation can be applied to a problem in which structures contact each other.

(k3) The degree of freedom for the mesh control is unnecessary when compared to the ALE method, and thus, the memory region required for the computation process may be reduced. To be more precise, the degree of freedom to represent the correcting functions on the free boundary is required, but the domain is reduced from three dimensions to two dimensions, and the degree of freedom may be reduced considerably when compared to the ALE method.

(k4) The mesh control does not need to solve the elastic problem, and hence, the speed of the process may be increased.

(k5) Because the creation of the fluid meshes need not be delicate as in the case of the ALE method, the resources including human resources and experience resources required to create the meshes may be reduced.

(k6) Although the meshes of the fluid part becomes extremely small in the case of a structure having a complex geometrical shape in order to maintain mesh consistency when the IT type technique is used, the described embodiment need only prepare meshes that may enable the simulation of the fluid to progress smoothly.

(k7) The fluid structure interaction simulation may be performed by simply adding an interaction routines to an existing fluid code. In this case, the existing fluid code is not limited to the finite element method, and arbitrary numerical simulation techniques may be used, such as the finite difference method and the finite volume method. In other words, any suitable numerical simulation technique may be used as long as the interpolation method is established for the physical quantities on arbitrary points other than the discrete points given by the pressure and the velocity of the fluid.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fluid structure interaction simulation method to perform a process for simulating mechanical interaction between a fluid and a structure in a biomechanical system, executed by a processor included in a fluid structure interaction simulation apparatus, the process comprising:
   a graph information forming process, executed by the processor, to form graph information of nodes obtained by discretising a computing region for each of a fluid and a structure in the biomechanical system that are represented by meshes; and
   a main time development loop process, executed by the processor, to simulate the mechanical interaction between the fluid and the structure,
   wherein the main time development loop process includes:
      arranging interaction mediating elements that move with a displacement of the structure, on a boundary of the structure and the fluid;
      defining, within the interaction mediating element, a correcting function of a pressure and a correcting function of a velocity of the fluid that interact with the pressure and the velocity of the fluid and the displacement of the structure, to mediate interaction of the displacement of the structure and the pressure and the velocity of the fluid;
      executing a simulation based on the correcting functions, in a state in which the meshes of the fluid are mismatched to the meshes of the structure,
   wherein the correcting functions are Lagrangian multipliers having, as a constraint condition, a relation satisfied by an incompressibility condition of the fluid and a relation satisfied by a viscous operator of a Newtonian fluid, at a boundary part between the fluid and the structure, based on Green's theorem, thereby compensating for the mismatched meshes of the fluid and the structure,
   wherein the main time development loop process includes:
   a first process to create both of a matrix and an equivalent nodal force of each element of the structure by using a time discretization technique and to create both of a matrix and an equivalent nodal force of each element of the fluid by using the time discretization technique;
   a second process to create a matrix representing interaction of the velocity, the pressure, and the correcting functions for each interaction mediating element;
   a third process to create a matrix equation with respect to all degrees of freedom by restructuring a contribution from the matrix of each element, based on the matrix of each element and the matrix representing the interaction;
   a fourth process to solve and evaluate a variation of dependent variables, including the pressure, the velocity, and the displacement, of the fluid and the structure every time a Newton-Raphson loop is executed in the main time development loop process; and
   a fifth process to display the variation of the dependent variables and the evaluation thereof.

2. The method as claimed in claim 1, wherein the main time development loop process includes:
   searching for a background fluid element having an overlap with the interaction mediating element, based on a change in an interaction pair formed by the interaction mediating element and a degree of freedom of the fluid as the interaction mediating element moves;
   determining a fluid node that is a member of the fluid element as belonging to the interaction pair; and
   executing the simulation based on the interaction pair.

3. The method as claimed in claim 1, wherein the second process includes:
   computing an interaction matrix of the correcting function of the pressure, and the velocity of the fluid;
   computing an interaction matrix of the correcting function of the velocity, and the velocity of the fluid;
   computing an interaction matrix of the correcting function of the pressure, and a displacement velocity of the structure; and
   computing an interaction matrix of the correcting function of the velocity, and the displacement velocity of the structure.

4. The method as claimed in claim 1,
   wherein the correcting functions have a non-zero value only within the interaction mediating element; and
   wherein the main time development loop process applies a condition to each of a region having a value, a function value and a derived function on the structure, and a function value and a derived function on an element boundary, so that the correcting functions represent a discontinuity of the pressure and a velocity gradient while mediating the interaction of the fluid and the structure.

5. An apparatus comprising:
   a storage configured to store a program; and
   a processor, coupled to the storage, and configured to perform a fluid structure interaction simulation process for simulating mechanical interaction between a fluid and a structure in a biomechanical system by executing the program,
   wherein the fluid structure interaction simulation process includes:
      forming graph information of nodes obtained by discretising a computing region for each of a fluid and a structure that are represented by meshes; and
      simulating the mechanical interaction between the fluid and the structure, wherein the simulating includes:
         arranging interaction mediating elements that move with a displacement of the structure, on a boundary of the structure and the fluid;
         defining, within the interaction mediating element, a correcting function of a pressure and a correcting function of a velocity of the fluid that interact with the pressure and the velocity of the fluid and the displacement of the structure to mediate interaction of the displacement of the structure and the pressure and the velocity of the fluid;

executing a simulation based on the correcting functions, in a state in which the meshes of the fluid are mismatched to the meshes of the structure, wherein the correcting functions are Lagrangian multipliers having, as a constraint condition, a relation satisfied by an incompressibility condition of the fluid and a relation satisfied by a viscous operator of a Newtonian fluid, at a boundary part between the fluid and the structure, based on Green's theorem, thereby compensating for the mismatched meshes of the fluid and the structure, wherein the simulating further includes:

first creating both of a matrix and an equivalent nodal force of each element of the structure by using a time discretization technique and to create both of a matrix and an equivalent nodal force of each element of the fluid by using the time discretization technique;

second creating a matrix representing interaction of the velocity, the pressure, and the correcting functions for each interaction mediating element;

creating a matrix equation with respect to all degrees of freedom by restructuring a contribution from the matrix of each element, based on the matrix of each element and the matrix representing the interaction;

solving and evaluating a variation of dependent variables, including the pressure, the velocity, and the displacement, of the fluid and the structure every time a Newton-Raphson loop is executed in the simulating; and displaying the variation of the dependent variables and the evaluation thereof.

6. The apparatus as claimed in claim 5, wherein the simulating further includes:

searching for a background fluid element having an overlap with the interaction mediating element, based on a change in an interaction pair formed by the interaction mediating element and a degree of freedom of the fluid as the interaction mediating element moves;

determining a fluid node that is a member of the fluid element as belonging to the interaction pair; and executing the simulation based on the interaction pair.

7. The apparatus as claimed in claim 5, wherein the second creating includes:

computing an interaction matrix of the correcting function of the pressure, and the velocity of the fluid;

computing an interaction matrix of the correcting function of the velocity, and the velocity of the fluid;

computing an interaction matrix of the correcting function of the pressure, and a displacement velocity of the structure; and computing an interaction matrix of the correcting function of the velocity, and the displacement velocity of the structure.

8. The apparatus as claimed in claim 5, wherein the correcting functions have a non-zero value only within the interaction mediating element; and wherein the simulating applies a condition to each of a region having a value, a function value and a derived function on the structure, and a function value and a derived function on an element boundary, so that the correcting functions represent a discontinuity of the pressure and a velocity gradient while mediating the interaction of the fluid and the structure.

9. A non-transitory computer-readable storage medium that stores a fluid structure interaction simulation program for simulating mechanical interaction between a fluid and a structure in a biomechanical system to perform a process which, when executed by a processor included in a fluid structure interaction simulation apparatus, causes the processor to perform a fluid structure interaction simulation process comprising:

forming graph information of nodes obtained by discretising a computing region for each of a fluid and a structure that are represented by meshes; and simulating the mechanical interaction between the fluid and the structure, wherein the simulating includes:

arranging interaction mediating elements that move with a displacement of the structure, on a boundary of the structure and the fluid;

defining, within the interaction mediating element, a correcting function of a pressure and a correcting function of a velocity of the fluid that interact with the pressure and the velocity of the fluid and the displacement of the structure, to mediate interaction of the displacement of the structure and the pressure and the velocity of the fluid;

executing the simulation based on the correcting functions, in a state in which the meshes of the fluid are mismatched to the meshes of the structure, wherein the correcting functions are Lagrangian multipliers having, as a constraint condition, a relation satisfied by an incompressibility condition of the fluid and a relation satisfied by a viscous operator of a Newtonian fluid, at a boundary part between the fluid and the structure, based on Green's theorem, thereby compensating for the mismatched meshes of the fluid and the structure, wherein the simulating further includes:

first creating both of a matrix and an equivalent nodal force of each element of the structure by using a time discretization technique and to create both of a matrix and an equivalent nodal force of each element of the fluid by using the time discretization technique;

second creating a matrix representing interaction of the velocity, the pressure, and the correcting functions for each interaction mediating element;

creating a matrix equation with respect to all degrees of freedom by restructuring a contribution from the matrix of each element, based on the matrix of each element and the matrix representing the interaction;

solving and evaluating a variation of dependent variables, including the pressure, the velocity, and the displacement, of the fluid and the structure every time a Newton-Raphson loop is executed in the simulating; and displaying the variation of the dependent variables and the evaluation thereof.

10. The non-transitory computer-readable storage medium as claimed in claim 9, wherein the simulating further includes:

searching for a background fluid element having an overlap with the interaction mediating element, based on a change in an interaction pair formed by the interaction mediating element and a degree of freedom of the fluid as the interaction mediating element moves;

determining a fluid node that is a member of the fluid element as belonging to the interaction pair; and executing the simulation based on the interaction pair.

11. The non-transitory computer-readable storage medium as claimed in claim 9, wherein the second creating includes:

computing an interaction matrix of the correcting function of the pressure, and the velocity of the fluid;

computing an interaction matrix of the correcting function of the velocity, and the velocity of the fluid;

computing an interaction matrix of the correcting function of the pressure, and a displacement velocity of the structure; and computing an interaction matrix of the correcting function of the velocity, and the displacement velocity of the structure.

12. The non-transitory computer-readable storage medium as claimed in claim 9, wherein the correcting functions have a non-zero value only within the interaction mediating element; and wherein the simulating applies a condition to each of a region having a value, a function value and a derived function on the structure, and a function value and a derived function on an element boundary, so that the correcting functions represent a discontinuity of the pressure and a velocity gradient while mediating the interaction of the fluid and the structure.

13. The apparatus as claimed in claim 5, wherein the correcting functions represent a viscous condition at the boundary of the structure and the fluid, and a discontinuity of the pressure and a velocity gradient at top and bottom surfaces of the structure, while satisfying incompressibility and continuity of the velocity.

14. The non-transitory computer-readable storage medium as claimed in claim 9, wherein the correcting functions represent a viscous condition at the boundary of the structure and the fluid, and a discontinuity of the pressure and a velocity gradient at top and bottom surfaces of the structure, while satisfying incompressibility and continuity of the velocity.

* * * * *